US012724106B2

(12) United States Patent
Zhu et al.

(10) Patent No.: US 12,724,106 B2
(45) Date of Patent: Sep. 1, 2026

(54) METHOD, APPARATUS, AND SYSTEM FOR WIRELESS HUMAN AND NON-HUMAN MOTION DETECTION

(71) Applicants: Guozhen Zhu, Greenbelt, MD (US); Beibei Wang, Clarksville, MD (US); Yuqian Hu, Greenbelt, MD (US); Chenshu Wu, Hong Kong (CN); Xiaolu Zeng, Beijing (CN); K. J. Ray Liu, Potomac, MD (US); Oscar Chi-Lim Au, Rockville, MD (US)

(72) Inventors: Guozhen Zhu, Greenbelt, MD (US); Beibei Wang, Clarksville, MD (US); Yuqian Hu, Greenbelt, MD (US); Chenshu Wu, Hong Kong (CN); Xiaolu Zeng, Beijing (CN); K. J. Ray Liu, Potomac, MD (US); Oscar Chi-Lim Au, Rockville, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 18/391,529

(22) Filed: Dec. 20, 2023

(65) Prior Publication Data

US 2024/0125888 A1 Apr. 18, 2024

Related U.S. Application Data

(63) Continuation-in-part of application No. PCT/US2022/045708, filed on Oct. 4, 2022, and a (Continued)

(51) Int. Cl.
*G01S 5/02* (2010.01)

(52) U.S. Cl.
CPC .......... *G01S 5/0273* (2013.01); *G01S 5/0278* (2013.01)

(58) Field of Classification Search
CPC .......... G01S 13/56; G01S 7/415; G01S 13/86; G01S 13/88; G01S 13/003;

(Continued)

(56) References Cited

U.S. PATENT DOCUMENTS

| | | | | |
|---|---|---|---|---|
| 11,424,812 | B1 * | 8/2022 | Zhu | H04W 72/542 |
| 2008/0077015 | A1 * | 3/2008 | Boric-Lubecke | G01S 13/888 600/453 |

(Continued)

FOREIGN PATENT DOCUMENTS

| | | | |
|---|---|---|---|
| CN | 110852266 | * 2/2020 | G06V 40/103 |
| CN | 112346050 | * 2/2021 | A61B 5/1117 |

OTHER PUBLICATIONS

Zhang et al., "WiSpeed: A Statistical Electromagnetic Approach for Device-Free Indoor Speed Estimation", Nov. 30, 2017, arXiv.org ( Year: 2017).*

(Continued)

*Primary Examiner* — Zhiyu Lu
(74) *Attorney, Agent, or Firm* — Slater Matsil, LLP

(57) ABSTRACT

Methods, apparatus and systems for wireless human-non-human motion detection are described. For example, a described method comprises: transmitting a wireless signal through a wireless multipath channel of a venue; receiving the wireless signal through the wireless multipath channel, wherein the received wireless signal differs from the transmitted wireless signal due to the wireless multipath channel that is impacted by a motion of an object in the venue; obtaining a time series of channel information (TSCI) of the wireless multipath channel based on the received wireless signal; computing an autocorrelation function (ACF) based on the TSCI; computing at least one ACF feature of the ACF or a function of the ACF; computing an ACF statistics, a motion statistics, a speed statistics, and a gait statistics based on the at least one ACF feature of the ACF or the function (Continued)

1400

1402 Transmit a wireless signal through a wireless multipath channel of a venue

1404 Receive the wireless signal through the wireless multipath channel of the venue, the received wireless signal being different from the transmitted wireless signal due to the wireless multipath channel that is impacted by a motion of an object in the venue 1406 Obtain a time series of channel information (TSCI) of the wireless multipath channel based on the received wireless signal 1408 Compute an autocorrelation function (ACF) based on the TSCI 1410 Compute at least one ACF feature of the ACF or a function of the ACF 1412 Compute an ACF statistics, a motion statistics, a speed statistics, and a gait statistics based on the at least one ACF feature of the ACF 1414 In response to a determination that the motion is detected, classify the object associated with the detected motion as a human or a non-human, based on: the ACF statistics, the motion statistics, the speed statistics, and the gait statistics of the ACF; and in response to a determination that the motion is detected, classifying the object associated with the detected motion as a human or a non-human, based on: the ACF statistics, the motion statistics, the speed statistics, and the gait statistics.

25 Claims, 18 Drawing Sheets

Related U.S. Application Data continuation-in-part of application No. 17/827,902, filed on May 30, 2022, now Pat. No. 12,352,882, and a continuation-in-part of application No. 17/838,228, filed on Jun. 12, 2022, and a continuation-in-part of application No. 17/838,231, filed on Jun. 12, 2022, and a continuation-in-part of application No. 17/838,244, filed on Jun. 12, 2022, now Pat. No. 12,216,190, and a continuation-in-part of application No. 17/891,037, filed on Aug. 18, 2022, now Pat. No. 12,078,510, and a continuation-in-part of application No. 17/945,995, filed on Sep. 15, 2022, now Pat. No. 12,004,838, and a continuation-in-part of application No. 16/790,610, filed on Feb. 13, 2020, now Pat. No. 11,928,894, and a continuation-in-part of application No. 16/871,004, filed on May 10, 2020, now Pat. No. 12,046,040, and a continuation-in-part of application No. 16/909,913, filed on Jun. 23, 2020, now abandoned, and a continuation-in-part of application No. 17/019,270, filed on Sep. 13, 2020, now Pat. No. 12,036,948, and a continuation-in-part of application No. 17/149,625, filed on Jan. 14, 2021, and a continuation-in-part of application No. 17/180,766, filed on Feb. 20, 2021, now Pat. No. 11,953,618, and a continuation-in-part of application No. 17/352,185, filed on Jun. 18, 2021, now Pat. No. 11,906,659, and a continuation-in-part of application No. 17/352,306, filed on Jun. 20, 2021, now Pat. No. 11,940,550, and a continuation-in-part of application No. 17/537,432, filed on Nov. 29, 2021, now Pat. No. 12,290,230, and a continuation-in-part of application No. 17/539,058, filed on Nov. 30, 2021, now Pat. No. 12,066,572, and a continuation-in-part of application No. 17/959,487, filed on Oct. 4, 2022, now Pat. No. 12,272,375, and a continuation-in-part of application No. 17/960,080, filed on Oct. 4, 2022, now Pat. No. 12,324,647, and a continuation-in-part of application No. 18/108,563, filed on Feb. 10, 2023, and a continuation-in-part of application No. 18/144,321, filed on May 8, 2023, now Pat. No. 12,153,156, and a continuation-in-part of application No. 18/199,963, filed on May 21, 2023, now Pat. No. 12,439,288, and a continuation-in-part of application No. 18/211,567, filed on Jun. 19, 2023, now Pat. No. 12,044,790, and a continuation-in-part of application No. 18/379,622, filed on Oct. 12, 2023, now Pat. No. 12,256,360.

(60) Provisional application No. 63/543,717, filed on Oct. 11, 2023.

(58) Field of Classification Search
CPC ............ G01S 2013/462; G01S 5/0273; G01S 5/0278; G01S 7/006; G01S 7/417; H04L 27/2647; H04L 5/0026; H04L 5/0048; H04L 25/0204; H04L 25/03012; H04L 27/2601; H04L 27/261; H04L 5/0051; G06F 18/241; G06T 3/4046; G06T 3/4053; H04B 17/391
See application file for complete search history.

(56) References Cited

U.S. PATENT DOCUMENTS

| | | | | |
|---|---|---|---|---|
| 2016/0132728 | A1* | 5/2016 | Choi | G06F 18/22<br>382/103 |
| 2017/0169299 | A1* | 6/2017 | Huang | G06V 10/761 |
| 2023/0014948 | A1* | 1/2023 | Guan | G06V 10/751 |

OTHER PUBLICATIONS

Zhang et al., "WiDetect: Robust Motion Detection with a Statistical Electromagnetic Model", Sep. 2019, Proc. ACM Interact. Mob. Wearable Ubiquitous Technol., vol. 3, No. 3, Article 122. (Year: 2019).*

Zhang et al. "A Survey of mmWave-based Human Sensing: Technology, Platforms and Applications", Aug. 2021, Journal of Latex Class Files, vol. 14, No. 8. (Year: 2021).*

Wu et al., "Non-instrusive Human Vital Sign Detection Using mmWave Sensing Technologies: A Review", Nov. 2023, ACM Transactions on Sensor Networks, vol. 20, No. 1, Article 16. (Year: 2023).*

* cited by examiner

METHOD, APPARATUS, AND SYSTEM FOR WIRELESS HUMAN AND NON-HUMAN MOTION DETECTION

CROSS-REFERENCE TO RELATED APPLICATIONS

The present application hereby incorporates by reference the entirety of the disclosures of, and claims priority to, each of the following cases:

(a) U.S. Provisional Patent application 63/543,717, entitled "METHODS, APPARATUS, AND SYSTEMS FOR WIRELESS PROXIMITY DETECTION, MOTION RECOGNITION AND HUMAN IDENTIFICATION", filed on Oct. 11, 2023, (b) U.S. patent application Ser. No. 16/790,610, entitled "METHOD, APPARATUS, AND SYSTEM FOR WIRELESS GAIT RECOGNITION", filed Feb. 13, 2020, (c) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020, (d) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020, (e) U.S. patent application Ser. No. 17/019,270, entitled "METHOD, APPARATUS, AND SYSTEM FOR VEHICLE WIRELESS MONITORING", filed on Sep. 13, 2020, (f) U.S. patent application Ser. No. 17/149,625, entitled "METHOD, APPARATUS, AND SYSTEM FOR WIRELESS MONITORING WITH MOTION LOCALIZATION", filed on Jan. 14, 2021, (g) U.S. patent application Ser. No. 17/180,766, entitled "METHOD, APPARATUS, AND SYSTEM FOR WIRELESS MOTION RECOGNITION", filed on Feb. 20, 2021, (h) U.S. patent application Ser. No. 17/352,185, entitled "METHOD, APPARATUS, AND SYSTEM FOR WIRELESS MICRO MOTION MONITORING", filed on Jun. 18, 2021, (i) U.S. patent application Ser. No. 17/352,306, entitled "METHOD, APPARATUS, AND SYSTEM FOR WIRELESS MONITORING TO ENSURE SECURITY", filed on Jun. 20, 2021, (j) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021, (k) U.S. patent application Ser. No. 17/539,058, entitled "METHOD, APPARATUS, AND SYSTEM FOR HUMAN IDENTIFIATION BASED ON HUMAN RADIO BIOMETRIC INFORMATION", filed on Nov. 30, 2021, (l) U.S. patent application Ser. No. 17/827,902, entitled "METHOD, APPARATUS, AND SYSTEM FOR SPEECH ENHANCEMENT AND SEPARATOIN BASED ON AUDIO AND RADIO SIGNALS", filed on May 30, 2022, (m) U.S. patent application Ser. No. 17/838,228, entitled "METHOD, APPARATUS, AND SYSTEM FOR WIRELESS SENSING BASED ON CHANNEL INFORMATION", filed on Jun. 12, 2022, (n) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022, (o) U.S. patent application Ser. No. 17/838,244, entitled "METHOD, APPARATUS, AND SYSTEM FOR WIRELESS SENSING BASED ON LINKWISE MOTION STATISTICS", filed on Jun. 12, 2022, (p) U.S. patent application Ser. No. 17/891,037, entitled "METHOD, APPARATUS, AND SYSTEM FOR MAP RECONSTRUCTION BASED ON WIRELESS TRACKING", filed on Aug. 18, 2022, (q) U.S. patent application Ser. No. 17/945,995, entitled "METHOD, APPARATUS, AND SYSTEM FOR WIRELESS VITAL MONITORING USING HIGH FREQUENCY SIGNALS", filed on Sep. 15, 2022, (r) U.S. patent application Ser. No. 17/959,487, entitled "METHOD, APPARATUS, AND SYSTEM FOR VOICE ACTIVITY DETECTION BASED ON RADIO SIGNALS", filed on Oct. 4, 2022, (s) U.S. patent application Ser. No. 17/960,080, entitled "METHOD, APPARATUS, AND SYSTEM FOR ENHANCED WIRELESS MONITORING OF VITAL SIGNS", filed on Oct. 4, 2022, (t) PCT Patent application PCT/US22/45708, entitled "METHOD, APPARATUS, AND SYSTEM FOR WIRELESS SENSING MEASUREMENT AND REPORTING", filed on Oct. 4, 2022, (u) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023, (v) U.S. patent application Ser. No. 18/144,321, entitled "METHOD, APPARATUS, AND SYSTEM FOR WIRELESS MONITORING WITH IMPROVED ACCURACY", filed on May 8, 2023, (w) U.S. patent application Ser. No. 18/199,963, entitled "METHOD, APPARATUS, AND SYSTEM FOR WIRELESS SENSING MEASUREMENT AND REPORTING", filed on May 21, 2023, (x) U.S. patent application Ser. No. 18/211,567, entitled "METHOD, APPARATUS, AND SYSTEM FOR CORRELATION-BASED WIRELESS MONITORING AND LOCALIZATION", filed on Jun. 19, 2023, (y) U.S. patent application Ser. No. 18/379,622, entitled "METHOD, APPARATUS, AND SYSTEM FOR WIRELESS PROXIMITY DETECTION", filed on Oct. 12, 2023.

TECHNICAL FIELD

The present teaching generally relates to motion detection. More specifically, the present teaching relates to wirelessly detecting and distinguishing human and non-human motions.

BACKGROUND

With the proliferation of Internet of Things (IoT) devices, indoor intelligent applications such as security surveillance, intruder detection, occupancy monitoring, and activity recognition have gained significant attention. However, these applications frequently suffer from an elevated rate of false alarms due to the inability to recognize human and non-human subjects, such as pets, robotic vacuum cleaners, and electrical appliances. This ability to differentiate is essential, especially for applications related to security, health monitoring, automation and energy management. Misidentification can lead to user frustration, erode trust and hamper the practical and widespread adoption of these technologies. Given the prevalence of pets, robotic vacuum cleaners, and electrical appliances, especially in residential environments, it is crucial to develop a reliable system that can accurately recognize human and non-human subjects.

The accurate differentiation of human and various non-human movements still remains a challenge nowadays. For instance, camera-based methods and thermal-sensor based approaches can only detect moving subjects within the Line-Of-Sight (LOS). Additionally, camera-based systems raise privacy issues. Strategies leveraging radar to differentiate pets from humans based on vital signs expect pets to remain stationary, which is unrealistic. In addition, these methods have strict device placement requirements, often limited to LOS, and presume the subject is moving within a predetermined area.

SUMMARY

The present teaching relates wirelessly detecting and distinguishing human and non-human motions.

In one embodiment, a system for wireless human-nonhuman motion detection is described. The system comprises: a transmitter configured to transmit a wireless signal through a wireless multipath channel of a venue, a receiver configured to receive the wireless signal through the wireless multipath channel of the venue, and a processor. The received wireless signal differs from the transmitted wireless signal due to the wireless multipath channel that is impacted by a motion of an object in the venue. The processor is configured to: obtain a time series of channel information (TSCI) of the wireless multipath channel based on the received wireless signal, compute an autocorrelation function (ACF) based on the TSCI, compute at least one ACF feature of the ACF or a function of the ACF, compute an ACF statistics based on a first ACF feature of the ACF or the function of the ACF, compute a motion statistics associated with the motion of the object based on a second ACF feature of the ACF or the function of the ACF, compute a speed statistic associated with a speed of the motion of the object based on a third ACF feature of the ACF or the function of the ACF, compute a gait statistics associated with a gait motion of the object based on a fourth ACF feature of the ACF or the function of the ACF, and in response to a determination that the motion is detected, classify the object associated with the detected motion to be one of a human or a non-human, based on: the ACF statistics, the motion statistics, the speed statistics, and the gait statistics.

In another embodiment, a method for wireless human-nonhuman motion detection is described. The method comprises: transmitting a wireless signal through a wireless multipath channel of a venue; receiving the wireless signal through the wireless multipath channel of the venue, wherein the received wireless signal differs from the transmitted wireless signal due to the wireless multipath channel that is impacted by a motion of an object in the venue; obtaining a time series of channel information (TSCI) of the wireless multipath channel based on the received wireless signal; computing an autocorrelation function (ACF) based on the TSCI; computing at least one ACF feature of the ACF or a function of the ACF; computing an ACF statistics based on a first ACF feature of the ACF or the function of the ACF; computing a motion statistics associated with the motion of the object based on a second ACF feature of the ACF or the function of the ACF; computing a speed statistic associated with a speed of the motion of the object based on a third ACF feature of the ACF or the function of the ACF; computing a gait statistics associated with a gait motion of the object based on a fourth ACF feature of the ACF or the function of the ACF; and in response to a determination that the motion is detected, classifying the object associated with the detected motion to be one of a human or a non-human, based on: the ACF statistics, the motion statistics, the speed statistics, and the gait statistics.

In yet another embodiment, an apparatus for wireless human-nonhuman motion detection is described. The apparatus comprises: a receiver configured to receive a wireless signal transmitted by a transmitter through a wireless multipath channel in a venue, a memory having a set of instructions stored therein, and a processor communicatively coupled to the memory and the receiver. The received wireless signal differs from the transmitted wireless signal due to the wireless multipath channel that is impacted by a motion of an object in the venue. The processor is configured to: obtain a time series of channel information (TSCI) of the wireless multipath channel based on the received wireless signal, compute an autocorrelation function (ACF) based on the TSCI, compute at least one ACF feature of the ACF or a function of the ACF, compute an ACF statistics based on a first ACF feature of the ACF or the function of the ACF, compute a motion statistics associated with the motion of the object based on a second ACF feature of the ACF or the function of the ACF, compute a speed statistic associated with a speed of the motion of the object based on a third ACF feature of the ACF or the function of the ACF, compute a gait statistics associated with a gait motion of the object based on a fourth ACF feature of the ACF or the function of the ACF, and in response to a determination that the motion is detected, classify the object associated with the detected motion to be one of a human or a non-human, based on: the ACF statistics, the motion statistics, the speed statistics, and the gait statistics.

Other concepts relate to software for implementing the present teaching on wirelessly detecting and distinguishing human and non-human motions. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
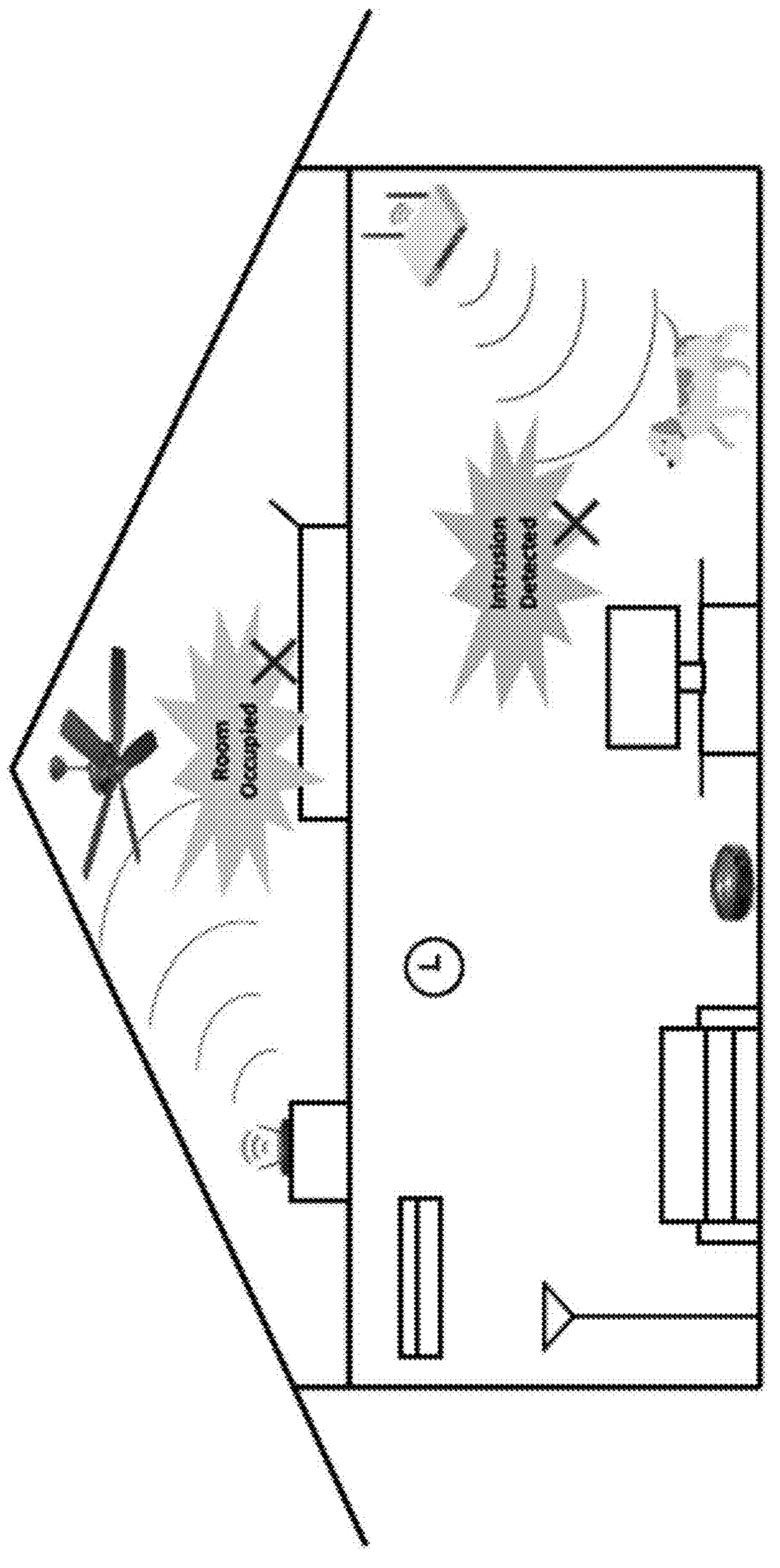
FIG. 1 illustrates non-human motion interference to a human sensing system, according to some embodiments of the present disclosure.

The symbol "I" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless (sounding) signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task (e.g. sensing goal) may be performed based on the characteristics/STI/MI. A task-related presentation may be generated in a user-interface (UI) on a device of a user. The characteristics/STI/MI may be motion indicator value(MIV)/activity data (AD)/motion data (MD)/motion sensing data(MSD)/motion detection data (MDD)/motion score(MS)/motion statistics(MS2).

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behaviodgesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G/9G/10G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, MIMO transmission, sensing transmission, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G/9G/10G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowled gement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G/9G/10G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless-enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g. association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified over time (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/another device/local/edge/cloud server).

Wireless connection (e.g. association/authentication) between Type1 device and nearby/portable/another device may be established (e.g. using signal handshake). Type1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/fully parallel. Parallel triggering may be achieved using additional device (s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/second (sounding) rates respectively, perhaps to first/second MAC addresses respectively. Some first/second channels/signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/signals may be WiFi+ LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e g channels/signals/rates/MAC addresses/antennas/Type1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferiodunsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/scheme/channel/bandwidth/system state/TSCUTSMA/task/task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/movement/process/event/manufacturing/assembly-line/maintenance/repairing/navigation/object/emotional/mental/state/condition/stage/gesture/gait/action/motion/pre Bence/movement/daily/activity/history/event.

Classifier may comprise linear/nonlinear/binary/multiclass/Bayes classifier/Fisher linear discriminant/logistic regression/Markov chain/Monte Carlo/deep/neural network/perceptron/self-organization maps/boosting/meta algorithm/decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/eigenvalue/time/frequency/orthogonal/non-orthogonal decomposition, processing/preprocessing/postprocessing. Each CI may comprise multiple components (e.g. vector/combination of complex values). Each component may be preprocessed to give magnitude/phase or a function of such.

Feature may comprise: output of feature extraction/projection, amplitude/magnitude/phase/energy/power/strength/intensity, presence/absence/proximity/likelihood/histogram, time/period/duration/frequency/component/decomposition/projection/band, local/global/maximum (max)/minimum (min)/zero-crossing, repeating/periodic/typical/habitual/one-time/atypical/abrupt/mutually-exclusive/evolving/transient/changing/time/related/correlated feature/pattern/trend/profile/events/tendency/inclination/behavior, cause-and-effect/short-term/long-term/correlation/statistics/frequency/period/duration, motion/movement/location/map/coordinate/height/speed/acceleration/angle/rotation/size/volume, suspicious/dangerous/alarming event/warning/belief/proximity/collision, tracking/breathing/heartbeat/gait/action/event/statistical/hourly/daily/weekly/monthly/yearly parameters/statistics/analytics, well-being/health/disease/medical statistics/analytics, an early/instantaneous/contemporaneous/delayed indication/suggestion/sign/indicator/verifier/detection/symptom of a state/condition/situation/disease/biometric, baby/patient/machine/device/temperature/vehicle/parking lot/venue/lift/elevator/spatial/road/fluid flow/home/room/office/house/building/warehouse/storage/system/ventilation/fan/pipe/duct/people/human/car/boat/truck/airplane/drone/downtown/crowd/impulsive event/cyclo-stationary/environment/vibration/material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/characteristics/STI/MI may be augmented by training TSCI/characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/auto-correlation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/weighted sum, product/weighted product, weighted average/robust/trimmed mean/arithmetic/geometric/harmonic mean, median/mode, percentile or another aggregate of any of the above. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ending time may be same/different.

In one example, first/second Type1-Type2 device pairs may be same and first/second TSCI may be same/different. When different, first/second TSCI may comprise a pair of current/reference, current/current or reference/reference TSCI. For “current/reference”, first TSCI may be current TSCI obtained in operating stage and second TSCI may be reference TSCI obtained in training stage. For “reference/reference”, first/second TSCI may be two TSCI obtained during training stage (e.g. for two training events/states/classes). For “current/current”, first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for “segment-wise”), or all items associated with a TX-RX link (for “link-wise”), or an item (for “item-wise”), or a component of an item (for “component-wise”). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/tentative classification results (e.g. associate if similarity scores prevail (e.g. being max/min/dominant/matchless/most significant/excel) or significant enough (e.g. higher/lower than some threshold) among all candidate classes for N consecutive times, or for a high/low enough percentage, or most/least often in a time period).

Channel information (CI) may comprise any of: signal strength/amplitude/phase/timestamp/spectral power measurement/modem parameters/dynamic beamforming information/beamforming report/dynamic imaging information/channel representation information(CRI)/spatial map from dynamic beaming/transfer function components/radio state/measurable variables/sensing data/measurement/coarse/fine-grained layer information(e.g. PHY/MAC/datalink layer)/digital gain/RF filter/frontend-switch/DC offset/correction/IQ-compensation settings/environment effect on wireless signal propagation/channel input-to-output transformation/stable behavior of environment/state profile/wireless channel measurements/received signal strength indicator (RSSI)/channel state information (CSI)/channel impulse response (CIR)/channel frequency response (CFR)/channel response(CR)/characteristics of frequency components (e.g. subcarriers)/channel characteristics/channel filter response, auxiliary information, data/meta/user/account/access/security/session/status/supervisory/device/network/household/neighborhood/environment/real-time/sensor/stored/encrypted/compressed/protected data, identity/identifier/identification.

Each CI may be associated with timestamp/arrival time/frequency band/signature/phase/amplitude/trend/characteristics, frequency-like characteristics, time/frequency/time-frequency domain element, orthogonal/non-orthogonal decomposition characteristics of signal through channel Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long-term/historical/repetitive/repeated/repeatable/recurring/periodic/pseudoperiodic/regular/habitual/incremental/average/initial/final/current/past/future/predicted/changing/deviational/change/time/frequency/orthogonal/non-orthogonal/transform/decomposition/deterministic/stochastic/probabilistic/dominant/key/prominent/representative/characteristic/significant/insignificant/indicative/common/averaged/shared/typical/prototypical/persistent/abnormal/a brupt/impulsive/sudden/unusual/unrepresentative/atypical/suspicious/dangerous/alarming/evolving/transient/one-time quantity/characteristics/analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/navigation/tracking, linear/rotational/horizontal/vertical/location/distance/displacement/height/speed/velocity/acceleration/change/angular speed, direction/orientation, size/length/width/height/azimuth/area/volume/capacity, deformation/transformation, object/motion direction/angle/shape/form/shrinking/expanding, behavior/activity/movement, occurrence, fall-down/accident/security/event, period/frequency/rate/cycle/rhythm/count/quantity, timing/duration/interval, starting/initiating/ending/current/past/next time/quantity/information, type/grouping/classification/composition, presence/absence/proximity/approaching/receding/entrance/exit, identity/identifier, head/mouth/eye/breathing/heart/hand/handwriting/arm/body/gesture/leg/gait/organ characteristics, tidal volume/depth of breath/airflow rate/inhale/exhale time/ratio, gait/walking/tool/machine/complex motion, signal/motion characteristic/information/feature/statistics/parameter/magnitude/phase/degree/dynamics/anomaly/variability/detection/estimation/recognition/identification/indication, slope/derivative/higher order derivative of function/feature/mapping/transformation of another characteristics, mismatch/distance/similarity score/cost/metric, Euclidean/statistical/weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/similarity scores/test quantities. Static (or dynamic) segment/profile may be identified/computed/analyzed/monitored/extracted/obtained/marked/presented/indicated/highlighted/stored/communicated by analyzing CI/TSCI/features/functions of features/test quantities/characteristics/STI/MI (e.g. target motion/movement presence/detection/estimation/recognition/identification). Test quantities may be based on CI/TSCI/features/functions of features/characteristics/STI/MI. Test quantities may be processed/tested/analyzed/compared.

Test quantity may comprise any/any function of: data/vector/matrix/structure, characteristics/STI/MI, CI information (CII, e.g. CI/CIC/feature/magnitude/phase), directional information (DI, e.g. directional CII), dominant/representative/characteristic/indicative/key/archetypal/exemplary/paradigmatic/prominent/common/shared/typical/prototypical/averaged/regular/persistent/usual/normal/atypical/unusual/abnormal/unrepresentative data/vector/matrix/structure, similarity/mismatch/distance score/cost/metric, auto/cross correlation/covariance, sum/mean/average/weighted/trimmed/arithmetic/geometric/harmonic mean, variance/deviation/absolute/square deviation/averaged/median/total/standard deviation/derivative/slope/variation/total/absolute/square variation/spread/dispersion/variability, divergence/skewness/kurtosis/range/interquartile range/coefficient of variation/dispersion/L-moment/quartile coefficient of dispersion/mean absolute/square difference/Gini coefficient/relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/suddenness/occurrence/recurrence, temporal profile/characteristics, time/timing/duration/period/frequency/trend/history, starting/initiating/ending time/quantity/count, motion classification/type, change, temporal/frequency/cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/communication/identification/verification/detection/recognition/authentication/access control/cloud access/networking/social networking/logging/recording/cataloging/classification/tagging/association/pairing/transaction/electronic transaction/intellectual property control (e.g. by local/cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/worker/teacher/technician/serviceman/repairman/passenger/patient/customer/student/traveler/inmate/high-value person/, object to be tracked, vehicle/car/AGV/drone/robot/wagon/transport/remote-controlled machinery/cart/moveable objects/goods/items/material/parts/components/machine/lift/elevator, merchandise/goods/cargo/people/items/food/package/luggage/equipment/cleaning tool in/on workflow/assembly-line/warehouse/factory/store/supermarket/distribution/logistic/transport/manufacturing/retail/wholesale/business center/facility/hub, phone/computer/laptop/tablet/dongle/plugin/companion/tool/peripheral/accessory/wearable/furniture/appliance/amenity/gadget, IoT/networked/smart/portable devices, watch/glasses/speaker/toys/stroller/keys/wallet/purse/handbag/backpack, goods/cargo/luggage/equipment/motor/machine/utensil/table/chaidair-conditioner/door/window/heater/fan, light/fixture/stationary object/television/camera/audio/video/surveillance equipment/parts, ticket/parking/toll/airplane ticket, credit/plastic/access card, object with fixed/changing/no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type1/Type2 device may attach to/move with object. Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighti ng/air-conditioner/heater/smoke detector, wearable/watch/glasses/goggle/button/bracelet/chain/jewelry/ring/belt/clothing/garment/fabric/shirt/pant/dress/glove/handwear/shoe/footwear/ha t/headwear/bag/purse/wallet/makeup/cosmetic/ornament/book/magazine/paper/stationary/signage/poster/d isplay/printed matter, furniture/fixture/table/desk/chair/sofa/bed/cabinet/shelf/rack/storage/box/bucket/basket/packaging/carriage/tile/shingle/brick/block/mat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mir ror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boativessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. "Tracker Bot"). The other one of Type1/Type2 device may not move with object (e.g. "Origin Satellite", "Origin Register"). Either may have known characteristics/STI/MI. Initial characteristics/STI/MI may be computed based on known characteristics/STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/gove rnment/community/seniors/elderly care/geriatric/space facility/terminal/hub, distribution center/store, machine/engine/device/assembly line/workflow, urban/rural/suburban/metropolitan area, staircase/escalatodelevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/plaza/square/construction site/hotel/museum/school/hospital/university/garage/mall/airport/train/bus station/terminal/hub/platform, valley/forest/wood/terrain/landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life-threat/emotion/movement/motion/degree/pattern/periodickepeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/vide o/location/movement/danger/threat detection/recognition/monitoring/analysis/response/execution/synthesis, generate/retrieve/play/display/render/synthesize dialog/exchange/response/presentation/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/clearning/entertainment/IoT/security/siren/access system/device/doodwindow/garage/lift/elevatodescalator/speaker/television/light/peripheral/accessory/wearable/furniture/appliance/amenity/gadget/alarm/camera/gaming/coffee/cooking/heater/fan/h ousekeeping/home/office machine/device/robot/vacuum cleaner/assembly line), (d) miscellaneous task, any of: transmission/coding/encryption/storage/analysis of data/parameters/analytics/derived data, upgrading/administration/configuration/coordination/broadcasting/synchronization/networking/encryption/communication/protection/compression/storage/database/archiving/query/cloud computing/presentation/augmented/virtual reality/other processing/task. Task may be performed by some of: Type1/Type2/nearby/portable/another device, and/or hub/local/edge/cloud server.

Task may also comprise: detect/recognize/monitor/locate/interpret/analyze/record/store user/visitor/intruder/object/pet, interact/engage/converse/dialog/exchange with user/object/visitor/intruder/human/baby/pet, detect/locate/localize/recognize/monitor/analyze/interpret/learn/train/respond/execute/synthesize/generate/record/store/summarize health/well-being/daily-life/activity/behavior/pattern/exercise/food-intake/restroom visit/work/play/rest/sleep/relaxation/danger/routine/timing/habit/trend/normality/normalcy/anomaly/regularity/irregularity/change/presence/motion/gesture/gait/expression/emotion/state/stage/voice/command/instruction/question/quer y/music/sound/location/movement/fall-down/threat/discomfort/sickness/environment/, generate/retrieve/play/display/render/synthesize dialog/exchange/response/presentation/report/experience/media/multimedia/expression/sound/speech/music/image/imaging/video/animation/webpage/t ext/message/notification/reminder/enquiry/warning, detect/recognize/monitor/interpret/analyze/record/store user/intruder/object input/motion/gesture/location/activity), detect/check/monitor/locate/manage/control/adjust/configure/lock/unlock/arm/disarm/open/close/fully/partially/activat e/turn on/off some system/device/object (e.g. vehicle/robot/drone/electrical/mechanical/air-conditioning/heating/ventilation/HVAC/lighting/cleaning/entertainment/IoT/security/siren/access systems/devices/items/components, door/window/garage/lift/elevator/escalator/speaker/television/light/peripheral/accessory/wearable/furniture/appliance/amenity/gadget/alarm/camera/gaming/c offee/cooking/heater/fan/housekeeping/home/office machine/device/vacuum cleaner/assembly line/window/garage/door/blind/curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/response/warning/clarification/notification/report) automatically upon detection, do something for user automatically upon detecting user presence, turn on/off/wake/control/adjust/dim light/music/radio/TV/HiFi/STB/computer/speaker/smart device/air-conditioning/ventilation/heating system/curtains/light shades, turn on/off/pre-heat/control coffee-machine/hot-water-pot/cooker/oven/microwave oven/another cooking device, check/manage temperature/setting/weather forecast/telephone/message/mail/system check, present/interact/engage/dialog/converse (e.g. through smart speaker/display/screen; via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/channel, open curtain/blind, monitor user's mood, adjust lighting/sound environment according to mood/current/imminent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/field/voice/music/song/dialog system, using visual tool such as TV/entertainment system/computer/notebook/tablet/display/light/color/brightness/patterns symbols, using haptic/virtual reality/gesture/tool, using smart device/appliance/material/furniture/fixture, using server/hub device/cloud/fog/edge server/home/mesh network, using messaging/notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/set-top box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from night-time to day-time profile, turn on bedroom light, turn on restroom light as user approaches restroom, check radio/streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/close garage door, turn on/off garage/driveway light, close/lock all windows/doors (if user forgets), turn off appliance (e.g. stove/microwave/oven), turn on/arm security system, adjust light/air-conditioning/heating/ventilation systems to "away" profile to save energy, and/or send alerts/reports/updates to user's smart phone.

Motion may comprise any of: no-motion, motion sequence, resting/non-moving motion, movement/change in position/location, daily/weekly/monthly/yearly/repeating/activity/behavior/action/routine, transient/time-varying/fall-down/repeating/repetitive/periodic/pseudo-periodic motion/breathing/heartbeat, deterministic/non-deterministic/probabilistic/chaotic/random motion, complex/combination motion, non-/pseudo-/cyclo-/stationary random motion, change in electro-magnetic characteristics, human/animal/plant/body/machine/mechanical/vehicle/drone motion, air-/wind-/weather-/water-/fluid-/ground/sub-surface/seismic motion, man-machine interaction, normal/abnormal/dangerous/warning/suspicious motion, imminent/rain/fire/flood/tsunami/explosion/collision, head/facial/eye/mouth/tongue/neck/finger/hand/arm/shoulder/upper/lower/body/chest/abdominal/hip/leg/foot/joint/knee/elbow/skin/below-skin/subcutaneous tissue/blood vessel/intravenous/organ/heart/lung/stomach/intestine/bowel/eating/breathing/talking/singing/dancing/coordinated motion, facial/eye/mouth expression, and/or hand/arm/gesture/gait/UI/keystroke/typing stroke.

Type1/Type2 device may comprise heterogeneous IC, low-noise amplifier (LNA), power amplifier, transmit-receive switch, media access controller, baseband radio, and/or 2.4/3.65/4.9/5/6/sub-7/over-7/28/60/76 GHz/another radio. Heterogeneous IC may comprise processor/memory/software/firmware/instructions. It may support broadband/wireless/mobile/mesh/cellular network, WLAN/WAN/MAN, standard/IEEE/3GPP/WiFi/4G/LTE/5G/6G/7G/8G, IEEE 802.11/a/b/g/n/ac/ad/af/ah/ax/ay/az/be/bf/15/16, and/or Bluetooth/BLE/NFC/Zigbee/WiMax.

Processor may comprise any of: general-/special-/purpose/embedded/multi-core processor, microprocessor/microcontroller, multi-/parallel/CISC/RISC processor, CPU/GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/optical/organic/storage system/network, network/cloud/edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/downloaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/multi-link/component/item/quantity, magnitude/norm/phase/feature/energy/timebase/similarity/distance/characterization score/measure computation/extraction/correction/cleaning, linear/nonlinear/FIR/IIR/MA/AR/ARMA/Kalman/particle filtering, lowpass/bandpass/highpass/mediankank/quartile/percentile/mode/selective/adaptive filtering, interpolation/intrapolation/extrapolation/decimation/subsampling/upsampling/resampling, matched filtering/enhancement/restoration/denoising/smoothing/conditioning/spectral analysis/mean subtraction/removal, linear/nonlinear/inverse/frequency/time transform, Fourier transform (FT)/DTFT/DFT/FFT/wavelet/Laplace/Hilbert/Hadamard/trigonometric/sine/cosine/DCT/power-of-2/sparse/fast/frequency transform, zero/cyclic/padding, graph-based transform/processing, decomposition/orthogonal/non-orthogonal/over-complete projection/eigen-decomposition/SVD/PCA/ICA/compressive sensing, grouping/folding/sorting/comparison/soft/hard/thresholding/clipping, first/second/high order derivative/integration/convolution/multiplication/division/addition/subtraction, local/global/maximization/minimization, recursive/iterative/constrained/batch processing, least mean square/absolute error/deviation, cost function optimization, neural network/detection/recognition/classification/identification/estimation/labeling/association/tagging/mapping/remapping/training/clustering/machine/supervised/unsupervised/semi-supervised learning/network, vector/quantization/encryption/compression/matching pursuit/scrambling/coding/storing/retrieving/transmitting/receiving/time-domain/frequency-domain/normalization/scaling/expansion/representing/merging/combining/splitting/tracking/monitoring/shape/silhouette/motion/activity/analysis, pdf/histogram estimation/importance/Monte Carlo sampling, error detection/protection/correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/union/intersection, vector operation/addition/subtraction/multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scaladvector/discrete/continuous/polynomial/exponential/logarithmic/trigonometric/transcendental/logica l/piecewise/linear/algebraic/nonlinear/circular/piecewise linear/real/complex/vector-valued/inverse/absolute/indicator/limiting/floodrounding/sign/composite/sliding/moving function, derivative/integration, function of function, one-to-one/one-to-many/many-to-one/many-to-many function, mean/mode/median/percentile/max/min/range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/clipping/rounding/truncation/quantization/approximation, time function processed with an operation (e.g. filtering), sine/cosine/tangent/cotangent/secant/cosecant/elliptical/parabolic/hyperbolic/game/zeta function, probabilistic/stochastic/random/ergodic/stationary/deterministic/periodic/repeated function, inverse/transformation/frequency/discrete time/Laplace/Hilbert/sine/cosine/triangular/wavelet/integer/power-of-2/sparse transform, orthogonal/non-orthogonal/eigen projection/decomposition/eigenvalue/singular value/PCA/ICA/SVD/compressive sensing, neural network, feature extraction, function of moving window of neighboring items of time series, filtering function/convolution, short-time/discrete transform/Fourier/cosine/sine/Hadamard/wavelet/sparse transform, matching pursuit, approximation, graph-based processing/transform/graph signal processing, classification/identification/class/group/category/labeling, processing/preprocessing/postprocessing, machine/learning/detection/estimation/feature extraction/learning network/feature extraction/denoising/signal enhancement/coding/encryption/mapping/vector quantization/remapping/lowpass/highpass/bandpass/matched/Kalman/particle/FIR/IIR/MA/AR/ARMA/m edian/mode/adaptive filtering, first/second/high order derivative/integration/zero crossing/smoothing, up/down/random/importance/Monte Carlo sampling/resampling/converting, interpolation/extrapolation, short/long term statistics/auto/cross correlation/moment generating function/time averaging/weighted averaging, special/Bessel/Beta/Gamma/Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window (s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type 1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/history/u ser/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/se quential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/metaheuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/doodwindow/open/close/fall-down/accident/burning/freezing/water-/wind-/air-movement event, repeated/pseudo-periodic event (e g running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance-from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/worldwalkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/oven/microwave/fan/heater/air-con/router/phone/computer/tablet/accessory/plug/pipe/lamp/smoke detector/furniture/fixture/shelf/cabinet/doodwindow/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

Indoor intelligent perception systems have gained significant attention in recent years. But accurately detecting human presence can be challenging in the presence of nonhuman subjects such as pets, robots, and electrical appliances, limiting the practicality of these systems for widespread use, as depicted in FIG. 1.

The present teaching discloses a novel system called "WI-MOID": WiFi-based human and non-human motion identification, which can accurately identify various human and non-human subjects through walls. In some embodiments, the system passively and unobtrusively distinguishes moving human and various non-human subjects using a single pair of commodity WiFi transceivers, without requiring any device on the subjects or restricting their movements. WI-MOID leverages a novel statistical electromagnetic wave theory-based multipath model to detect moving subjects, extracts physically and statistically explainable features of their motion, and accurately differentiates human and various non-human movements through walls, even in complex environments. In addition, WI-MOID is suitable for edge devices, requiring minimal computing resources and storage, and is environment-independent, making it easy to deploy in new environments with minimum effort. The performance of WI-MOID has been validated in four distinct buildings with various moving subjects, including pets, vacuum robots, humans, and fans, and the results demonstrate that it achieves high accuracy and low false alarm rate for identification of human and non-human motion, including high accuracy in unseen environments without model tuning, demonstrating its robustness for ubiquitous use.

In some embodiments, the disclosed system utilizes ubiquitous WiFi signals and operates unobtrusively and without contact, eliminating the need for additional instrumentation or environmental restrictions. In contrast to existing systems that require pets, robots, and humans to move along predefined paths/directions/areas, WI-MOID can detect freely moving subjects, allowing them to walk/turn/stand/stay without any predefined restrictions. WIMOID automatically detects the movement of the subject and extracts context-independent features, allowing it to function effectively in diverse environments without requiring additional training or parameter tuning.

Realizing such a flexible system is not an easy task and several major challenges need to be addressed. The first difficulty lies in deriving motion features in both LOS and non-line-of-sight (NLOS) settings using only a single-link WiFi signal. Speed pattern, a key component of motion features, presents its own unique challenge. While various WiFi-based speed estimation approaches, such as those using Doppler Frequency Shift (DFS), have been attempted, they generally require multiple links or are only effective under LOS conditions. In some embodiments, the system adopts a rich-scattering model to overcome the challenge by treating subjects as multiple scatters. Secondly, developing a system that operates effectively in unseen contexts without requiring additional training or parameter adjustments is a substantial challenge. Most existing WiFi-based activity recognition methods rely on features extracted directly from raw CSI, which are susceptible to environmental changes with a degraded performance in new environments without retraining. To address this issue, the system leverages a second-order statistic, the autocorrelation function (ACF), of the CSI and only extracts features caused by the change of the multipath profiles. Unlike raw CSI, the ACF is insensitive to the static subjects and solely reflects the movement of moving subjects, making it well-suited for motion recognition in different environments. Third, accurately recognizing pet motion in real-world scenarios is challenging, especially when their movement path, area, or activities are not restricted. Previous works that aim to recognize pet motion often make unrealistic assumptions about pets' movement, such as assuming a specific path or confined area, considering only walking activity, or requiring pets to remain close to devices quietly for extended periods. The present teaching discloses a new approach that combines physical and statistical features to classify human and non-human motion, and further enhance the classification using a Hidden Markov Model (HMM)-based state machine that leverages temporal information to boost the accuracy. By incorporating temporal information, WI-MOID can accurately and reliably distinguish pet motion from human motion, even when pets move freely and engage in different activities.

Furthermore, designing efficient and accurate algorithms for edge devices like smartphones and IoT systems, which have less processing power and memory than conventional computers, is a challenge. Large deep learning models, while powerful, are often too resource-intensive for these devices. Leveraging effective features with physical and statistical significance, WI-MOID addresses this with a lightweight support vector machine (SVM) model, which requires less computational power and fewer parameters, making it ideal for edge devices. Its minimal latency has been proven in real-world tests, affirming its real-time operation on devices with limited resources.

In some embodiments, WI-MOID can be implemented using commodity off-the-shelf (COTS) WiFi devices. Extensive experiments have been conducted in four typical indoor environments: an apartment, a townhouse, a single-family house, and a typical office space. Most of the data were obtained in NLOS conditions to ensure real-world relevance. WI-MOID demonstrates impressive performance with high validation accuracy and high testing accuracy in unseen environments. The high accuracy, coupled with the environment-independent features, positions WI-MOID as a promising solution for detecting, differentiating, and monitoring human and non-human motion across diverse and pervasive contexts. It offers potential applications in areas such as security, home automation, and activity recognition.

As such, the present teaching discloses a motion detection and recognition system capable of accurately monitoring and recognizing human and non-human subjects. By extracting a wide spectrum of physically plausible and statistical features, WI-MOID can detect and recognize humans, pets, robots, and other electrical appliances, regardless of their position, orientation, and environmental circumstances. In addition, the present teaching discloses an HMM-based state machine that incorporates temporal information to correct misclassifications, enhancing the system's capability to accurately recognize complex motion and improving its overall accuracy and stability in practical applications. In addition, the present teaching discloses a motion classification scheme that identifies human and non-human subjects without relying on data-intensive deep learning methods, and compiled a comprehensive CSI dataset of human motion and various non-human motions. A prototype of WI-MOID is built using readily available COTS WiFi devices and conducted experiments in diverse indoor environments. The results demonstrate high accuracy and suitability for deployment in various settings. Furthermore, WI-MOID can be implemented to run in real-time on various edge devices with limited computing resources and storage, indicating its readiness for ubiquitous deployment.

In some embodiments, the disclosed system not only performs motion classification of human and non-human subjects, but also classifying nonhuman subjects and disclosing a novel state machine based on the Hidden Markov Chain to take into account historical information and temporal characteristics of the outputs, enabling more accurate and stable recognition of moving subjects in the environment. Based on performance evaluation of the system on different sounding rates of CSI, its effectiveness can be demonstrated in the range of 30 Hz to 1500 Hz. Furthermore, one can evaluate the computational resources required for the real-time operation of WI-MOID and show that WI-MOID can run in real-time on commercially available edge devices.

A moving subject can be categorized as either human or non-human, the latter encompassing a range of entities such as pets or vacuum robots. In the following descriptions, human motion refers to a movement of a human body, encompassing activities such as walking, running, and sneaking. In contrast, non-human motion refers to the movement of animate or inanimate subjects, which includes animals, robots, and other physical objects. In some embodiments, the system classifies any motion originating from non-human entities as non-human motion.

Figure 2:
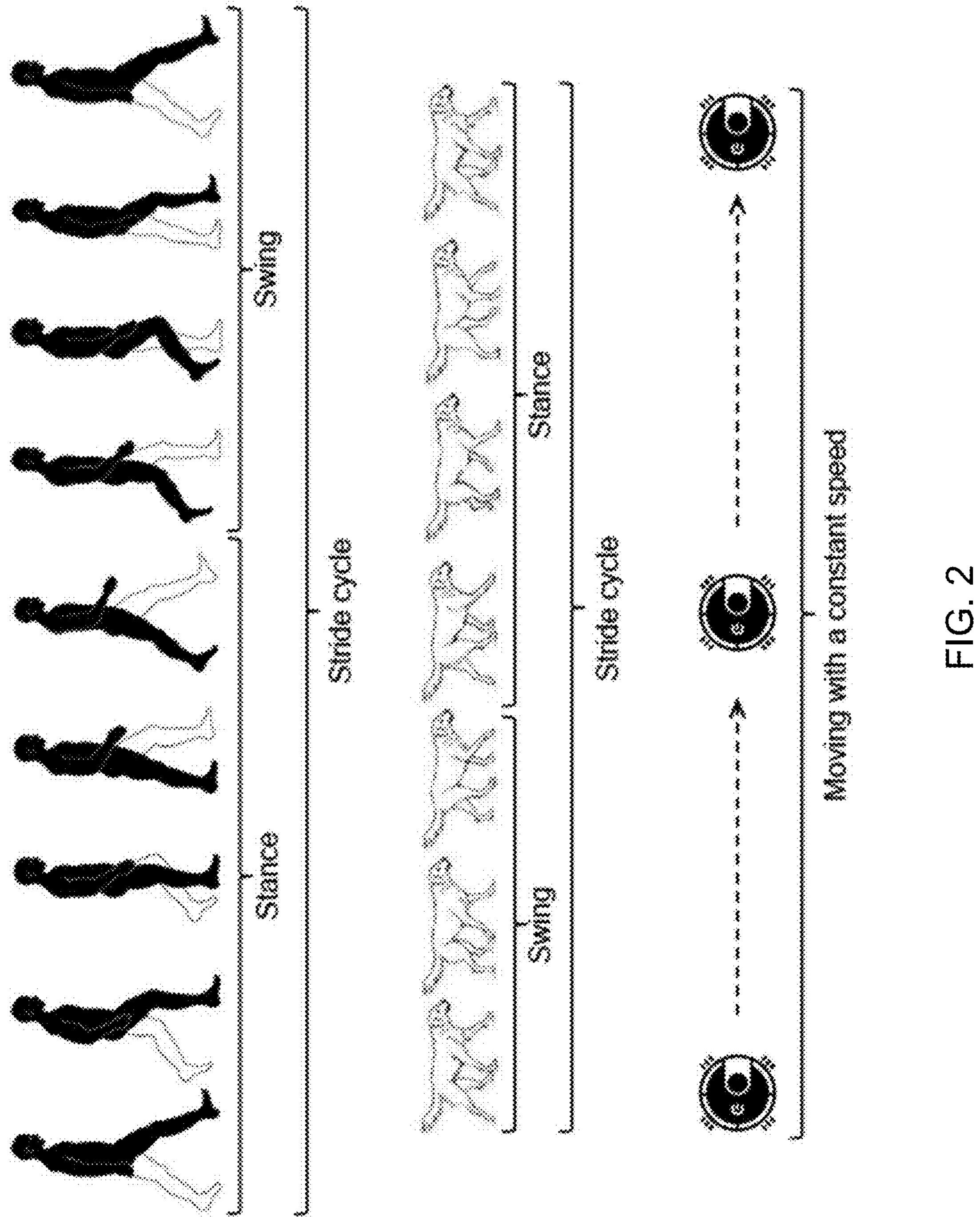
FIG. 2 illustrates moving patterns of human, dog and cleaning robot, according to some embodiments of the present disclosure.

Interestingly, though pets, cleaning robots, and even electrical appliances such as fans can all generate motion that can be picked up by sensing systems, their movements are distinct from those of humans. The differences in gait patterns are a key aspect of this distinction, with humans, pets, and robots each demonstrating unique movement patterns due to their bipedal, quadrupedal, and wheeled locomotion, respectively. These differences are visually represented in FIG. 2. As a result of these disparate movement patterns, the analysis of features like speed patterns becomes an essential factor in differentiating the motion of these subjects.

Figure 3:
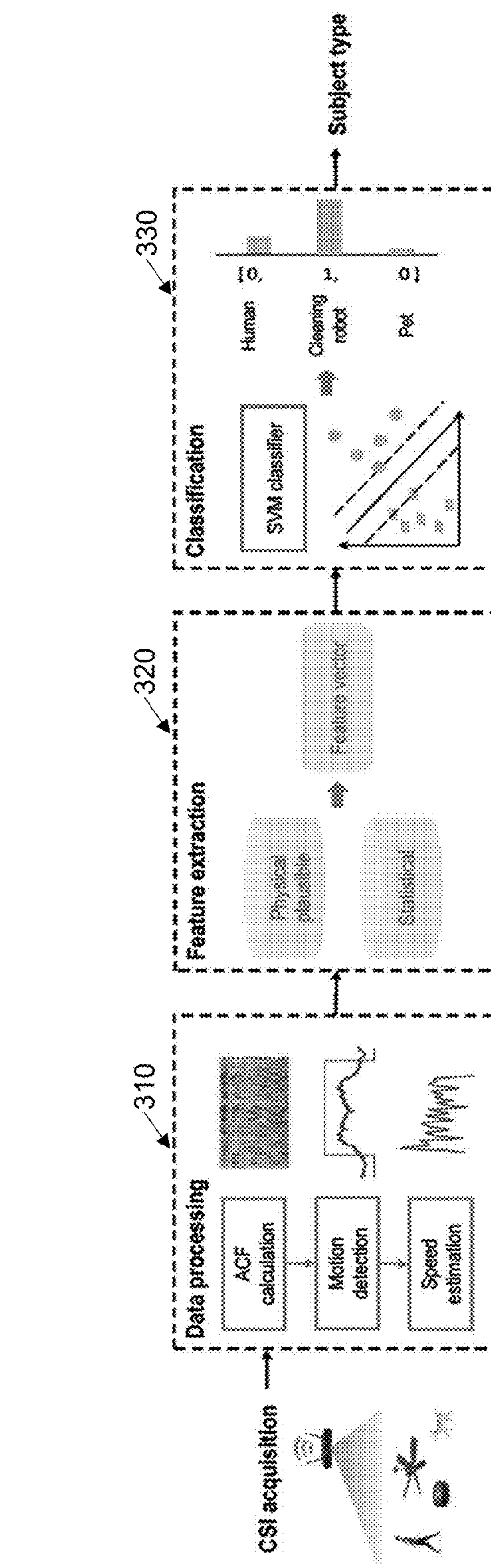
FIG. 3 shows a diagram of an exemplary system for wireless human-nonhuman motion detection, according to some embodiments of the present disclosure.

An overview diagram of the system WI-MOID 300, as illustrated in FIG. 3, is primarily composed of the following three modules.

First, the system 300 comprises a data processing module 310, which preprocesses the CSI received by a receiver. The data processing module 310 computes the ACF of the CSI. Based on the ACF, the data processing module 310 calculates the motion statistic to determine the presence of moving targets in the environment. Additionally, the data processing module 310 can derive the speed of the moving target based on the ACF.

Second, the system 300 comprises a feature extraction module 320, which effectively extracts a series of features from the moving target. Using the ACF, motion statistic, and speed, the feature extraction module 320 can extract physically interpretable features and signal statistical features of the moving target. These features are independent of the environment, location, and direction.

Last but not least, the system 300 comprises a classification module 330, which outputs the final identification result of the detected motion using SVM and a state machine. In some embodiments, the classification module 330 initially uses SVM to classify the features of the target, then employs a state machine to adjust any potential misclassifications based on the transitional features between states, then finally outputs the result.

The present teaching discloses a novel method for detecting the motion of subjects and estimating their speeds through walls, using a single WiFi link.

For wireless communication systems with omnidirectional antennas, the WiFi signal undergoes multiple reflections as it propagates through the indoor environment, resulting from the presence of various reflecting surfaces. The CSI of a WiFi signal provides information about the wireless channel between the transmitter and the receiver. The CSI of the multipath channel at a given time t and frequency f can be expressed as $$H(t, f) = \Sigma_{l=1}^{L} a_l(t)\exp(-j2\pi f\tau_1(t)), \tag{1}$$

where $a_l(t)$ and $\tau_l(t)$ denote the complex amplitude and propagation delay of the l-th multipath component (MPC), respectively, and L stands for the number of MPCs contributing to the CSI.

In order to accurately detect the motion of a subject in an indoor environment, it is crucial to consider the presence of numerous multipath signals arising from rich scattering. A statistical model that account for all these multipath components can be employed to estimate the speed of the target.

In indoor environments, rich scattering occurs due to both static and dynamic scatterers. Static scatterers comprise walls, floors, and stationary furniture, while dynamic scatterers include moving individuals or objects. The superposition principle of electromagnetic (EM) waves allows decomposing CSI as follows:

$$H(t,f)=\Sigma_{i\in\Omega_s(t)}H_i(t,f)+\Sigma_{i\in\Omega_d(t)}H_j(t,f)+\varepsilon(t,f), \tag{2}$$

where Ωs(t) represents the set of static scatterers, Ωd(t) corresponds to the set of dynamic scatterers, $H_i$(t,f) and $H_j$(t,f) represent the contributions of the i-th and j-th scatterers respectively. The noise term, $\varepsilon(t,f)$, is statistically independent of $H_i(t,f)$ and $H_j(t,f)$. Each scatterer acts as a "virtual transmitter", scattering its received EM waves around. The CSI represents the aggregate of the electric fields of all incoming EM waves.

The ACF of the CSI H(t,f) with a time lag $\tau$, denoted as $\rho_H(\tau, f)$, can be determined by calculating the covariance between H(t,f) and H(t+$\tau$,f) divided by the variance of H(t,f) itself. Mathematically, it can be expressed as:

$$\rho_H(\tau, f) = \frac{\mathrm{Cov}\,[H(t, f), H(t+\tau, f)]}{\mathrm{Cov}\,[H(t, f), H(t, f)]} = \frac{\sum_{i\in\Omega_d}\sigma^2_{F_i}(f)J_0(kv_i\tau)+\sigma^2(f)\delta(\tau)}{\sum_{i\in\Omega_d}\sigma^2_{F_i}(f)+\sigma^2(f)}. \quad (3)$$

Here, J0(•) is the Bessel function of the first kind, given by $$J_0(x) = \frac{1}{2\pi}\int_0^{2\pi}\exp(-jx\cos(\theta))d\theta.$$

The term $\delta(-)$ represents the Dirac delta function.

The motion statistic $\phi(f)$ for a subcarrier with frequency f is defined as ACF of the CSI H(t,f) with a time lag of $\tau=1/F_s$, where $F_s$ is the sounding rate. That is, $$\phi(f) \triangleq \rho_H\left(\tau = \frac{1}{F_s}, f\right). \quad (4)$$

Figure 4A:
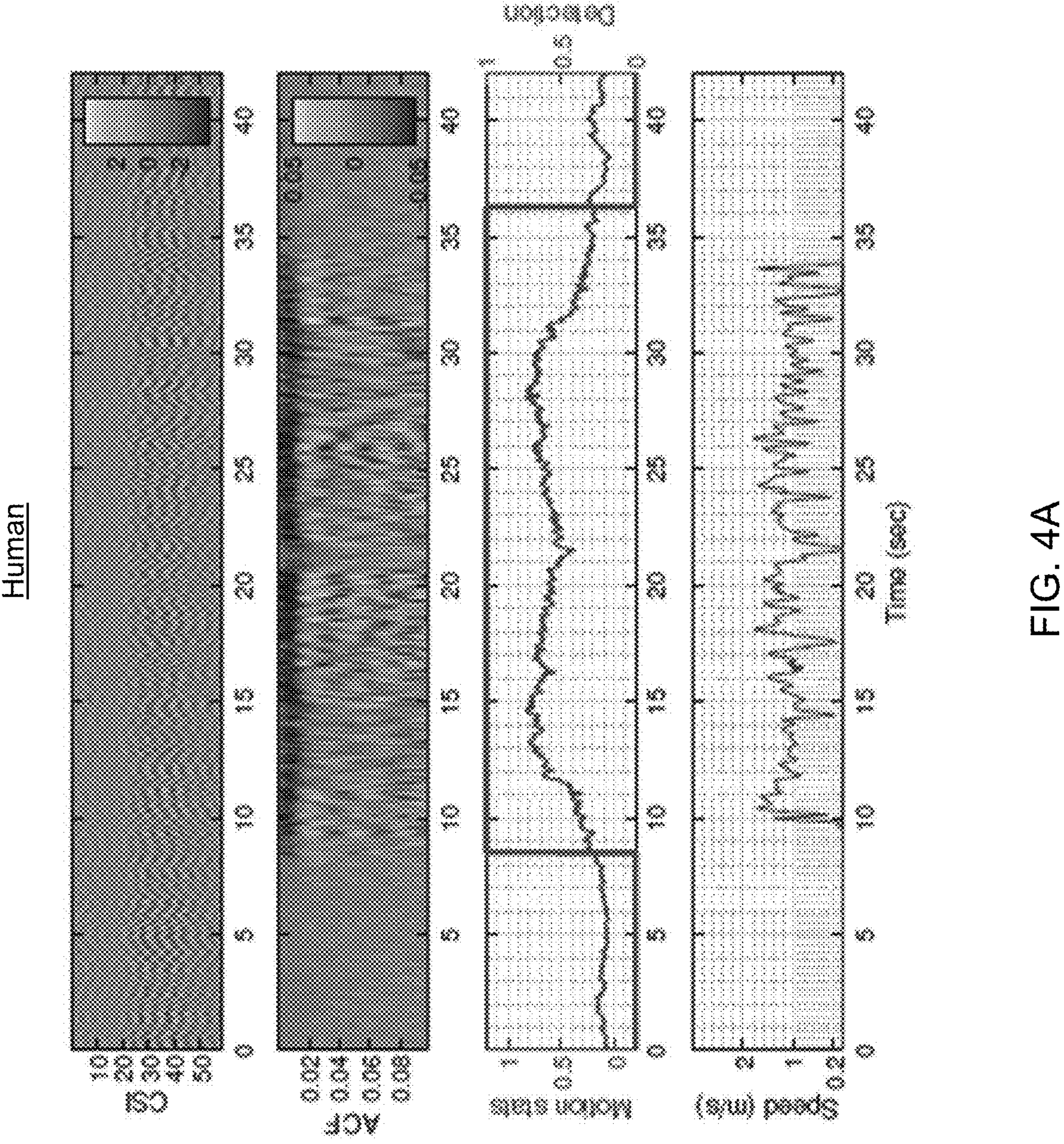
FIGS. 4A-4C illustrate CSI, ACF, motion statistics and speed estimation for human, pet and cleaning robot, respectively, according to some embodiments of the present disclosure.
Figure 4B:
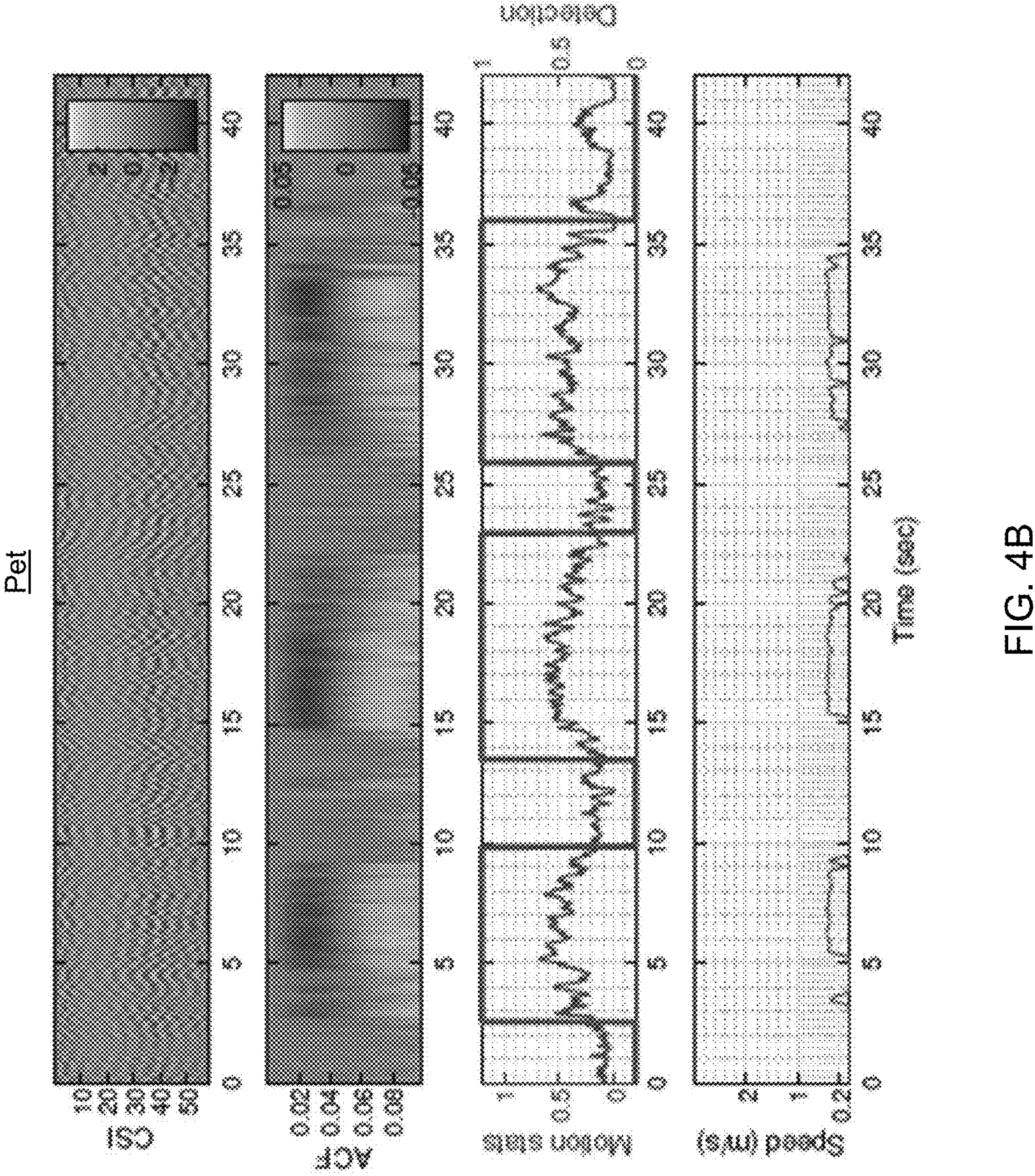
Figure 4C:
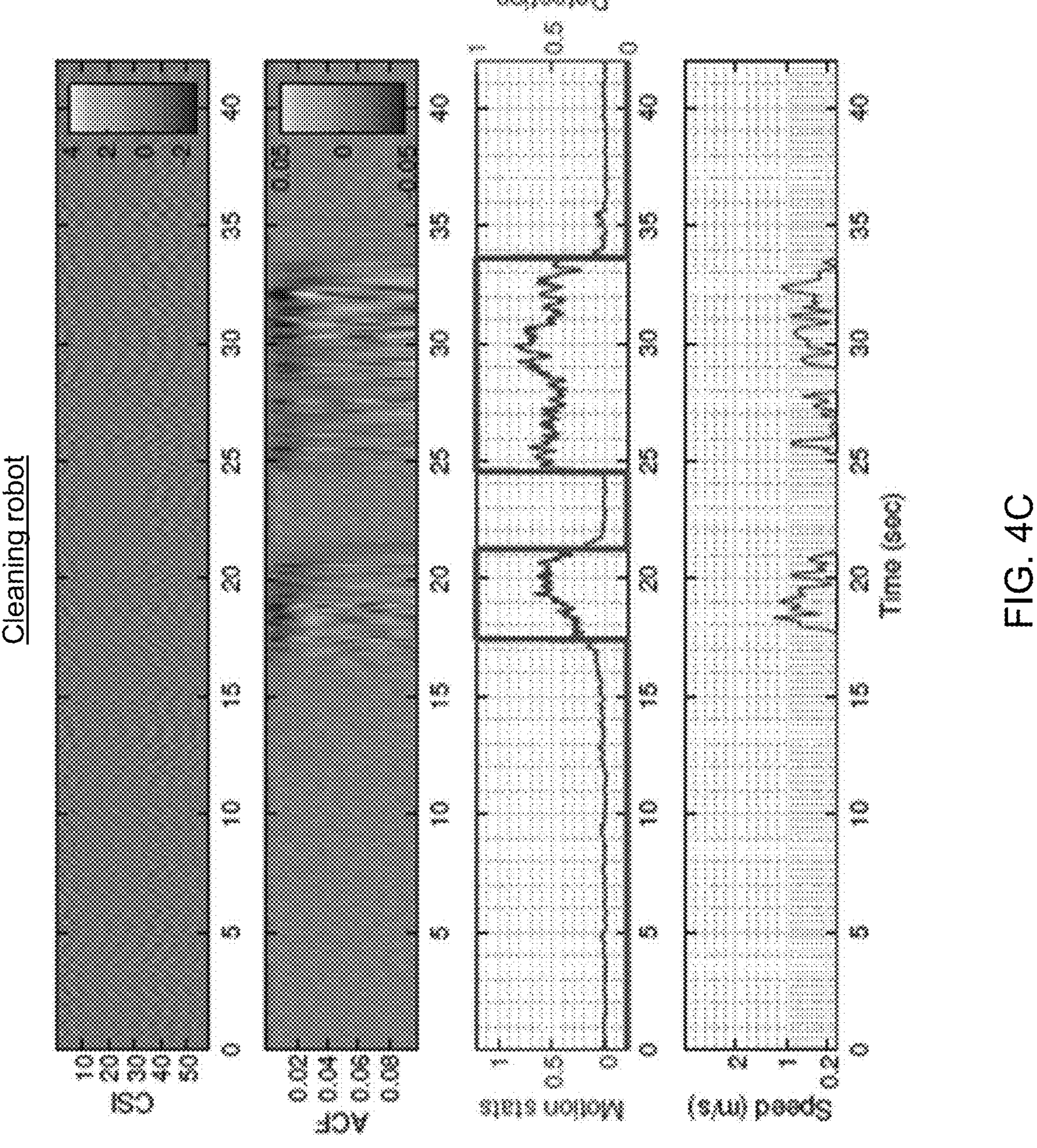

Motion statistics function as a reliable gauge of movement presence or lack thereof within a given environment. In a stationary environment, the motion statistic $\phi(f)$ is close to 0, whereas in dynamic environments with movement, $\phi(f)>0$. FIGS. 4A-4C illustrate the motion statistics of human, pet, and robot movements, respectively.

Despite the discrepancies in size, various subjects are capable of producing similar disruptions across different distances. This is evident from the analogous motion statistics exhibited in FIGS. 4A-4C and FIG. 5A. Consequently, relying solely on motion statistics cannot produce reliable recognition results. Considering that speed can effectively capture the distinct walking patterns exhibited by humans and non-human entities, one can extend the feature set by extracting speed information from WiFi signals.

To approximate the motion speed of a target, one can simplify the ACF of the CSI by employing a motion model that assumes the torso contributes most of the strong scatterers, resulting in $\rho_H(\tau,f)=\alpha(f)\,J_0(kv\tau)$, where $\alpha(f)$ represents the gain of each subcarrier. This function bears resemblance to the well-known Bessel function $J_0$ (x), where $x=kv\tau$. By aligning the position of the first peak or valley of $J_0(kv\tau)$ with that of the Bessel function, the system can estimate the subject's speed. Specifically, the system detects the first peak and calculates the speed as $$\hat{v} = \frac{x_0}{k\hat{\tau}} = \frac{x_0\lambda}{2\pi\hat{\tau}},$$

where $x_0$ denotes the constant value corresponding to the first peak of $J_0(x)$, and $\hat{\tau}$ represents the time lag corresponding to the first peak in $J_0(kv\tau)$. Estimated speeds of human, pet, and robot motions derived from the ACF are depicted in FIGS. 4A-4C, respectively.

Figure 5A:
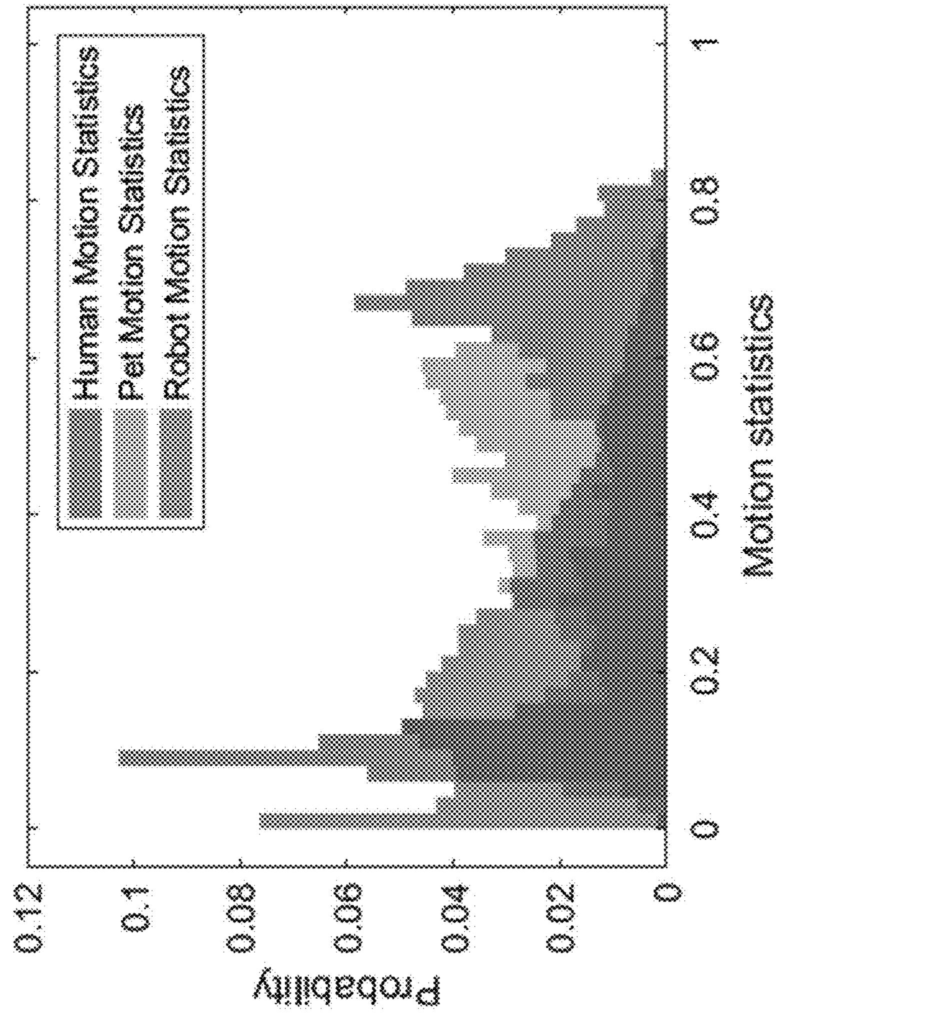
FIGS. 5A-5B show histograms of motion statistics and speed estimations respectively, for human and pet, according to some embodiments of the present disclosure.
Figure 5B:
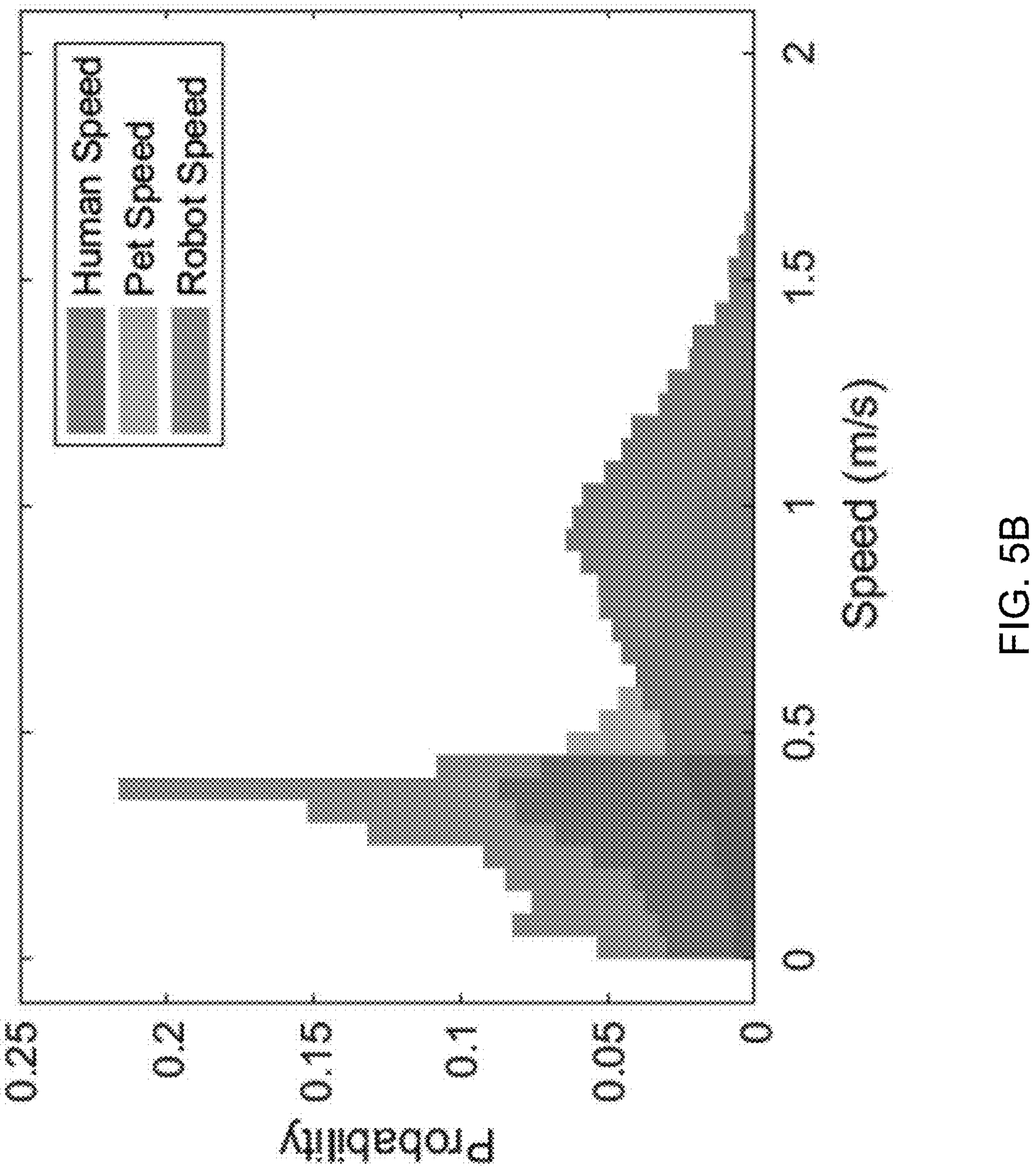

Although estimating the speed of a moving subject provides significant insights for subject differentiation, it is inadequate to rely solely on speed values to distinguish between human and non-human subjects, due to the potential overlap in their speed values, as shown in FIGS. 5A-5B. This is because their movements may exhibit significant overlap in terms of speed values. Therefore, a comprehensive analysis of motion statistics, speed, and ACF patterns over time is imperative for the successful distinction between moving subjects. By extracting features that have physical and statistical explanations from these patterns, the system can enhance discrimination and accurately identify human and non-human subjects. The subsequent section will elaborate on these features and their role in motion classification.

The present teaching also discloses methodology for distinguishing between the motion of human, pet, and cleaning robot. In some embodiments, a set of features is extracted, followed by the development of a recognition model that utilizes the selected features.

A. Feature Extraction

To discern features that can effectively identify movements of human and non-human subjects, one can adopt a two-pronged approach: examination of physical motion characteristics and statistical properties gleaned from CSI. On the physical front, one can delve into gait-related attributes and speed patterns exhibited by the subjects. Statistically, one can scrutinize the statistical features of ACF and changes in motion statistics. This combined approach aims to encapsulate the holistic nature of movement and its impact on the WiFi signal, facilitating accurate identification across varied subjects.

1) Physical Features Extraction: The term 'gait' signifies a pattern of limb movement during locomotion on a solid surface and has proven an effective human identification feature. Humans walk bipedally, pets such as dogs and cats predominantly operate as quadrupeds, and cleaning robots rely on the wheel-based motion. These inherent differences result in unique gait and speed patterns, providing differentiation between humans, pets, and robots.

Figure 6:
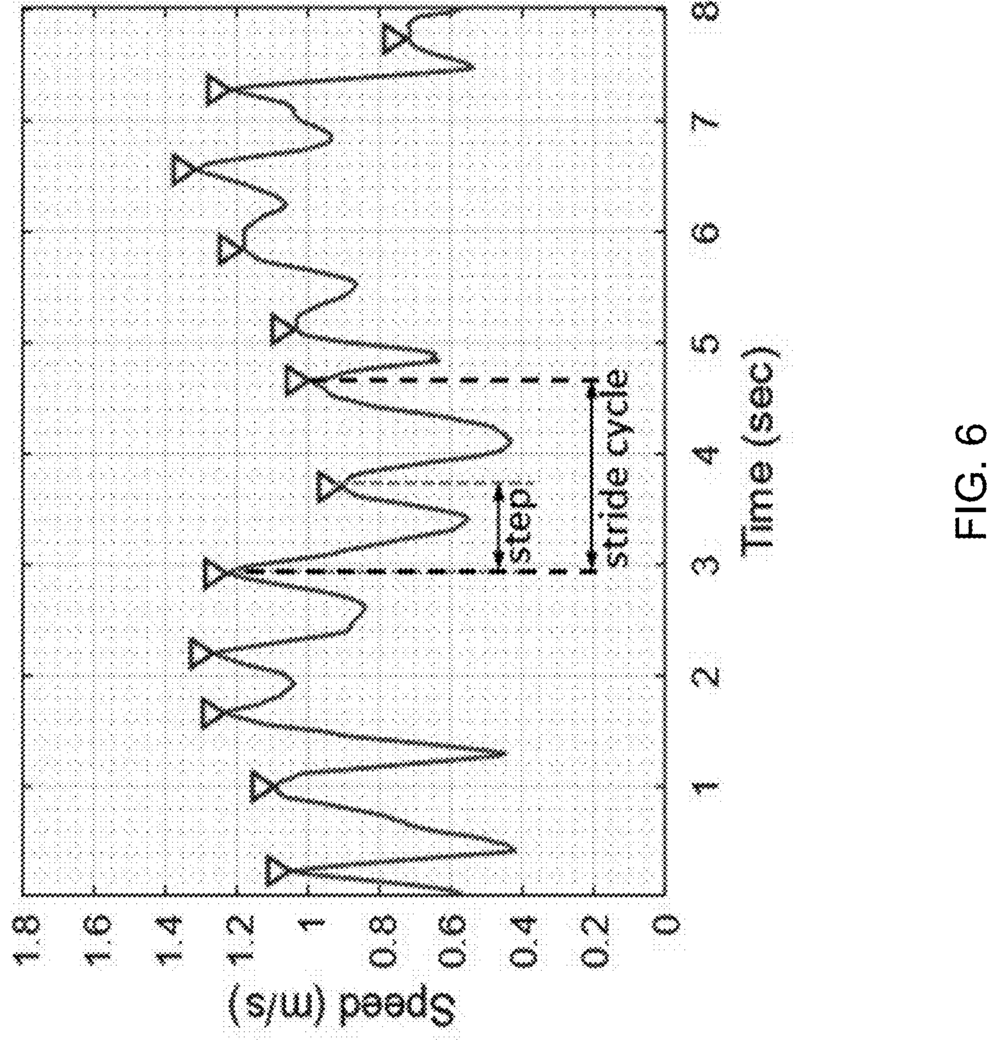
FIG. 6 shows an example of human stride cycle, according to some embodiments of the present disclosure.

In locomotion, the movement pattern of animals' limbs generates the gait, where humans and pets alternate their feet. A stride cycle encompasses a stance phase (foot-ground contact) and a swing phase (foot lift and forward motion). Speed changes are integral to gait, decreasing during the stance phase and increasing during the swing phase, as shown in FIG. 6. In contrast to humans and pets, vacuum robots don't exhibit significant speed fluctuations, enabling their differentiation via gait detection. The system can estimate motion speed using the method described above, identifying patterns of speed through peak and valley analysis. Gait presence was determined by detecting speed fluctuations with distinct ups and downs regularity.

Stride Cycle Time and Stride Length. Stride cycle time and stride length are essential gait indicators. Stride cycle time refers to the duration between the same foot contacting the ground twice, while stride length is the distance covered by a person or animal between two consecutive footfalls. These definitions are applicable to quadruped pets like dogs and cats. Since pets generally have shorter legs than humans, their stride lengths are smaller than that of humans during normal indoor movement.

Figures 7A, 7B:
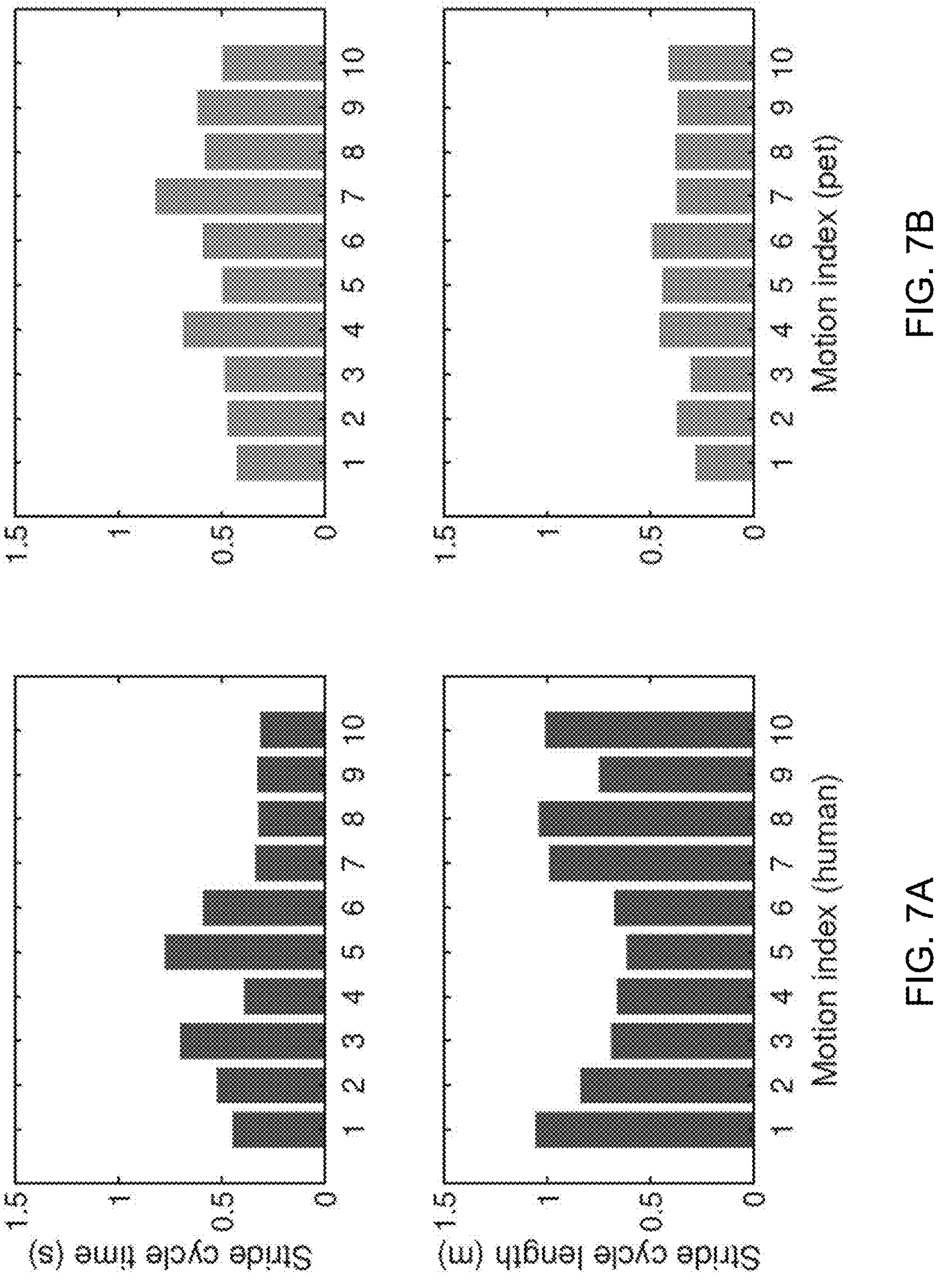
FIGS. 7A-7B show an example of stride cycle time and stride length of human and pet, respectively, according to some embodiments of the present disclosure.

The system can extract these two features from the speed curves to distinguish the movement of human and pet movements. Specifically, the stride cycle time is extracted by calculating the time duration of three consecutive speed peaks. Stride length is the integral of speed value over stride cycle time. FIGS. 7A and 7B illustrate the average stride lengths of human and dog across ten motion instances. It can be observed that although humans and pets may have similar stride cycle times, their stride lengths are significantly different. Pets exhibit much shorter stride lengths compared to humans due to their shorter legs.

Figures 8A, 8B:
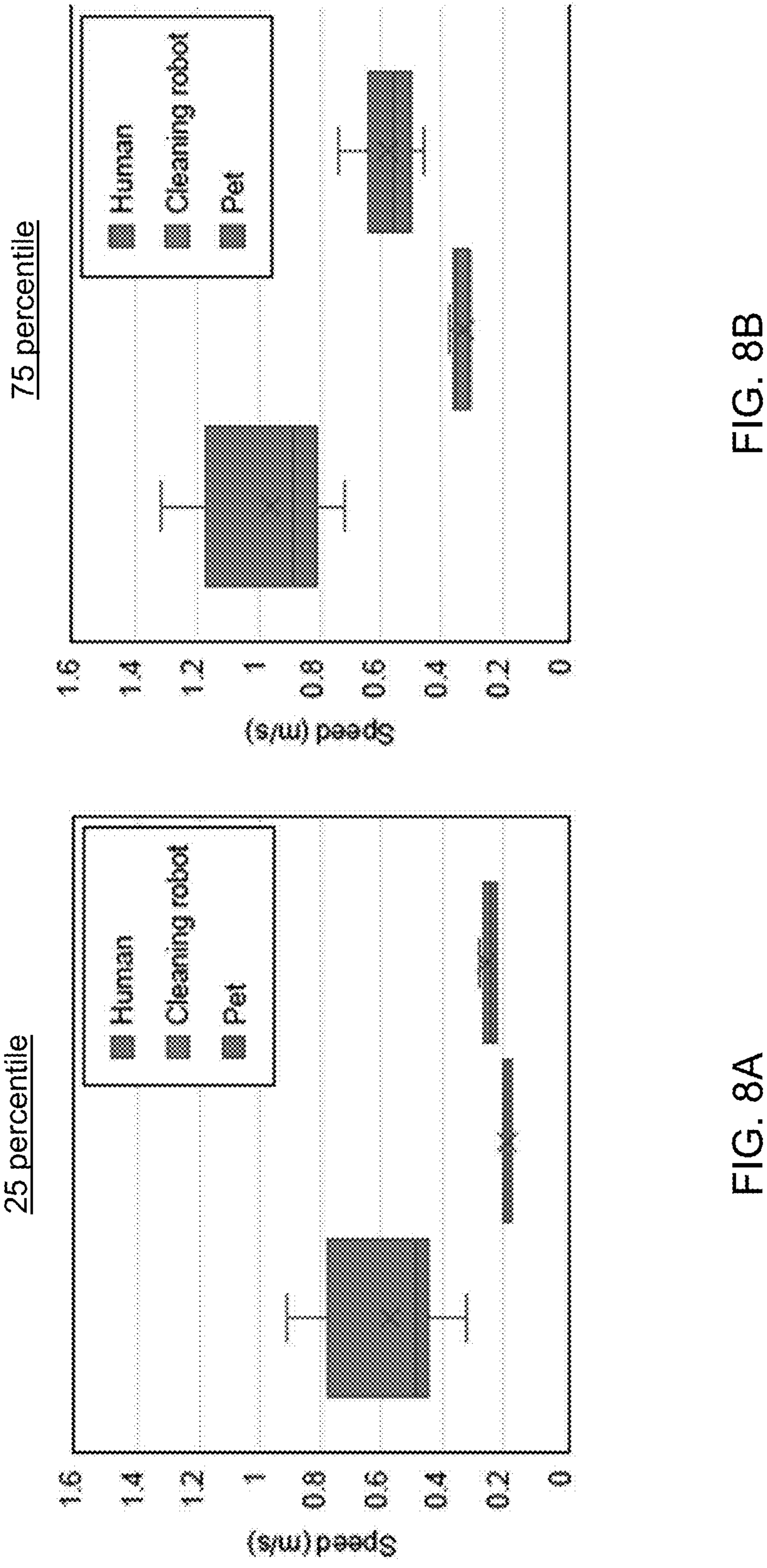
FIGS. 8A-8B show 25 percentile and 75 percentile, respectively, of speed estimations for human, robot, pet, according to some embodiments of the present disclosure.

Speed Mean and Deviation. As wheeled platforms lack feet, vacuum robots typically maintain a constant speed while moving from one location to another and slow down when encountering obstacles. Therefore, speed-based features are analyzed to differentiate between the movements of vacuum robots and humans. The average speed is calculated as the mean of the instantaneous speeds of a moving target during a particular time window. Additionally, speed deviations are taken into account to distinguish between the motions of humans, pets, and robots, as depicted in FIGS. 8A-8B. Specifically, the system can estimate the variance, 25th percentile value, and 75th percentile value of the speed in the time window as features of speed deviations, as shown in FIGS. 8A-8B.

Vacuum cleaners, being wheeled, lack feet and maintain relatively constant speeds, slowing only when meeting obstacles. Hence, one can employ speed patterns to distinguish between vacuum robot and human movements. Specifically, the average speed and speed deviations are extracted. The average speed is derived from the mean of a target's instantaneous speeds within a specific time window. As for speed deviation, the system can estimate the variance, 25th and 75th percentile value of speed, as shown in FIGS. 8A-8B.

2) Statistical Feature Extraction: In most cases, human and pet movements exhibit distinctive gait features. However, certain actions such as drinking, eating, and tail wagging do not demonstrate gait characteristics. Therefore, to augment distinction capability, the system further exploits other features such as statistical properties derived from the ACF and motion statistics of CSI. These attributes prove valuable in situations where speed estimation is not reliable, such as when subjects are too distant for accurate gait estimation.

Figures 9A, 9B, 9C:
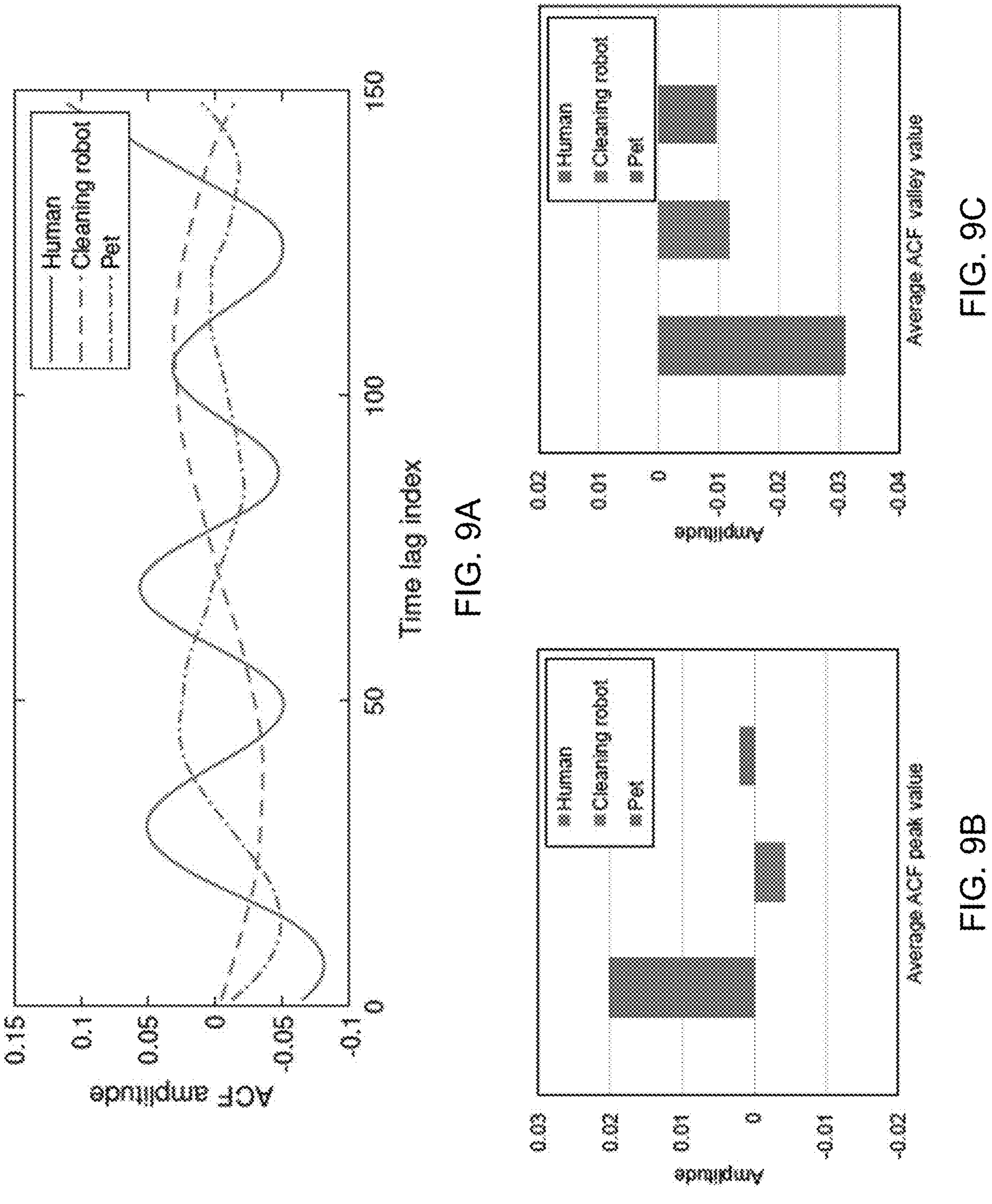
FIGS. 9A-9C show ACF at a time instance, average ACF peak value, and average ACF valley values, respectively, of human, robot, pet, according to some embodiments of the present disclosure.

ACF Features. ACF of CSI serves as an advantageous statistic since it encapsulates a wealth of information regarding the subject's motion, while its sensitivity to location and environment is minimal. As such, the system extracts features based on ACF or a function of the ACF. Some observations reveal that the movements of humans, pets, and robots uniquely impact the amplitude and frequency of ACF peaks at each time step. This distinction is evidenced by the variances in the amplitude and time lag of ACF peaks and valleys across different types of movements, as depicted in FIG. 9A. To leverage these distinctions, the system can extract the mean values of ACF peaks and valleys separately for each movement type, as shown in FIGS. 9B and 9C. These features provide a comprehensive representation of the unique characteristics of human, pet, and robot movements and enable effective differentiation between different motion types in various environments.

Motion Statistic Features. In addition to the ACF-based features, motion statistics also provide valuable insights into the statistical characteristics of the impact of the subject's movement on the CSI. This assists in refining the system's ability to identify human and non-human movements. To capture these statistical characteristics, the system can compute motion statistics according to Eqn. (4) and extract their mean and variance as additional features. The statistical features enhance the system's resilience to variations in the environment, making it more adaptable to real-world scenarios.

B. Recognition Model Design

SVM is a supervised learning model that utilizes associated learning algorithms to classify and perform regression analysis on data. In some embodiments, a disclosed SVM model uses a feature vector consisting of 11 features, including gait existence, stride length, stride cycle time, average speed, speed variance, speed 25 percentile, speed 75 percentile, ACF peaks mean, ACF valleys mean, motion statistic mean, and motion statistic variance. During the training phase, the system trained SVM models employing Linear kernel or Gaussian kernel, and the best model was chosen via a grid search complemented by 5-fold cross-validation. Concurrently, the features underwent standardization. The trained SVM model was subsequently tested in unknown environments, with no further training or parameter adjustments.

C. State Machine

In some cases, distinct continuous gait features are not available due to irregular motion during walking/running/slow moving, such as stopping, turning around, etc. Consequently, the classifier may misclassify humans as non-human due to the lack of obvious gait features and the presence of small motions. To address this challenge, the system utilizes a state machine based on HMM.

In the disclosed state machine, the parameters are estimated using the maximum likelihood estimation method to determine the most likely probability of the observation sequence occurring. Let the emission probability $b_j(k)$ represent the probability of observing symbol k in state j. It can be estimated as:

$$b_j(k) = \frac{c_j(k)}{\sum_{k=1}^{M} c_j(k)},$$

where $c_j(k)$ denotes the number of times symbol k is observed in state j, and M represents the total number of symbols. The transition probability $a_{i,j}$ represent the probability of transitioning from state i to state j, and can also be estimated as $$a_{i,j} = \frac{c_{i,j}}{\sum_{j=1}^{N} c_{i,j}},$$

where $c_{i,j}$ is the number of transitions from state i to state j, and N denotes the total number of states.

By leveraging the Hidden Markov State Machines, the system can enhance the performance of the disclosed classifier and minimize the occurrence of misclassifications due to irregular human motions.

To evaluate the disclosed system WI-MOID, one can use some evaluation methodologies, including experiment settings, data collection, and metrics. In some embodiments, to evaluate the disclosed system, one can utilize off-the-shelf WiFi devices, to implement WI-MOID and perform experiments in four representative indoor environments. Specifically, Scenario I corresponds to a 76.96 m2 apartment, Scenario II corresponds to a 70.64 m2 townhouse, Scenario III corresponds to a 40.27 m2 single-family house, and Scenario IV corresponds to a 200.75 m2 office building. To obtain data from different locations and heights, one can employ one transmitter and two to three receivers in every data gathering session. Receivers were positioned 4 to 10 meters from the transmitter at heights varying between 0.3 m and 1 m, considering the presence of walls. Note that although multiple transceiver pairs are used in each session to improve efficiency and diversity, the CSI data from different pairs are not combined. The feature extraction and recognition processes are performed based on a single-pair WiFi transceiver. The CSI data was collected on 5.8 GHz channels with a bandwidth of 40 MHz and a sounding rate of 1500 Hz. In each scenario, the movement areas for humans, pets, and vacuum robots are highlighted.

In some embodiments, one can gather motion data from two human subjects of respective heights 170 cm and 187 cm, one male and one female, alongside a dog approximately 1 meter in length, and an iRobot i3 vacuum cleaner. All data collection was conducted in a natural manner without any restrictions. Specifically, the human movement data was captured while individuals freely walked around the environments, with the freedom to roam and stop at will. They engaged in various activities such as using mobile phones or playing games. Continuous data collection was performed for the dog's movement throughout the day as it walked around, ate, drank, and wagged its tail as usual. One can gather the vacuum cleaner's motion data when it was cleaning the floors furnished with items like tables and chairs, with the robot moving freely within the accessible spaces to perform its task.

In some embodiments, one can conduct the experiments over a period of six months, where the subjects initiated their movements from arbitrary locations. Movement durations ranged from 2 seconds to several minutes during each data collection session. In total, one can accumulate approximately 287 minutes of human motion data, 185 minutes of pet motion data, and 100 minutes of robot motion data. The motion statistics are applied to detect motion and segmented the data into 6-second instances. This yielded 2318 instances of human motion data, 493 instances of pet motion data, and 796 instances of robot motion data. For the training and validation process, one can randomly allocate 90% of the data from Scenarios I and II to form the training dataset, reserving the remaining 10% for validation. One can use Scenarios III and IV data exclusively to test the model's resilience to unknown environments, excluding them from the training or validation phases.

To evaluate the model's adaptability to a variety of human motion types, one can gather 356 instances of sneaking and 367 instances of running data in Scenarios II and III. Additionally, 306 instances of ceiling fan motion were collected in Scenarios I and III to evaluate the model's versatility in recognizing various non-human subject movements. The diverse human and fan motion data, collected in Scenarios I and II, were incorporated into the training and validation datasets. Conversely, data from Scenario III were leveraged to assess the model's performance in an unknown environment, offering a comprehensive evaluation of its ability to generalize and adapt.

The effectiveness of WI-MOID is gauged through the following key metrics. First metric is Recall or True Positive Rate (TPR) which represents the likelihood of the system correctly identifying the target. Second metric is Precision, alternatively termed as Positive Predictive Value (PPV), which signifies the proportion of accurate recognition results for a specific class. Third metric is Accuracy, which is the ratio of correctly identified data to the total data pool. Fourth metric is False alarm or False Positive Rate (FPR), which measures the probability of the system misidentifying the target's motion.

The system's performance is considered improved when there is an increase in accuracy, precision, and recall, along with a decrease in the false alarm rate. These metrics collectively serve as a measure of the system's efficacy.

To evaluate the effectiveness of WI-MOID, one can conduct experiments using data collected from Scenarios I and II as the training and validation dataset. Firstly, one can extract features from the data and trained SVM models with different kernels. To ensure the model's ability to generalize, one can incorporate a 5-fold cross-validation strategy to randomize the training and validation dataset. The model that demonstrated the highest validation accuracy was chosen as the final model. The optimal SVM model's performance was gauged by its accuracy, precision, recall, and false alarm rate. The result shows that WI-MOID achieved high validation accuracy of 97.34%, paired with a minimal false alarm rate of 1.75%, indicating its ability to accurately identify the motion of human and non-human subjects.

To assess the generalizability of the trained model across new contexts, one can employ a testing dataset gathered from previously unobserved settings (Scenarios III and IV). The model's testing accuracy was ascertained without further retraining One can observe from the result that the pre-trained model achieved a high testing accuracy and precision of 92.61% and 93.93%, respectively, along with a low false alarm rate of 3.66%. These results demonstrate the robustness of WI-MOID in recognizing humans, pets, and robots through walls in new environments. Furthermore, they confirm that the trained model is resilient to environmental changes and independent of the training environment. This attribute facilitates quick and effortless deployment in new contexts, obviating the need for additional user exertion.

While pets and robots are typically the primary sources of non-human motion in indoor scenarios, electrical appliances such as fans can also introduce motion. Therefore, it is necessary to evaluate the robustness of the disclosed algorithms in recognizing motion caused by electrical appliances. In particular, one can assess the robustness of WI-MOID to fan motions. To achieve this, one can gather 306 instances of CSI data while the fan was operating in the environment. The results of validation accuracy, testing accuracy, and false alarm rate, show that: even with the inclusion of fan motion, the validation and testing accuracies remain high, and the false alarm rate is low. These results indicate that the disclosed model is adaptable to other electrical appliances' motion, such as fan motion, due to the effectiveness of the disclosed features. The disclosed approach encompasses the extraction of attributes that carry physical significance and simultaneously encapsulates statistical elements. These elements effectively mirror the influences of both human and non-human movements on the CSI within the environment. Since electrical appliances typically operate continuously and periodically, they affect the statistics differently from human motions, allowing the disclosed model to robustly distinguish electrical appliances' motion from human motion.

To gauge the disclosed model's flexibility in handling other human motion types, one can incorporate sneaking and running activities into the experimental setup. A total of 106 minutes of CSI data encapsulating these motions was collected, to extract 723 6 second instances representing various human movements. The system trained and validated the SVM model using various human motion data from Scenario I and II. The model's robustness was further assessed by testing it with data from Scenarios III and IV, which were not part of the initial training set. All data subsets utilized for training, validation, and testing comprised an all-encompassing array of human movements, inclusive of walking, running, and sneaking. The results revealed a high recognition accuracy of 92.55% even with the inclusion of more diverse human motion types. This underscores the adaptability of WI-MOID to accommodate a variety of human movements.

To evaluate the effectiveness of the disclosed state machine, one can compare the recognition accuracy of WI-MOID with and without the state machine. The results of the accuracy and false alarm rates for human, robot, and pet recognition demonstrate that the state machine improves the recognition accuracy of human, robot, and pet by 1.67%, 1.85%, and 17.98%, respectively, compared to the system without the state machine. The state machine improves the accuracy of pet recognition significantly by addressing the challenges posed by pet motion, which are difficult for SVM classifiers to handle. Specifically, pets can be misclassified as humans due to their similar gait patterns, and they can also be mistaken for cleaning robots when they move slowly or wave their tails, generating small motions that can interfere with CSI signals in a manner similar to cleaning robots. In addition, the disclosed state machine reduces the false alarm rates of human, robot, and pet recognition by 1.16%, 2.56%, and 1.97%, respectively. The reduction in false alarms and the increase in human detection accuracy are particularly noteworthy since the state machine helps avoid misclassifying cases where human motion lacks an obvious gait pattern. These results demonstrate that the state machine effectively improves recognition accuracy and reduces the false alarm rate, enhancing the robustness and reliability of WI-MOID.

To evaluate the effectiveness of the features designed in the disclosed model, one can conduct a comparative analysis utilizing a model trained with a 95% Principal Component Analysis (PCA) driven approach, which was designed to decrease the feature vector's dimensionality. This strategy preserved only the principal components accounting for 95% of the total variance. The SVM model underwent retraining with the condensed feature set, using the identical dataset. The comparison results demonstrate that the accuracy of the PCA-trained model was lower than that of the original model that utilized the designed features. This observation indicates the effectiveness of the designed features, which contributes to the high accuracy of disclosed model.

In some embodiments, one can investigate the impact of the length of motion segments on the performance of WI-MOID. Results indicate that the length of motion segments does not have a significant effect on the accuracy of the system. While shorter motion segments may provide more specific information about the motion, longer motion segments may offer a broader perspective of the overall motion. However, the findings suggest that neither length leads to a significant difference in the accuracy of the system. Therefore, WI-MOID is robust to variations in the length of motion segments, ranging from 6 seconds to 25 seconds, and can accurately analyze motions of different durations.

In some embodiments, one can explore the impact of different sounding frequencies on performance. One can compare the detection rate and false alarm rate of WI-MOID at four different sounding frequencies: 1500 Hz, 500 Hz, 100 Hz, and 30 Hz. The results demonstrate that the disclosed algorithm achieves high accuracy and low false alarm rates across a range of sounding rates, with accuracy improving as the sounding rate increases. Notably, one can also observe that the algorithm's accuracy remains satisfactory even at low sounding rates, indicating its robustness to variations in data acquisition frequency. This suggests that the algorithm can be effectively used in resource-constrained scenarios where high sounding rates may not be feasible due to memory or power limitations, without compromising its accuracy. Therefore, the disclosed algorithm offers a scalable solution for real-time data processing applications on resource-constrained edge devices.

The computational efficiency and storage requirements of the disclosed algorithm were evaluated on commercialized edge devices with Marvell chipset. The results indicate that the algorithm is highly optimized for edge computing, with minimal CPU consumption and storage usage. This makes it an ideal candidate for deployment on resource-constrained edge devices. Moreover, the algorithm's scalability enables it to adapt to varying requirements and device specifications, making it a versatile solution for real-time data processing at the edge.

WiFi has grown increasingly prevalent as the principal mode of communication, available virtually everywhere Channel State Information (CSI) carries information about its surroundings, thereby allowing it to "visualize" objects within the environment. This has made many applications possible through WiFi sensing. In contrast to cameras or millimeter-wave radar, WiFi has a broader coverage area and can operate under both line-of-sight (LOS) and non-line-of-sight (NLOS) conditions, providing a superior level of privacy protection. However, the majority of WiFi sensing applications assume that any motion within the environment is due to human activity, without thoroughly taking into account the impact of non-human subjects. This stems from the difficulty in distinguishing between human and non-human subjects using WiFi, as both can induce similar variations in the CSI. Yet, non-human elements like pets, robotic vacuums, and fans are ubiquitously present in diverse environments. Therefore, it is essential to develop an algorithm capable of differentiating between human and non-human subjects.

Present efforts to distinguish between human and nonhuman subjects using WiFi generally fall into two categories: traditional model-based and machine learning-based. The traditional model-based methods, although providing good interpretability, demand precise placement and height of equipment, and their effectiveness diminishes with increasing environmental complexity. In contrast, machine learning-based methods, utilizing extracted meaningful features, can mitigate the limitations imposed by equipment placement and environmental constraints, thereby exhibiting a wider range of applicability. Relying on hand-crafted features, these methods retain as good interpretability as model-based methods. However, traditional machine learning models' performance hinges on the efficacy of these manually designed features. Their performance is compromised when these features cannot be accurately derived from the data. Moreover, models based on traditional machine learning classifiers such as Support Vector Machines (SVM) tend to perform poorly with classification issues exhibiting considerable overlap and struggle with data that is not linearly separable.

In recent years, deep learning models have achieved remarkable success in domains such as image and speech processing, showcasing their potent ability to extract and classify features from high-complexity and high-dimensional data. This has sparked interest in the realm of WiFi sensing, with many studies, increasingly employing deep learning. But these works merely adopt a specific preexisting network framework. Although various types of deep learning models have excelled in fields like image processing and language learning, current WiFi sensing studies have not extensively compared the performance of different models on their tasks, leading to a dearth of exploration on the suitability of different models for WiFi sensing tasks. Additionally, most deep learning-based WiFi sensing tasks at present rely on raw CSI as input, unable to mitigate the impact of environmental factors on feature extraction. Consequently, trained networks often falter when transposed into new environments. While various strategies for domain adaptation are proposed, they necessitate extensive user data to retrain or tweak the model in a new environment.

The present teaching discloses a framework utilizing deep neural networks to recognize motion from human and non-human subjects with WiFi signals. A disclosed method utilizes the Amplified Auto-correlation Function (A-ACF) extracted from CSI as the network input, enabling the network to extract only the features associated with the subject's movement, independent of the subject's location, orientation, and environmental changes. The disclosed system can utilize two major categories of deep learning models, convolution-based ones from image processing and recurrent neural network-based ones from natural language processing. One can evaluate the performance of these models in human and non-human recognition tasks, as well as their computing resource requirements. In addition, the effectiveness of transferring pre-trained models in the image processing field to WiFi sensing tasks is validated.

In some embodiments, the present teaching discloses an environment-robust indoor subject classification algorithm. By designing the Amplified Autocorrelation Function (ACF) of Channel State Information (CSI) as the network input, the algorithm effectively extracts features of moving subjects for identification. As these features are independent of environmental conditions, location, and orientation, the model is immune to variations in the environment. Furthermore, the efficacy of different neural networks is compared in identifying human and non-human subjects in various environments using WiFi. The network's performance was extensively evaluated under known and unknown environments, including situations with unseen subjects and multiple concurrent subjects in unseen settings. The viability of transferring pre-trained models from image processing tasks to WiFi datasets is explored accordingly.

In some embodiments, WiFi signals, originating from a transmitter, traverse the environment by reflecting multiple times off various surfaces, including people and objects, before reaching the receiver. WiFi-based sensing systems operate by analyzing the influence of these people or objects on the propagation of WiFi signals, thereby detecting their movements and changes. Given that CSI encapsulates the direct propagation of signals between the transmitter and receiver—and mirrors the processes of reflection, scattering, and attenuation during this propagation—it is commonly employed as the input for WiFi-based sensing systems. Due to the multipath effect, CSI is generally represented as a collection of radio propagation along different paths:

$$H(t,f)=\Sigma_{l=1}^{L}\alpha_1(t)e^{-j2\pi f\tau_1(t)}, \tag{5}$$

where $\alpha_l$ is the multipath coefficient of the l-th component and $\tau_l$ is the associated propagation delay.

In practice, since the imperfect synchronization of the commercial WiFi devices often results in random noise in the CSI phase that is difficult to be efficiently cleaned, researchers usually rely on the more reliable CSI amplitude, which can be measured through the power response $$\begin{aligned} G(t,f) &\triangleq \left|\tilde{H}(t,f)\right|^2 \\ &\triangleq |H(t,f)|^2+n(t,f), \end{aligned} \tag{6}$$

where n(t,f) is the additive white Gaussian noise (AWGN) with power density of $$\sigma_n^2(f)$$

and is statistically independent of $|H(t,f)|^2$.

As CSI embodies the cumulative impact of the environment on signal propagation, it incorporates not just the influence of dynamic entities in the environment on the signal, but also the impact of static objects such as walls, furniture, and floors. Consequently, WiFi sensing systems that utilize CSI as direct input are heavily subject to environmental influences. They exhibit subpar domain adaptation capabilities and necessitate data collection and retraining in new environments. This hampers their ability to be swiftly deployed and utilized in new environments.

Extracted CSI are different for different moving subjects, including: human movement, pet activity, and a robot vacuum cleaner operation, in an environment A and an environment B. The furniture in environment B was moved between each data collection session. Based on CSI observation, environmental factors dominate CSI variations, substantially overriding the effects of different moving subjects, making it hard to extract motion related features. Therefore, it is crucial to eliminate the dependency of environmental contexts for WiFi sensing systems to extract intrinsic statistics related for motion analytics and to enhance accuracy and deployment feasibility.

In order to segregate the influences of static environments and dynamic entities on the signal, the system can first calculate the Auto-Correlation Function (ACF) of CSI that solely encapsulates the characteristics of dynamic subjects. Then, the system computes a robust statistic, A-ACF (Amplified ACF), to amplify the characteristics of dynamic subjects and facilitate the analysis of motion patterns. Specifically, one can extract the ACF of G(t,f) as:

$$\begin{aligned} \rho_G(\tau,f) &= \frac{\operatorname{cov}[G(t,f),G(t+\tau,f)]}{\operatorname{cov}[G(t,f),G(t,f)]} \\ &= \frac{\sigma_s^2(f)}{\sigma_s^2(f)+\sigma_n^2(f)}\rho_s(\tau,f)+\frac{\sigma_n^2(f)}{\sigma_s^2(f)+\sigma_n^2(f)}\delta(\tau) \end{aligned} \tag{7}$$

where $\tau$ is the time lag.

$$\sigma_s^2(f)$$

and $\rho_s(\tau)$ is the variance and ACF of the propagated signal, respectively. The normalized channel gain at frequency f is defined as $$w(f)=\frac{\sigma_s^2(f)}{\sigma_s^2(f)+\sigma_s^2(f)}.$$

In order to better extract features of the moving subjects, one can employ a Maximum Ratio Combine (MRC) approach on the ACF. This amalgamation across all subcarriers enhances the Signal-to-Noise Ratio (SNR) of the ACF, thereby accentuating the impact of the moving subject on the signal. The aggregated ACF after MRC is represented as follows:

$$\begin{aligned}\hat{\rho}_s(\tau)&=\sum_{i=1}^{N_s}w(f_i)\rho_G(\tau,f_i)\\&=\sum_{i=1}^{N_s}\frac{\sigma_s^2(f)}{\sigma_s^2(f)+\sigma_s^2(f)}\rho_G(\tau,f_i)\end{aligned},\tag{8}$$

where $N_s$ is the total number of subcarriers. When $\tau\to 0$, one can have:

$$\lim_{\tau\to 0}\rho_G=w(f_i)\lim_{\tau\to 0}\rho_s(f_i).\tag{9}$$

Since the movement of the subject is continuous, one can have $\lim_{\tau\to 0}\rho_s(f_i)=1$ and then $w(f_s)=\lim_{\tau\to 0}\rho_G$. When the sounding rate $F_s$ is high, one can estimate $w(f_i)$ by $$\rho_G\left(\tau=\frac{1}{F_s},\ f_i\right).$$

Then the aggregated ACF can be estimated by:

$$\hat{\rho}_s(\tau)=\sum_{i=1}^{N_s}\rho_G\left(\tau=\frac{1}{F_s},f_i\right)\rho_G(\tau,f_i).\tag{10}$$

In some embodiments, one can take the differential of aggregated ACF $\hat{\rho}_s(\tau)$ to amplify the speed information. Using $\Delta\rho(\tau)$ to denote $$\frac{d\rho(\tau)}{\rho(\tau)},$$

one can express the A-ACF as $\Delta\hat{\rho}_s(\tau)$.

Comparing the results after extracting A-ACF from the CSI data with the original CSI data, it becomes apparent that the motion characteristics of the same type of subject in different environments are similar. Meanwhile, the A-ACF patterns of different moving subjects show significant discrepancies, irrespective of whether they are in the same or different environments.

As the A-ACF exclusively encapsulates the dynamic features associated with subject movement, devoid of any environmental or directional information pertaining to the subject, the disclosed WiFi sensing system, utilizing A-ACF as input, is immune to variations in the environment and the positioning of subjects. In some embodiments, the system focuses on extracting the more intrinsic features correlated to the movement of subjects, disregarding aspects such as the subject's orientation, position, and the surrounding environment. This independence empowers the disclosed system to be rapidly and efficiently deployed within new environments.

Subsequently, the system can derive the robust motion statistic from the A-ACF and utilize it to detect and segment motion-containing fragments. For the power response G(t,f), the robust motion statistic derived from its ACF at time t over subcarrier $f_i$ is defined as $$\phi_G(f)\triangleq\rho_G\left(\tau=\frac{1}{F_s},f\right),\tag{11}$$

where $F_s$ is the sounding rate.

Figure 10:
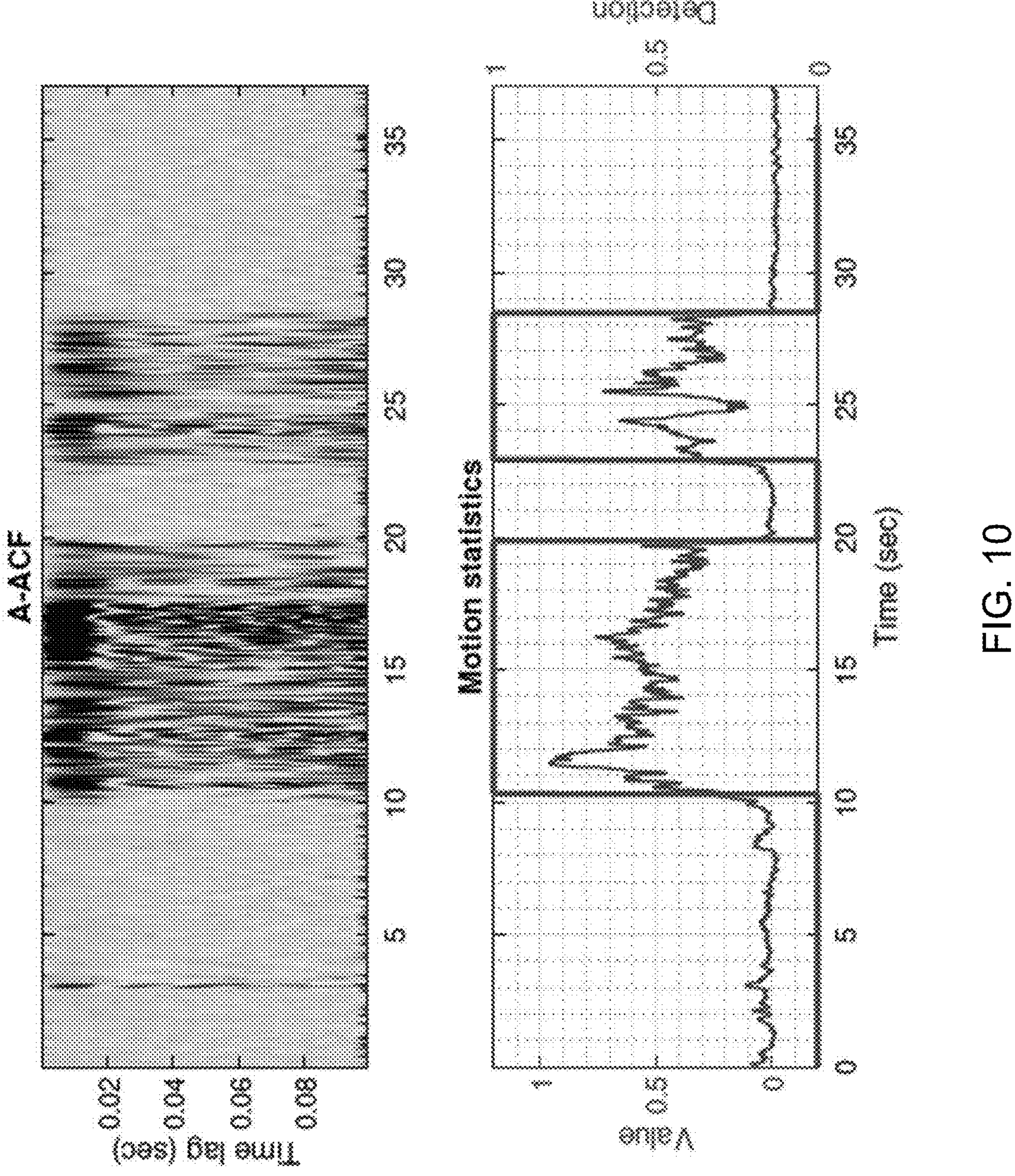
FIG. 10 shows an example of motion detection and amplified ACF segmentation with motion statistics, according to some embodiments of the present disclosure.

The robust motion statistics functions as a reliable gauge of movement presence or lack thereof within a given environment. In a stationary environment, the robust motion statistic $\phi_G(f)$ is close to 0, whereas in dynamic environments with movement, $\phi_G(f)>0$. Following this, one can partition the A-ACF spectrum into 5-second segments that is detected to encompass motion, as shown in FIG. 10. The extracted A-ACF spectrum is a 2D matrix with size $R^{N*T}$, where N is the total number of time lags at each time instance, and T is the number of time instances in a segment.

In response to the varied model types, the system can further transform the 2D A-ACF spectrum into inputs that align with respective models. This mainly includes the following four cases.

Input for FNN. In feed-forward neural networks (FNNs), each individual sample is typically represented as a flattened, one-dimensional vector. The reason for this is that FNNs are designed to process each feature independently, without considering any inherent structure or correlation between features. Hence, the 2D A-ACF spectrum $R^{N*T}$ is flattened into a 1D vector $R^{NT}$ to fit the input requirement of FNNs.

Input for Image-based Models. Unlike FNNs, image-based models like CNNs are specifically designed to handle multi-dimensional data, such as images, while preserving spatial relationships between pixels or features. Thus, one can directly feed the 2D A-ACF spectrum into image-based models.

Input for Language-based Models. Language-based models like RNNs are particularly suited to handle sequential data, where the order of inputs matters. They maintain a hidden state that can theoretically capture information about past elements in the sequence. Hence, the typical input for an RNN is a sequence. In this setup, the sequence of A-ACF vectors $R^N$ is fed into the network one at a time.

Input for Transformer-based Models. Transformer-based models have been applied for both Natural Language Processing (NLP) tasks and vision tasks. For both kinds of tasks, the transformer models handle data in a similar sequential manner. For a 2D A-ACF spectrum, it is divided into P small patches $R^{h*w}$. These patches are then flattened into a 1D vector $R^{hw}$. Positional embeddings are added to the vectors to provide information about the relative positions of patches in the original image.

Figure 11:
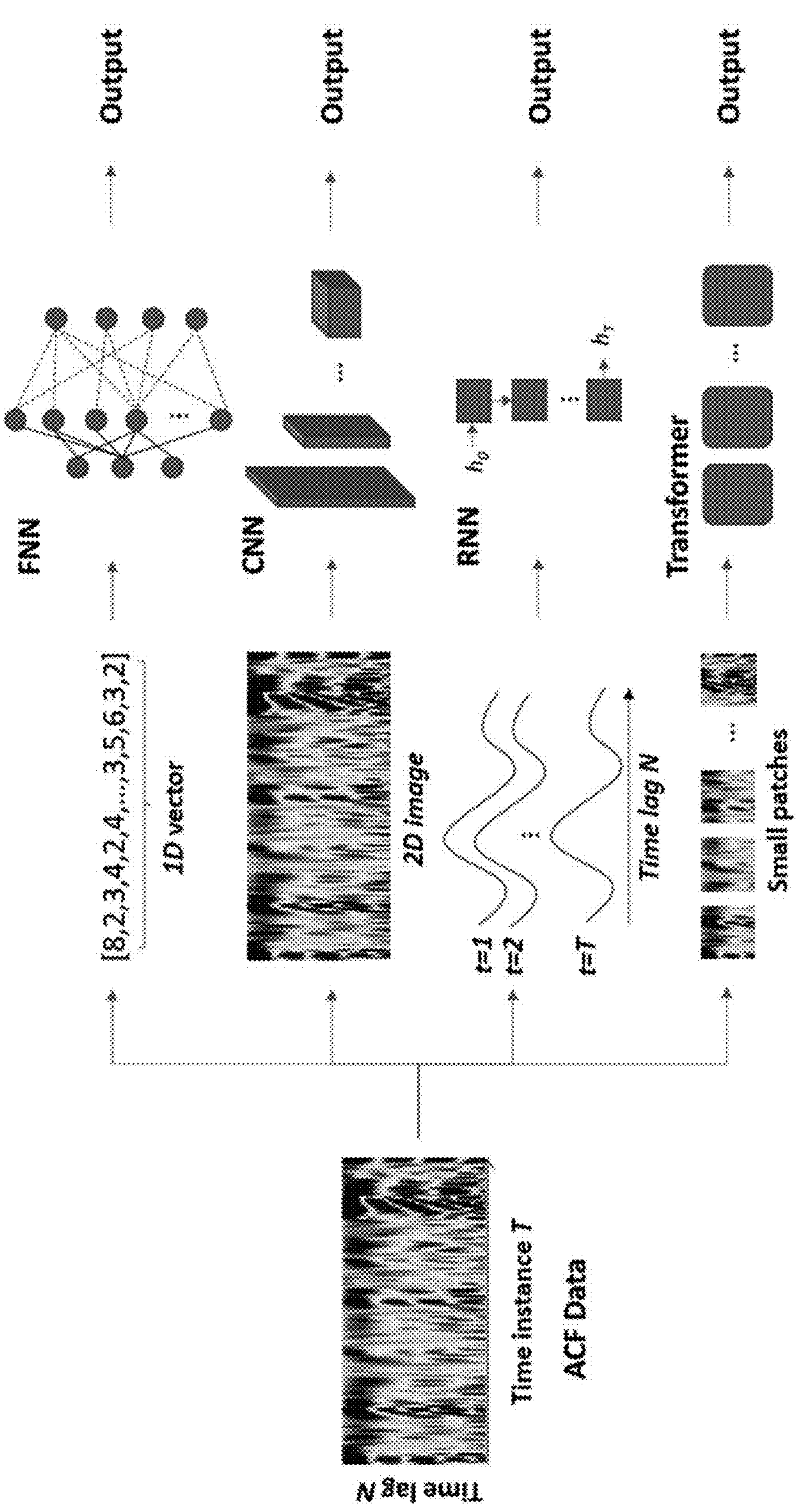
FIG. 11 shows an exemplary process of data input preparation for human non-human motion recognition using deep learning, according to some embodiments of the present disclosure.

FIG. 11 provides an intuitive depiction of the process by which A-ACF data is integrated into these models.

To provide a succinct overview of various deep learning models that have demonstrated promising performance in computer vision and natural language processing domains, one can delve into their advantages and limitations when applied to the identification of human and non-human motions based on WiFi signals, with description of transfer learning and its application to wireless sensing disclosed as well.

A Forward Neural Network (FNN) is the simplest type of artificial neural network. In an FNN, information moves in one direction only: from the input layer, through the hidden layers, and to the output layer. There are no loops in the network—information is always fed forward. Each neuron in a layer receives inputs from all neurons of the previous layer, processes the inputs using a weighted sum and a bias, applies an activation function to this sum, and passes the result to all neurons in the next layer. A Multilayer Perceptron (MLP) is a feed forward neural network architecture and has been widely used in machine learning tasks. It takes the flattened A-ACF as input and maps the latent features into the categorical space with nonlinearity introduced by the activation function. Although MLPs are capable of modeling complex non-linear relationships in the data, and the hidden layers of the MLP extract increasingly abstract and meaningful features, MLPs do not explicitly consider spatial or temporal relationships in the data. This limitation makes MLPs less suited for modeling the spatial and temporal dependencies of human and non-human motion from A-ACF, but it is incorporated in other networks like CNN as a classifier.

A Convolutional Neural Network (CNN) is predominantly used in the field of computer vision, where it has achieved state-of-the-art results on image classification, object detection, and many other tasks. CNNs are designed to automatically and adaptively learn spatial hierarchies of features from the input data. They include one or more convolutional layers, often followed by pooling layers, and then fully connected layers for classification or regression at the end. The convolutional layers are designed to recognize small, simple patterns, while the later layers recognize more complex structures. For CNNs, the A-ACF fed input the network as a 2D image and a 2D convolutional kernel is applied with a sliding window mechanism to extrapolate feature maps from the A-ACF spectrum. Utilizing 2D CNNs for feature extraction from the A-ACF spectrum of motion offers numerous advantages. Initially, it captures motion characteristics with a 2D kernel that adeptly discern the structure and features of the ACF spectrum from two dimensions. Moreover, by employing parameter sharing, they significantly reduce the number of parameters, boosting computational efficiency and mitigating the risk of overfitting. However, it is noteworthy that CNNs predominantly focus on local patterns and might overlook long-range dependencies or the global context present in the data.

A Recurrent Neural Network (RNN) is specifically designed to work with sequence data. They achieve this by including loops in the network, which allows information to flow from one step in the sequence to the next. This makes RNNs capable of processing data such as time series, sentences, and more. However, standard RNNs often struggle to learn long-range dependencies due to vanishing and exploding gradients, which has led to the development of more advanced types of RNNs like LSTM (Long Short Term Memory) and GRU (Gated Recurrent Unit). For RNNs, the A-ACF is interpreted as a time series signal. The network treats the A-ACF at each instance as a distinct token. RNNs are apt for understanding temporal dependencies within the A-ACF segment, making them an ideal choice for analyzing time-varying features of A-ACF induced by motion. However, they fall short in recognizing the characteristics of ACF at a specific moment, thereby neglecting the features of A-ACF resulting from the immediate short-term motion.

Transformers are a type of model that use self-attention mechanisms and have achieved state-of-the-art results on a variety of natural language processing and computer vision tasks. Unlike RNNs, transformers process the input data in parallel rather than sequentially, which can make them more efficient. They are designed to handle sequences and can capture complex patterns in the data, making them suitable for tasks like machine translation, text summarization, and more. To better capture the two-dimensional features of A-ACF spectrum, one can employ a Transformer-base vision model, Vision Transformer (ViT). ViT processes the input A-ACF spectrum by splitting it into fixed-size small image patches and reshaping them into vectors. These patch vectors are then linearly transformed into D-dimensional embeddings. To retain positional information, position embeddings are added to these patch embeddings. These patch embeddings are then passed into a transformer encoder, including several layers of multi-head self-attention mechanisms and position-wise fully connected feed-forward networks. Finally, the output corresponding to the first token is used by the classification head to generate the final prediction for human and non-human motion classification.

In some embodiments, CNN+RNN models combine the strengths of CNNs and RNNs. Typically, the CNN component is used to extract a meaningful sequence of features from the input data (for example, frames in a video), and then the RNN component is used to analyze the sequence of features. This combination makes CNN+RNN models effective for tasks that involve both spatial and temporal dependencies, such as video analysis or image captioning. For A-ACF input, the system can treat it as a spectrum image and the CNN network applies the 2D convolutional kernel to extract the spatial information from the spectrum. Then, one can apply a GRU to extract the temporal information from the extracted feature maps.

Transfer learning is a machine learning method where a model, often pre-trained on a large dataset, is used as the starting point for a task of interest. It leverages knowledge learned from one problem domain (the source domain) to another related but different problem domain (the target domain). This is particularly useful when the target task has limited labeled data. It is a practice in deep learning, where models trained on large-scale image datasets are used for other vision tasks.

In some embodiments, due to the scarcity of labeled WiFi data and the transformation of WiFi signals into two-dimensional A-ACF spectrum, one can investigate the feasibility of leveraging pre-trained image models in WiFi sensing tasks. Utilizing A-ACF spectrum images as the input for the transfer learning network, the system can transfer characteristics learned by deep neural networks from image data to WiFi based human and non-human motion identification task, with the goal of augmenting WiFi sensing system performance. In some embodiments, the efficacy of transferring a ResNet-18 model pre-trained on the ImageNet dataset is evaluated to identify human and non-human motion based on WiFi signals, and compared with the performance of the ResNet-18 model trained explicitly with WiFi signals. Furthermore, one can also examine the effect of fine-tuning different layers on the transfer performance.

In some embodiments, to evaluate the disclosed system, a framework is introduced to include a pair of apparatuses, both equipped with commercially procurable WiFi network interface cards. One apparatus plays the role of a transmitting entity (Tx), whereas the other apparatus acts as the receiving end (Rx). Each apparatus boasts dual omnidirectional antennas, culminating in a total of four communication links for every transceiver unit. These pairs of antennas facilitate the streaming of CSI over a span of 58 subcarriers. The framework operates within WLAN channel 153, which takes advantage of a carrier frequency positioned at 5.18 GHz and employs a bandwidth of 40 MHz. The Tx proactively deploys sounding frames at a sounding rate of 1500 Hz.

In some embodiments, the disclosed framework is evaluated in 5 typical environments with a total of 29 different configurations, including a compact residential apartment, a townhouse, two single family houses, and an office building. The floor plans of these environments, together with the designated locations of the Tx (indicated in blue) and the Rx (highlighted in orange), are presented. One can gather data for both LOS and NLOS conditions in order to gauge the through-the-wall capabilities of the system. In some embodiments, the analysis solely employs single-link WiFi data. The varying distances between the Tx and Rx range from 2 to 8 meters.

In some embodiments, one can collect CSI data of four kinds of subjects (human, pet, cleaning robot, fan) from the 5 scenarios: Scenarios 1-5. Some humans and pets are involved in multiple scenarios while others are only shown in one scenario. The evaluation criterion employed to measure the model's accuracy is the top-1 accuracy, which is defined as the proportion of correctly classified motion segments from the data set. CPU prediction time and FLOPS are utilized to evaluate the computational requirement and complexity. Peak memory usage, parameter size, as well as model size are evaluated to measure the memory usage. To deploy the deep learning based method for WiFi sensing on edge devices with limited computational resources, it is crucial to evaluate the computation and memory requirements.

In some embodiments, one can thoroughly evaluate various deep learning models by conducted five experiments based on different environmental settings. In each experiment, one can designate data from four scenarios for training and validation, and the other one scenario for testing. The training dataset and validation dataset were randomly divided at a ratio of 8:2. The accuracy of different models are compared on the unseen validation dataset. The MLP model exhibited consistent performance with an average accuracy of 91.59%. LeNet performed slightly better, with an average accuracy of 93.60%. The ResNet family of models demonstrated superior performance, especially ResNet101, which achieved the highest average accuracy of 96.38%. Other deep learning models like RNN, GRUNet, and LSTM performed comparatively lower, with average accuracies of 86.64%, 89.77%, and 85.79%, respectively. The ViT model also exhibited commendable accuracy, averaging 92.40%. Overall, the results compellingly demonstrate the superiority of the disclosed deep learning-based framework in accurately identifying human and non-human subjects through-the-wall with WiFi. The remarkable performance of the ResNet models, in particular, affirms the efficacy of the deep learning approach in complex detection tasks.

One can also assess the model's performance in unseen environments, examining it from three distinct perspectives: recognizing seen subjects in unseen scenarios, identifying unseen subjects in unseen scenarios, and handling settings with multiple coexisting subjects.

Recognition in unseen environment for seen subjects. First, the model's capacity is assessed to accurately identify seen subjects in unseen environments. Following the leave-one-environment-out methodology to get five testing experiments, the results show that ResNet18 achieved an impressive average testing accuracy of 91.71%. All ResNet models surpassed the 90% mark in average testing accuracy. These outcomes firmly validate that the disclosed architecture minimizes the impact of factors such as environment, position, or direction on recognition performance. This enables effective differentiation between human and non-human subjects in novel environments without necessitating additional training or parameter adjustments.

Recognition in unseen environment for unseen subjects. The evaluation can explore the model's robustness with respect to unfamiliar subjects in untested environments. The evaluation may use the same leave-one-environment-out training approach, and the subjects incorporated in the testing data having not been present in either the training or validation data sets. Remarkably, even when challenged with novel environments and unfamiliar motion subjects, the disclosed framework maintains high accuracy in discriminating between human and non-human subjects. This robustness can be attributed to the disclosed A-ACF based framework that effectively extracts motion pattern-related features, thereby managing to capture universal features even amidst slight variations in different subjects' motion patterns. This robust recognition capability underpins the model's ability to be swiftly deployed in new environments with minimal user intervention.

Recognition in unseen environment for co-existing multiple subjects. One can further examine the disclosed framework's robustness when tasked with detecting multiple subjects coexisting in unseen environments. For this evaluation, one can gather data from two scenarios, Scenarios 1 and 2, where two individuals or two dogs were simultaneously moving. Applying the same leave-one-environment-out approach, one can assess the model's ability to recognize multiple subjects in unknown environments. The results show that the ViT model achieved a testing accuracy of 82.86%. This performance signifies that the disclosed model can accurately identify multiple subjects—whether they be humans or pets—even when they are present simultaneously, eliminating the need for additional retraining or fine-tuning. This robustness further underscores the practical value and adaptability of the disclosed model in real-world scenarios.

Performance of transfer learning. To investigate whether transfer learning can enhance human and non-human target recognition based on WiFi by leveraging features learned from image recognition, one can evaluate the accuracy of the ResNet18 model, pre-trained on ImageNet, in five experiments. This was juxtaposed against the base ResNet18 model trained exclusively with WiFi data. Furthermore, one can examine the effects of model freezing at varying epochs on transfer learning outcomes. The results suggest a slight accuracy increase when the number of frozen epochs is set at 10 and 50, improving by 0.65% and 0.48%, respectively. In some embodiments, indefinite model freezing led to a decline in accuracy. This negative transfer is attributed to the distributional differences between the target dataset, WiFi data, and the source dataset, image data.

Figure 12:
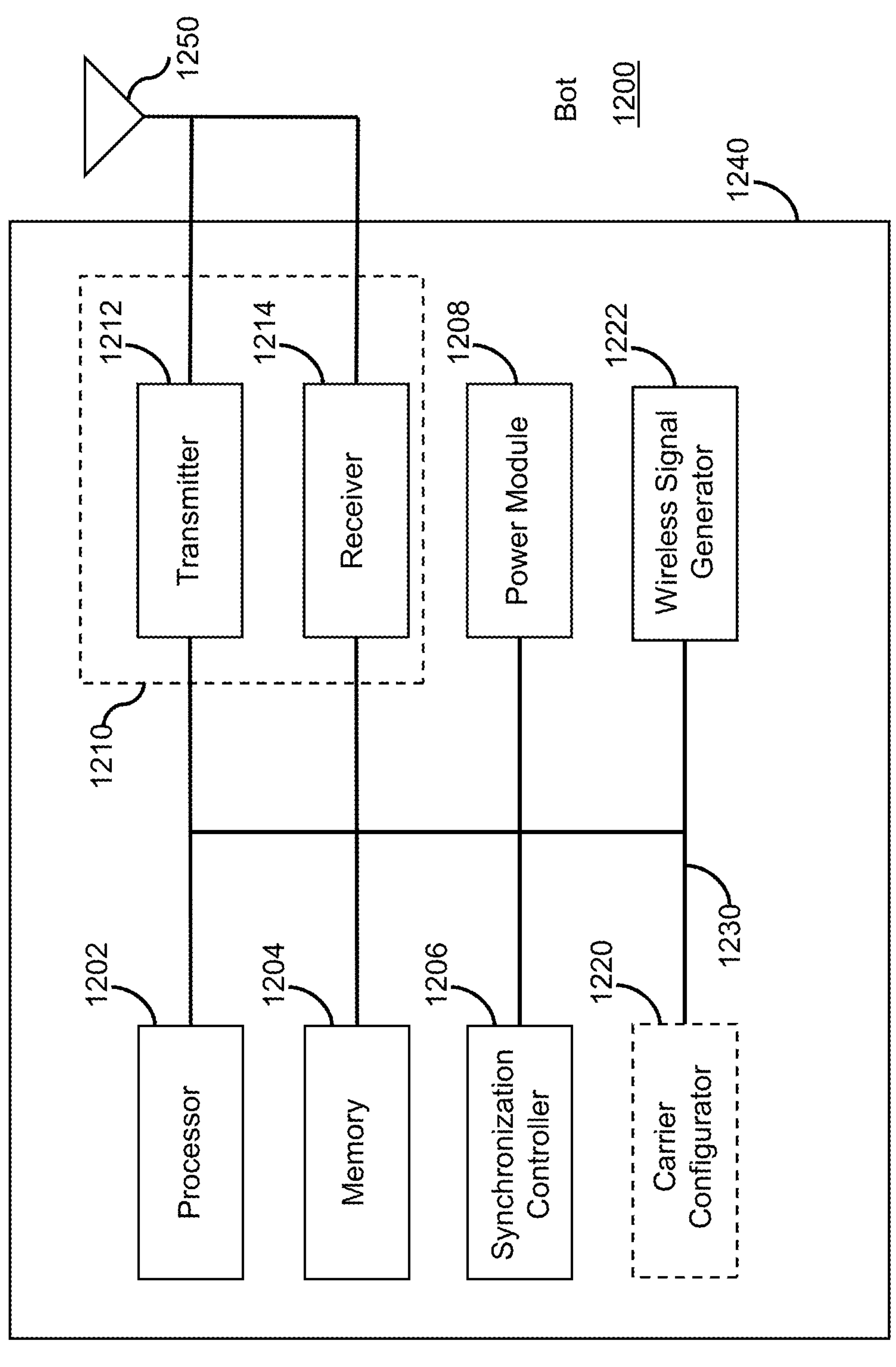
FIG. 12 illustrates an exemplary block diagram of a first wireless device of a system for wireless human-nonhuman motion detection, according to some embodiments of the present disclosure.

FIG. 12 illustrates an exemplary block diagram of a first wireless device, e.g. a Bot 1200, of a system for wireless human-nonhuman motion detection, according to one embodiment of the present teaching. The Bot 1200 is an example of a device that can be configured to implement the various methods described herein. As shown in FIG. 12, the Bot 1200 includes a housing 1240 containing a processor 1202, a memory 1204, a transceiver 1210 comprising a transmitter 1212 and receiver 1214, a synchronization controller 1206, a power module 1208, an optional carrier configurator 1220 and a wireless signal generator 1222.

In this embodiment, the processor 1202 controls the general operation of the Bot 1200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1204, which can include both read-only memory (ROM) and random access memory (RAM), can provide instructions and data to the processor 1202. A portion of the memory 1204 can also include non-volatile random access memory (NVRAM). The processor 1202 typically performs logical and arithmetic operations based on program instructions stored within the memory 1204. The instructions (a.k.a., software) stored in the memory 1204 can be executed by the processor 1202 to perform the methods described herein. The processor 1202 and the memory 1204 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1210, which includes the transmitter 1212 and receiver 1214, allows the Bot 1200 to transmit and receive data to and from a remote device (e.g., an Origin or another Bot). An antenna 1250 is typically attached to the housing 1240 and electrically coupled to the transceiver 1210. In various embodiments, the Bot 1200 includes (not shown) multiple transmitters, multiple receivers, and multiple transceivers. In one embodiment, the antenna 1250 is replaced with a multi-antenna array 1250 that can form a plurality of beams each of which points in a distinct direction. The transmitter 1212 can be configured to wirelessly transmit signals having different types or functions, such signals being generated by the processor 1202. Similarly, the receiver 1214 is configured to receive wireless signals having different types or functions, and the processor 1202 is configured to process signals of a plurality of different types.

The Bot 1200 in this example may serve as a Bot or Type1 device, e.g. Tx 611, 621, 631, 641, or any other transmitter in FIGS. 1-7, for wireless proximity detection in a venue. For example, the wireless signal generator 1222 may generate and transmit, via the transmitter 1212, a wireless signal through a wireless multipath channel impacted by a motion of an object in the venue. The wireless signal carries information of the channel Because the channel was impacted by the motion, the channel information includes motion information that can represent the motion of the object. As such, the motion can be indicated and detected based on the wireless signal. The generation of the wireless signal at the wireless signal generator 1222 may be based on a request for motion detection from another device, e.g. an Origin, or based on a system pre-configuration. That is, the Bot 1200 may or may not know that the wireless signal transmitted will be used to detect motion.

The synchronization controller 1206 in this example may be configured to control the operations of the Bot 1200 to be synchronized or un-synchronized with another device, e.g. an Origin or another Bot. In one embodiment, the synchronization controller 1206 may control the Bot 1200 to be synchronized with an Origin that receives the wireless signal transmitted by the Bot 1200. In another embodiment, the synchronization controller 1206 may control the Bot 1200 to transmit the wireless signal asynchronously with other Bots. In another embodiment, each of the Bot 1200 and other Bots may transmit the wireless signals individually and asynchronously.

The carrier configurator 1220 is an optional component in Bot 1200 to configure transmission resources, e.g. time and carrier, for transmitting the wireless signal generated by the wireless signal generator 1222. In one embodiment, each CI of the time series of CI has one or more components each corresponding to a carrier or sub-carrier of the transmission of the wireless signal. The detection of the motion may be based on motion detections on any one or any combination of the components.

The power module 1208 can include a power source such as one or more batteries, and a power regulator, to provide regulated power to each of the above-described modules in FIG. 12. In some embodiments, if the Bot 1200 is coupled to a dedicated external power source (e.g., a wall electrical outlet), the power module 1208 can include a transformer and a power regulator.

The various modules discussed above are coupled together by a bus system 1230. The bus system 1230 can include a data bus and, for example, a power bus, a control signal bus, and/or a status signal bus in addition to the data bus. It is understood that the modules of the Bot 1200 can be operatively coupled to one another using any suitable techniques and mediums.

Although a number of separate modules or components are illustrated in FIG. 12, persons of ordinary skill in the art will understand that one or more of the modules can be combined or commonly implemented. For example, the processor 1202 can implement not only the functionality described above with respect to the processor 1202, but also implement the functionality described above with respect to the wireless signal generator 1222. Conversely, each of the modules illustrated in FIG. 12 can be implemented using a plurality of separate components or elements.

Figure 13:
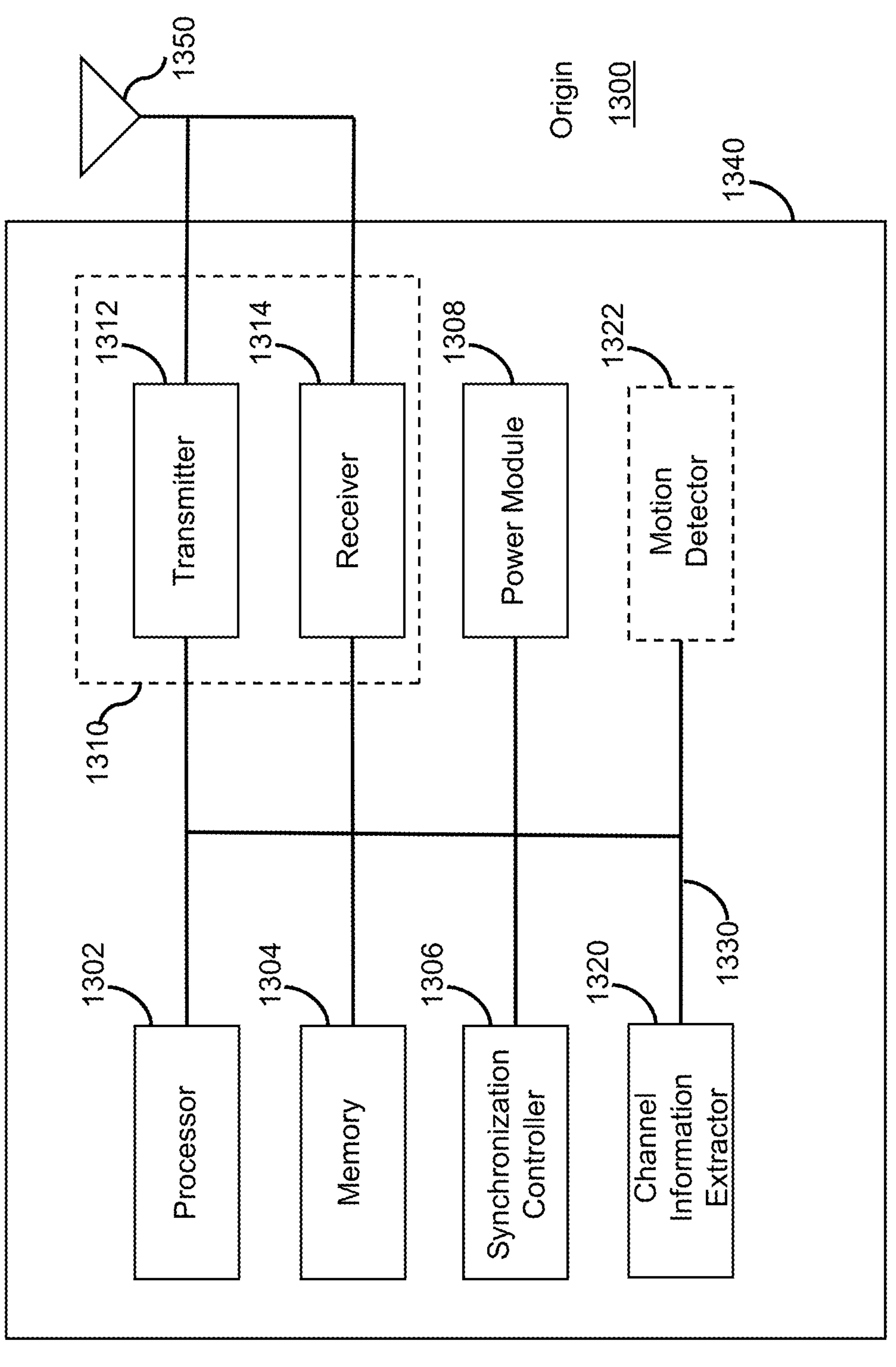
FIG. 13 illustrates an exemplary block diagram of a second wireless device of a system for wireless human-nonhuman motion detection, according to some embodiments of the present disclosure.

FIG. 13 illustrates an exemplary block diagram of a second wireless device, e.g. an Origin 1300, of a system for wireless human-nonhuman motion detection, according to one embodiment of the present teaching. The Origin 1300 is an example of a device that can be configured to implement the various methods described herein. The Origin 1300 in this example may serve as an Origin or Type2 device, e.g. Rx 612, 622, 632, 642 or any other receiver in FIGS. 1-7, for wireless proximity detection in a venue. As shown in FIG. 13, the Origin 1300 includes a housing 1340 containing a processor 1302, a memory 1304, a transceiver 1310 comprising a transmitter 1312 and a receiver 1314, a power module 1308, a synchronization controller 1306, a channel information extractor 1320, and an optional motion detector 1322.

In this embodiment, the processor 1302, the memory 1304, the transceiver 1310 and the power module 1308 work similarly to the processor 1202, the memory 1204, the transceiver 1210 and the power module 1208 in the Bot 1200. An antenna 1350 or a multi-antenna array 1350 is typically attached to the housing 1340 and electrically coupled to the transceiver 1310.

The Origin 1300 may be a second wireless device that has a different type from that of the first wireless device (e.g. the Bot 1200). In particular, the channel information extractor 1320 in the Origin 1300 is configured for receiving the wireless signal through the wireless multipath channel impacted by the motion of the object in the venue, and obtaining a time series of channel information (CI) of the wireless multipath channel based on the wireless signal. The channel information extractor 1320 may send the extracted CI to the optional motion detector 1322 or to a motion detector outside the Origin 1300 for detecting object motion in the venue.

The motion detector 1322 is an optional component in the Origin 1300. In one embodiment, it is within the Origin 1300 as shown in FIG. 13. In another embodiment, it is outside the Origin 1300 and in another device, which may be a Bot, another Origin, a cloud server, a fog server, a local server, and an edge server. The optional motion detector 1322 may be configured for detecting the motion of the object in the venue based on motion information related to the motion of the object. The motion information associated with the first and second wireless devices is computed based on the time series of CI by the motion detector 1322 or another motion detector outside the Origin 1300.

The synchronization controller 1306 in this example may be configured to control the operations of the Origin 1300 to be synchronized or un-synchronized with another device, e.g. a Bot, another Origin, or an independent motion detector. In one embodiment, the synchronization controller 1306 may control the Origin 1300 to be synchronized with a Bot that transmits a wireless signal. In another embodiment, the synchronization controller 1306 may control the Origin 1300 to receive the wireless signal asynchronously with other Origins. In another embodiment, each of the Origin 1300 and other Origins may receive the wireless signals individually and asynchronously. In one embodiment, the optional motion detector 1322 or a motion detector outside the Origin 1300 is configured for asynchronously computing respective heterogeneous motion information related to the motion of the object based on the respective time series of CI.

The various modules discussed above are coupled together by a bus system 1330. The bus system 1330 can include a data bus and, for example, a power bus, a control signal bus, and/or a status signal bus in addition to the data bus. It is understood that the modules of the Origin 1300 can be operatively coupled to one another using any suitable techniques and mediums.

Although a number of separate modules or components are illustrated in FIG. 13, persons of ordinary skill in the art will understand that one or more of the modules can be combined or commonly implemented. For example, the processor 1302 can implement not only the functionality described above with respect to the processor 1302, but also implement the functionality described above with respect to the channel information extractor 1320. Conversely, each of the modules illustrated in FIG. 13 can be implemented using a plurality of separate components or elements.

In one embodiment, in addition to the Bot 1200 and the Origin 1300, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 1322 or a motion detector outside the Origin 1300 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

Figure 14:
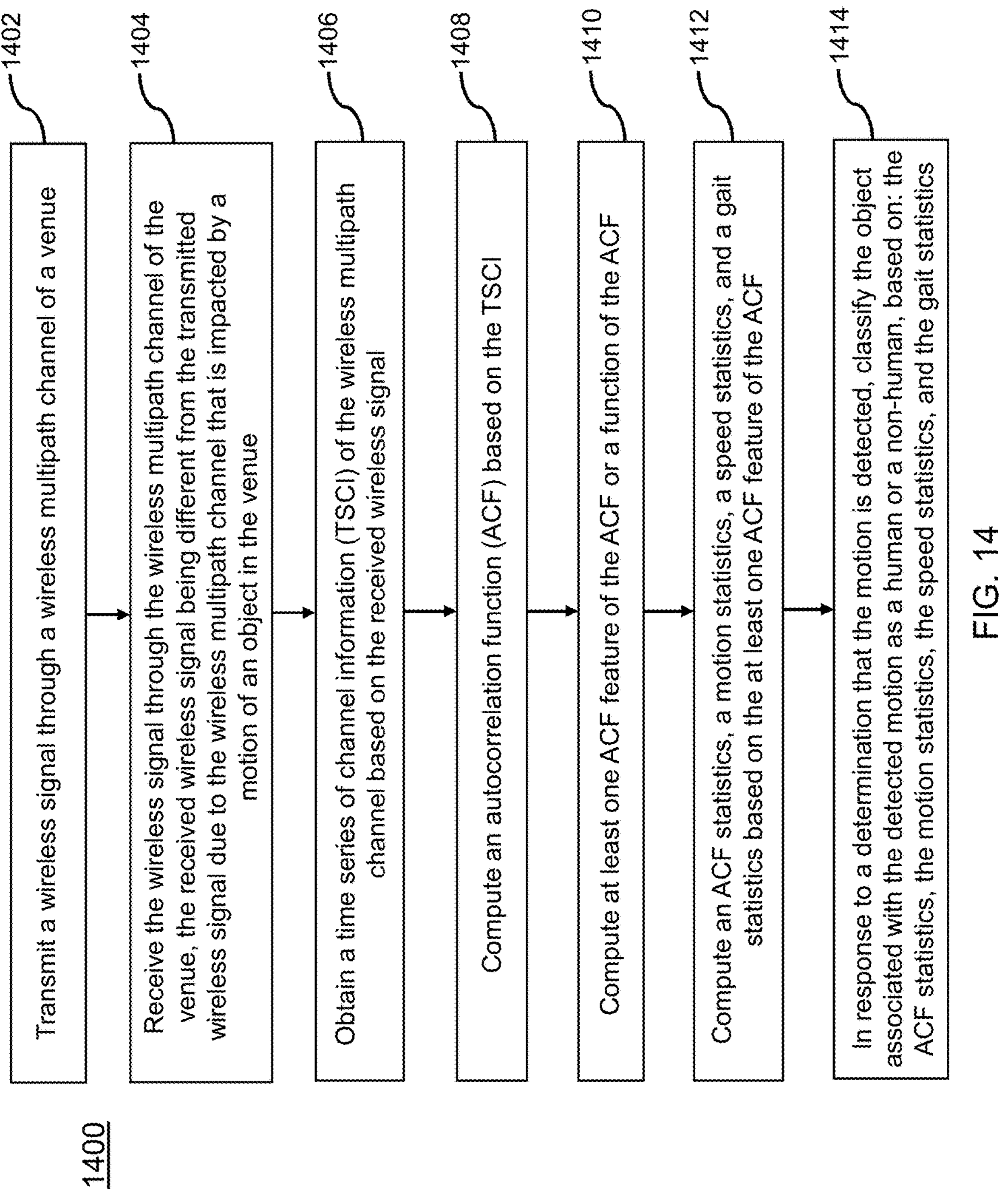
FIG. 14 illustrates a flow chart of an exemplary method for wireless human-nonhuman motion detection, according to some embodiments of the present disclosure.

FIG. 14 illustrates a flow chart of an exemplary method 1400 for wireless human-nonhuman motion detection, according to some embodiments of the present disclosure. In various embodiments, the method 1400 can be performed by the systems disclosed above. At operation 1402, a wireless signal is transmitted through a wireless multipath channel in a venue. At operation 1404, the wireless signal is received through the wireless multipath channel. The received wireless signal is different from the transmitted wireless signal due to the wireless multipath channel that is impacted by a motion of an object in the venue. At operation 1406, a time series of channel information (TSCI) of the wireless multipath channel is obtained based on the received wireless signal. At operation 1408, an autocorrelation function (ACF) is computed based on the TSCI. At operation 1410, at least one ACF feature of the ACF or a function of the ACF (e.g. square or logarithm or a monotonic function of ACF) is computed. At operation 1412, an ACF statistics, a motion statistics, a speed statistics, and a gait statistics are computed based on the at least one ACF feature of the ACF or the function of the ACF. At operation 1414, in response to a determination that the motion is detected, the object associated with the detected motion is classified to be one of a human or a non-human, based on: the ACF statistics, the motion statistics, the speed statistics, and the gait statistics.

Figure 15:
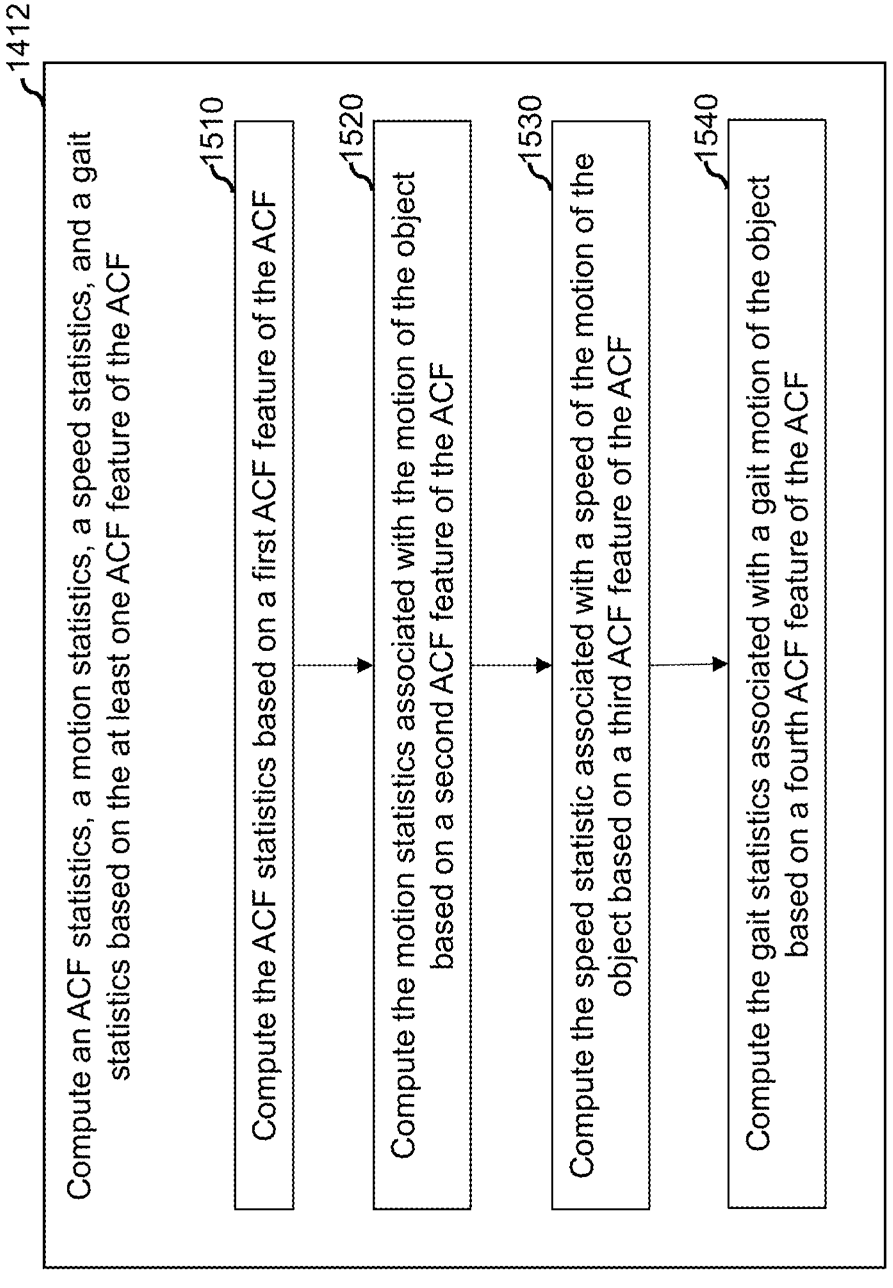
FIG. 15 illustrates a flow chart showing detailed operations for wireless human-nonhuman motion detection, according to some embodiments of the present disclosure.

FIG. 15 illustrates a flow chart showing detailed operations 1500 for wireless human-nonhuman motion detection, according to some embodiments of the present disclosure. In some embodiments, the operations 1500 may be performed as part of the operation 1412 in FIG. 14. At operation 1510, the ACF statistics is computed based on a first ACF feature of the ACF or the function of the ACF. At operation 1520, the motion statistics associated with the motion of the object is computed based on a second ACF feature of the ACF or the function of the ACF. At operation 1530, the speed statistic associated with a speed of the motion of the object is computed based on a third ACF feature of the ACF or the function of the ACF. At operation 1540, the gait statistics associated with a gait motion of the object is computed based on a fourth ACF feature of the ACF or the function of the ACF.

The order of the operations in any one of the figures may be changed according to various embodiments of the present teaching.

In some embodiments, a human-nonhuman recognition is disclosed to differentiate motion due to human versus motion due to non-human (e.g. pet, iRobot, fan). This recognition includes: obtaining TSCI from wireless signal transmitted by Type1 device and received by Type2 device. Motion may be due to an object (e.g. human, non-human, pet, robot, vacuum cleaner, fan). This recognition also includes: computing an auto-correlation function (ACF) based on the TSCI (e.g. based on a first feature such as magnitude, magnitude square, function of magnitude, phase, component magnitude, component magnitude square, component phase, function of component magnitude of each CI). While TSCI may be sampled at a high rate ("TSCI rate", e.g. 10000 Hz), the ACF may be computed repeatedly at another rate ("ACF rate", e.g. 1000 Hz) with each ACF computed based on CI in a time window (0.01 second) of the TSCI.

This recognition also includes: identifying some feature (called "ACF-feature") of ACF. The ACF-feature may be peak/valley, local max (peak), local min (valley), zero-crossing, mean-crossing, inflection points, constrained feature, constrained max/min/zero-crossing/mean-crossing/inflection points, and/or ACF evaluated at a particular time lag (e.g. 1/2/ . . . /k). Based on the ACF-feature, some derived analytics/quantities/features may be computed, such as statistical feature, ACF-based statistics, motion statistics, speed, physical feature, gait, gait-related features, time trend feature/statistics (e.g. mean, variance).

Some analytics derived from the ACF-feature may be ACF-based statistics (statistical features), comprising ACF peaks mean, ACF valleys mean, ACF peaks interval distance, and ACF valleys interval distance, based on one or more ACF in a time window. For example, ACF may be computed at an ACF rate (e.g. 1000 Hz). A respective time window of ACF (e.g. a 0.01 sec window comprising 10 ACF) may be used to compute each ACF-based statistics.

The ACF peaks/valleys mean may be computed by computing a plurality of local max (for ACF peaks mean) or local min (for ACF valleys mean) of ACF for each time instance, computing a "first mean" (e.g. weighted averaging, arithmetic mean, geometric mean, harmonic mean, percentile, median (50-percentile), max (100-percentile), min (0-percentile), mode) of the plurality of local max/min for the time instance, and then computing a "second mean" (e.g. another "first mean", or filtering, or lowpass filtering) of the multiple first means at multiple time instances in the respective time window.

Alternatively, the ACF peaks/valleys mean may be computed by computing a kA{th} (e.g. first) local max (for ACF peaks mean) or a kA{th} (e.g. first) local min (for ACF valleys mean) of ACF for each time instance, and then computing a "second mean" of the multiple kA{th} (e.g. first) local max/min at multiple time instances in the respective time window.

Alternatively, the ACF peaks/valleys mean may be computed by computing a global max (for ACF peaks mean) or a global min (for ACF valleys mean) of ACF for each time instance, and then computing a "second mean" of the multiple global max/min at multiple time instances in the respective time window. This may be a special case of (a) in which the "first mean" is max (for ACF peaks mean) or min (for ACF valleys mean).

The ACF peaks/valleys interval distance may be computed by computing the number of local max (for ACF peaks interval distance) or local min (for ACF valleys interval distance) of the ACF for each time instance, computing a plurality of intervals (e.g. time interval) each being a temporal interval/distance between a pair of neighboring/adjacent local max/min of the ACF for the time instance, computing a "first mean" of the plurality of intervals for the time instance, and computing the ACF peak/valley interval distance as a "second mean" (such as weighted averaging, or filtering, or lowpass filtering) of the multiple first means at multiple time instances in the respective time window.

Another derived analytic from ACF-feature may be a motion statistics (MS), which may be computed based on the ACF (e.g. ACF at a fixed time delay, T1) for each time instance. For example, for T1=1, the MS may be TRRS/inner-product/correlation between two temporally adjacent CI. For T1=k, the MS may effectively be the TRRS based on TSCI down-sampled at a factor of k. Some MS-based statistics such as MS mean, and MS variance may be computed in a time window.

The motion statistics mean (MS mean) may be computed by computing a "second mean" (such as the first mean, filtering, or lowpass filtering) of all the motion statistics of the time instance in the time window.

The motion statistics variance (MS variance) may be computed by computing a "variation measure" of all the motion statistics of the time instance in the time window. The variation measure may comprise any of: variance, standard deviation, variation, derivative, slope, total variation, absolute variation, square variation, spread, dispersion, variability, deviation, absolute deviation, square deviation, total deviation, divergence, range, interquartile range, skewness, kurtosis, L-moment, coefficient of variation, quartile coefficient of dispersion, mean absolute difference, Gini coefficient, relative mean difference, median absolute deviation, average absolute deviation, distance standard deviation, coefficient of dispersion, entropy, variance-to-mean ratio, maximum-to-minimum ratio, variation measure, regularity measure, similarity measure, likelihood, probability distribution function, sample distribution, and/or moment generating function.

A particular derived analytics from ACF-feature may be a speed of the motion of the object. Each speed may be computed based on a local max, a local min, a zero-crossing, a mean-crossing or an inflection point of the ACF or the derivative function (i.e. instantaneous slope) of the ACF. As a result, a time series of speed (TSSP) may be obtained. The sampling frequency of TSSP may be lower than that of TSCI. Based on the TSSP, some statistics may be further derived/computed/obtained. Such speed-based statistics may include some gait statistics (e.g. presence of gait, stride cycle time, step cycle time, N-cycle time, stride cycle distance, step cycle distance, N-cycle distance), and/or some simple speed statistics (e.g. speed mean, speed variation measure, speed percentile, speed histogram).

Some features of speed ("speed-feature") may be computed, comprising any of: peaks (local max), valleys (local min), zero-crossings, mean-crossing and/or inflection point of the TSSP. Process the peaks, valleys, zero-crossings, mean-crossings, inflection points by removing "false peak", "false valley", "false zero-crossing", "false mean-crossing", "false inflection point". False peaks, and false valleys may be removed in pairs (i.e. one false peak may be removed with one adjacent/neighboring false valley together). False zero-crossings/mean-crossings/inflection points may be removed in pairs (i.e. two immediately adjacent zero-crossings/mean-crossing/inflection points may be removed together). The mean-crossings may be computed as zero-crossings of mean-subtracted TSSP.

One of the gait statistics may be a presence of gait behavior of the motion of the object, which may be computed based on the speed-features of the TSSP (or simply the TSSP). Gait behavior may be present when there is a rhythmic (e.g. periodic or near periodic) behavior of the speed-features such as peaks, valleys, zero-crossing, mean-crossing, and/or inflection points. For a valid presence of gait behavior, a count of the peaks, valleys, zero-crossings, mean-crossings or inflection points may be upper bounded (by a respective first threshold) and/or lowered bounded (by a respective second threshold).

If gait behavior is detected (i.e. if gait is present), gait statistics (e.g. stride cycle time, step cycle time, stride length, step length) may be computed based on speed-features of the TSSP.

A gait statistics may be a number of "intervals" related to the rhythmic behavior, each interval being computed as a temporal distance or temporal interval between a pair of neighboring/adjacent peaks or valley or zero-crossing or mean-crossing or inflection point. An interval may be associated with a stride (e.g. between two adjacent local max, or between two adjacent local min), or a step (e.g. between two adjacent local max and local min, between two adjacent inflection points, or between two adjacent mean-crossing). For example, first interval may be interval between first and second local maxima while second interval may be interval between second and third local maxima. An average interval may be a "first mean" of the intervals.

Another gait statistics may be a number of "interval distance" (e.g. stride length, step length) corresponding to the number of "intervals", each "interval distance" being computed as the distance traversed by the object in a corresponding interval. An interval distance may be computed as a product of the corresponding interval and a "representative speed" (e.g. "first mean" or "second mean" of speed) in the interval. Alternatively, the interval may be subdivided into more than one disjoint sub-intervals (e.g. a stride may be subdivided into two steps). A subinterval distance may be computed as a product of a sub-interval and a "representative speed" in the sub-interval. The interval distance may be computed as a sum or weighted sum of the more than one corresponding subinterval distance. An average interval distance may be a "first mean" of the number of interval distance.

Another gait statistics may be the stride cycle time, which is computed as a "second mean" of the intervals between pairs of immediately adjacent peaks, or intervals between pairs of immediately adjacent valleys, or intervals between pairs of every other zero-crossing/mean-crossing/inflection point (e.g. between first and third zero-crossing, or between k^{th} and (k+2)^{th} zero-crossing).

A step cycle time may be computed as half of the stride cycle time. Alternatively, the step cycle time may be computed based on a fourth "second mean" of the intervals between pairs of adjacent zero-crossing/mean-crossing/inflection point (e.g. between first and second zero-crossing, or between k^{th} and (k+1)^{th} zero-crossing), or intervals between a local max and an adjacent local min.

An N-cycle time may be computed as the interval spanned by N peaks, or N valleys, or 2N zero-crossings/mean-crossings/inflection points.

The step cycle distance, stride cycle distance and/or N-cycle distance may be computed based on the interval distance. The step cycle distance, stride cycle distance or N-cycle distance may be defined as the distance traversed by the object motion in a step cycle time, a stride cycle time or a N-cycle time. The step cycle distance, stride cycle distance or N-cycle distance may be computed based on a summation of interval distance associated with all intervals in the corresponding step cycle time, stride cycle time or N-cycle time. The step cycle distance, stride cycle distance or N-cycle distance may be averaged over a time period using the first mean or second mean.

Some simple speed statistics (e.g. a second mean of speed, a "variation measure" of speed, speed 25 percentile, speed 50 percentile/median speed, speed 75 percentile) may be computed over a time period. A histogram of the speed in the time period may be computed. Any speed percentile or variation measure may be computed based on the histogram.

A monitoring task may be performed based on the ACF-based statistics, the MS-based statistics, the speed-based statistics (including both gait statistics and the simple speed statistics). The monitoring task comprises at least one of: classification/detection/recognition/identification/presence/absence/appearance/disappearance/ADL (activity daily living) of at least two of: human, human adult, older human, human children, human baby, non-human, non-human pet, non-human robot, non-human machinery. The task may comprise gesture recognition, tracking, localization, locationing, navigation.

The task may be to detect motion of some (unknown) object, and to differentiate/recognize/detect/classify/identify the object that generates the detected motion from a number of possible/candidate objects (e.g. there may be 4 candidate/possible objects: human, pet, robot and/or fan).

Some subtasks of the task may be to do pairwise differentiation/recognition/classification/detection between all object pair combinations. E.g. for our example with 4 candidate objects, pairwise detection may be performed for all pair combinations, including (a) human Vs pet, (b) human Vs robot, (c) human Vs fan, (d) pet Vs robot, (e) pet Vs fan, (f) robot Vs fan.

For each pairwise detection, a pairwise detection score may be computed. For example, the pairwise detection score for object1 Vs object2 may tend to be positive (or larger than a threshold) if the object is object1, and may tend to be negative (or smaller than the threshold) if the object is object2. And the object may be determined/detected/classified/identified to be object1 if the score is greater than the threshold, and object2 otherwise.

For each possible/candidate object (e.g. human), a respective per-object detection score for the possible/candidate object (e.g. human) may be computed based on all pairwise detection scores associated with the object (i.e. with the candidate object being either the object1 or the object2 in the pairwise detection of object1 Vs object2). The per-object score may be a weighted aggregate (e.g. weighted sum, weighted product) of the pairwise scores. In the weighted aggregate, the weight for any pairwise score may be positive if the possible object (human) is the object1 in the pairwise detection of object1: object2, or negative if it is the object2.

In our example, a per-object detection score for human may be computed based on the pairwise detection score of: (a) human Vs pet, (b) human Vs robot, and (c) human Vs fan. The per-object detection score may be a weighted aggregate of the pairwise detection scores, with positive weights for (a), (b) and (c).

The per-object detection score for pet may be computed based on three pairwise scores associated with pet: (a) human Vs pet, (d) pet Vs robot, and (e) pet Vs fan. The per-object detection score may be a weighted sum of the pairwise detection scores, with positive weights for (d) and (e) and negative weight for (a).

The per-object detection score for robot may be computed based on three pairwise scores associated with the robot: (b) human Vs robot, (d) pet Vs robot, (f) robot Vs fan. The per-object detection score may be a weighted sum of the pairwise detection scores, with positive weight for (f) and negative weights for (b) and (d).

The per-object detection score for fan may be computed based on three pairwise scores associated with the robot: (c) human Vs fan, (e) pet Vs fan, (f) robot Vs fan. The per-object detection score may be a weighted sum of the pairwise detection scores, with negative weights for (c), (e) and (f).

Each of the per-object detection score may be further weighted (e.g. based on some prior info). For example, if human is known to be more likely, another positive weight may be applied to its per-object detection score to make it larger.

The object associated with the detected motion may be determined to be the candidate object whose per-object detection score is the largest among all the candidate objects.

To compute the per-object detection score, y, for all the candidate objects (e.g. y may be a 4×1 vector in our example with the 4 candidate objects), the pairwise score may be organized to form a vector, x, (e.g. x may be a 6×1 vector in our example with 6 pairwise detection score) and the corresponding weights to compute the respective weighted sum may be organized into a matrix A (e.g. A may be a 4×6 matrix) such that y may be computed as a product of A and x (i.e. y=Ax).

The monitoring task (or each subtask) may be performed based on machine learning, classifier, support vector machine (SVM), supervised learning, unsupervised learning, semi-supervised learning, clustering, feature extraction, featuring training, principal component analysis, eigen-decomposition, frequency decomposition, time decomposition, time-frequency decomposition, training, discriminative training, supervised training, unsupervised training, semi-supervised training, neural network, and/or deep learning, with a plurality of inputs comprising: (a) ACF-based statistics (or ACF statistics), such as ACF peak mean, ACF valley mean, ACF peak interval distance, ACF valley interval distance, (b) MS-based statistics (or motion statistics), such as MS mean, MS variance, (c) speed-based statistics (or speed statistics), such as speed mean, speed variance, speed percentile, speed 50-percentile, speed median, speed 0-percentile, min speed, speed 100-percentile, max speed, speed 25-percentile, speed 75-percentile, (d) gait statistics, such as gait existence, interval, stride cycle time, step cycle time, N-cycle time, interval distance, stride cycle distance, step cycle distance, N-cycle distance. Note that there are four types of statistics, comprising (a) ACF-based statistics, (b) MS-based statistics, (c) speed-based statistics, and (d) gait statistics.

The Type1 device or Type2 device may have more than one antennas such that there are more than one links. There may be more than one TSCI obtained based on the received wireless signal, each TSCI from a respective link. Based on each TSCI, a respective ACF may be computed, and the respective (a) ACF-based statistics, (b) MS-based statistics, (c) speed-based statistics, and (d) gait statistics, may be computed. In the case that one of the link is bad/faulty/noisy (e.g. the respective RX antenna is bad), some/any respective ACF-based statistics, MS-based statistics, speed-based statistics (including speed itself), and gait statistics of the faulty link may be replaced/augmented/assisted/mixed by the respective statistics from other good/non-faulty/not-so-noisy link(s).

The classifier may use N inputs, comprising N of the (a) ACF-based statistics, (b) MS-based statistics, (c) speed-based statistics, and (d) gait statistics. Alternative classifiers with N-k input may be trained such that if or when the corresponding k of the N inputs are missing or bad, the alternative classifier may be used instead.

From the TSCI obtained from received wireless (sounding) signal communicated between a Type1 device (TX) and aType2 device (RX), an autocorrelation function (ACF) of the CI of the TSCI may be computed based on some features (called CI-feature, e.g. magnitude, magnitude square, function of magnitude, phase) of the CI of the TSCI. At least one feature (called ACF-feature, e.g. local max, local min, zero-crossing, mean-crossing, inflection point) of the ACF, or a function of the ACF (e.g. derivative function of the ACF), may be computed/obtained. At least four statistics (from 4 different types) may be computed, each based on a respective ACF feature of the ACF or the function of the ACF. Some or all of the respective ACF feature may be identical. There may be at least one statistics from each of the 4 types of statistics: (a) ACF statistics (or ACF-based statistics), (b) motion statistics (or MS-based statistics), (c) speed statistics (or speed-based statistics), and (d) gait statistics. If motion is detected, the object may be classified as one of multiple candidate object class (e.g. human, pet(nonhuman), robot(nonhuman), fan(nonhuman)). In some embodiments, motion statistics (type (b) statistics) may be used to detect the motion. The motion may be detected if a motion statistics or an accumulation of it exceeds a threshold.

In some embodiments, ACF may be computed for every sampling moment of CI of the TSCI, each ACF based on CI in a corresponding sliding time window. Each ACF may be computed based on a CI-feature (e.g. magnitude, magnitude square, phase) of each CI in the corresponding sliding time window. In some embodiments, at least one ACF-feature (e.g. local max, local min, zero-crossing, mean-crossing, inflection point) of each ACF or a function of each ACF may be computed. In some embodiments, an ACF statistics (type (a) statistics) and a motion statistics (type(b) statistics may be computed based on some first ACF feature and second ACF feature of ACF or a function of the ACF in corresponding sliding time windows respectively.

In some embodiments, a time series of "speed" of the motion of the object may be computed based on some ACF feature (e.g. local max/min of ACF, local max/min of derivative (or slope) of ACF or the function of the ACF). Speed statistics (type (c) statistics) may be computed based on speed in a time window of the TSS. TSS may be analyzed (in search of periodic behavior compatible to gait) to detect a presence of gait. When gait is found, gait statistics (type (d) statistics) may be computed based on TSS. Some additional candidate object classes, including "pet", "robot" and "fan".

In some embodiments, there may be multiple (e.g. N) candidate object classes. Many (to be exact, N(N−1)/2) pairings of two candidate object classes may be found/established. Many (to be exact, N(N−1)/2) pairwise detection may be performed, one for each pair/pairing. Many pairwise detection score may be compute, one for each pairwise detection/pair/pairing. For each pairwise detection between a first object and a second object, the pairwise detection score may tend to be positive (or at least larger than a threshold) if the object is the first object, and negative (or at least less than a threshold) if the object is the second object. For each particular candidate object class, a respective per-object detection score may be computed based on all pairwise detection scores associated with the particular candidate object class (i.e. with the particular candidate object class being either the first object or the second object of the associated pairwise detection).

In some embodiments, the per-object detection score for a particular candidate object class may be a weighted aggregate (e.g. weighted sum, weighted product) of all the pairwise detection scores. For any pairwise detection score that does not involve the particular candidate object class in the associated pairwise detection, the weight may be zero. For any pairwise detection score with the particular candidate object class being the first object class in the associated pairwise detection, the weight may be positive. For any pairwise detection score with the particular candidate object class being the second object class in the associated pairwise detection, the weight may be negative. In some embodiments, when motion is detected, the object is classified to be the candidate object class with largest per-object detection score.

In some embodiments, a task may be performed based on the detected motion and the classification of the object. In a security task, when the venue is expected to be empty, an intruder may be detected if motion is detected and the object is classified as human. If the object is not classified as human, the detected motion may be considered as robotic cleaner, or pet, or fan which may be ignored.

In some embodiments, TSCI may be sampled at high rate. TSCI may be resampled to a lower rate to become time series of resampled CI (TSRCI). Motion detection may be less demanding while the object classification may be more demanding. Thus the object classification may be performed using the high rate TSCI, while motion detection may be performed using the low rate TSRCI.

In some embodiments, sampling rate of TSCI may be larger than sample rate of TSRCI. Sampling rate of TSCI may be more than 5 times larger than sample rate of TSRCI. Some possible CI: CSI, CIR, CFR, etc. TSCI may be preprocessed. Each ACF may be computed based on CI-feature of CI (e.g. magnitude, magnitude square, phase).

In some embodiment, motionmay be detected if magnitude of MS, or an accumulation of magnitude of MS, is greater than a threshold.

The following numbered clauses provide examples for wireless human-nonhuman motion detection and recognition.

Clause A1. A method/device/system/software for wireless human-nonhuman motion detection comprising: a transmitter configured to transmit a wireless signal through a wireless multipath channel of a venue impacted by a motion of an object; a receiver configured to receive the wireless signal through the wireless multipath channel of the venue, wherein the received wireless signal differs from the transmitted wireless signal due to the wireless multipath channel and the motion of the object; a processor configured to: obtain a time series of channel information (TSCI) of the wireless multipath channel based on the received wireless signal, compute an autocorrelation function (ACF) based on the TSCI, compute at least one ACF feature of the ACF or of a function of the ACF, compute an ACF statistics based on a first ACF feature of the ACF or the function of the ACF, compute a motion statistics associated with the motion of the object based on a second ACF feature of the ACF or the function of the ACF, compute a speed statistic associated with a speed of the motion of the object based on a third ACF feature of the ACF or the function of the ACF, compute a gait statistics associated with a gait motion of the object based on a fourth ACF feature of the ACF or the function of the ACF, and when the motion is detected, classify the object associated with the detected motion to be one of: a human or a non-human, based on the ACF statistics, the motion statistics, the speed statistics, and the gait statistics.

Clause A2. The method/device/system/software for wireless human-nonhuman motion detection of clause A1, comprising the processor configured further to: detect the motion of the object based on the motion statistics; classify the object associated with the detected motion to be one of: a human or a non-human, based on the ACF statistics, the motion statistics, the speed statistics, and the gait statistics.

Clause A3. The method/device/system/software for wireless human-nonhuman motion detection of clause A1-A2, comprising the processor configured further to: compute a time series of ACF (TSACF), each ACF based on CI in a respective first sliding time window of the TSCI; compute the at least one ACF feature of each ACF or the function of each ACF.

Clause A4. The method/device/system/software for wireless human-nonhuman motion detection of clause A3, comprising the processor configured further to: compute the ACF statistics based on the first ACF feature of each ACF or the function of the ACF in a second time window of TSACF.

Clause A5. The method/device/system/software for wireless human-nonhuman motion detection of clause A3-A4, comprising the processor configured further to: compute a time series of speed (TSS) of the motion of the object, each respective speed based on the third ACF feature of each ACF or the function of the ACF in a respective third sliding time window of TSACF; compute the speed statistics based on each speed in a fourth time window of the TSS.

Clause A6. The method/device/system/software for wireless human-nonhuman motion detection of clause A5, comprising the processor configured further to: detect a presence of the gait motion of the object based on the TSS.

Clause A7. The method/device/system/software for wireless human-nonhuman motion detection of clause A5-A6, comprising the processor configured further to: compute the gait statistics based on each speed in a fifth time window of the TSS, wherein the fourth ACF feature is the third ACF feature.

Clause A8. The method/device/system/software for wireless human-nonhuman motion detection of clause A2-A7, comprising the processor configured further to: when the motion is detected, classify the object associated with the detected motion to be one of: the human, an adult, a child, a baby, the non-human, a pet, a robot, a machine, a fan, more than one human, or more than one non-human, based on the ACF statistics, the motion statistics, the speed statistics, and the gait statistics.

Clause A9. The method/device/system/software for wireless human-nonhuman motion detection of clause A8, comprising the processor configured further to: determine multiple candidate object classes for the object; determine a plurality of pairings of candidate object classes from the multiple candidate object classes; perform a plurality of pairwise detection based on the ACF statistics, the motion statistics, the speed statistics, and the gait statistics, each pairwise detection for a respective pairing of the candidate object classes; when the motion is detected, classify the object to be one of the multiple candidate object classes based on the plurality of pairwise detection.

Clause A10. The method/device/system/software for wireless human-nonhuman motion detection of clause A9, comprising the processor configured further to: compute a plurality of pairwise detection scores based on the ACF statistics, the motion statistics, the speed statistics, and the gait statistics, each pairwise detection score for a respective pairwise detection between a respective first candidate object class and a respective second candidate object class, wherein the respective score is typically larger when the object is the first candidate score than when the object is the second candidate score; when the motion is detected, classify the object to be one of the multiple candidate object classes based on the plurality of pairwise detection scores.

Clause A11. The method/device/system/software for wireless human-nonhuman motion detection of clause A10, comprising the processor configured further to: compute multiple per-object detection scores, each per-object detection score for a respective particular candidate object class being computed as a respective weighted aggregate of all the plurality of pairwise detection scores each weighted by (a) a zero weight if the respective particular candidate object class is neither the first object nor the second object in the associated pairwise detection, (b) a positive weight if the respective particular candidate object class is the first candidate object class in the associated pairwise detection, or (c) a negative weight if the respective particular candidate object class is the second candidate object class in the associated pairwise detection; when the motion is detected, classify the object to be one of the multiple candidate object classes based on the multiple per-object detection scores.

Clause A12. The method/device/system/software for wireless human-nonhuman motion detection of clause A11, comprising the processor configured further to: when the motion is detected, classify the object to be the candidate object class with the largest per-object detection score.

Clause A13. The method/device/system/software for wireless human-nonhuman motion detection of clause A2-A12, comprising the processor configured further to: perform a task based on the detected motion and the classification of the object associated with detected motion.

Clause A14. The method/device/system/software for wireless human-nonhuman motion detection of any previous claim, comprising the processor configured further to: detect an intruder when the motion is detected and the object is classified to be human.

Clause A15. The method/device/system/software for wireless human-nonhuman motion detection of any previous claim, comprising the processor configured further to: resample the TSCI to obtain a time series of re-sampled CI (TSRCI), compute the motion statistics based on the TSRCI.

Clause A16. The method/device/system/software for wireless human-nonhuman motion detection of clause A15, comprising the processor configured further to: wherein a sampling rate of the TSRI is greater than a sampling rate of the TSRCI.

Clause A17. The method/device/system/software for wireless human-nonhuman motion detection of clause A16, comprising the processor configured further to: wherein the sampling rate of the TSCI is greater than a sampling rate of the TSRCI by a factor of at least 5.

Clause A18. The method/device/system/software for wireless human-nonhuman motion detection of any previous claim: wherein any channel information (CI) comprises at least one of: channel state information (CSI), channel impulse response (CIR), channel frequency response (CFR), a signal power, a magnitude, a phase, a function of the magnitude, a function of the phase, a magnitude square, an average magnitude, a weighted magnitude, an average phase, a weighted phase, a phase difference, a feature of any of the above.

Clause A19. The method/device/system/software for wireless human-nonhuman motion detection of any previous claim, comprising the processor further configured to: preprocess the TSCI.

Clause A20. The method/device/system/software for wireless human-nonhuman motion detection of any previous claim, comprising the processor further configured to: compute the ACF based on a CI feature of each CI of the TSCI, wherein the CI feature of a CI comprise: a magnitude of the CI, a phase of the CI, a magnitude of a component of the CI, a phase of the component of the CI, a function of the magnitude of the CI, a square of the magnitude of the CI, a function of the phase of the CI, a function of the magnitude of the component of the CI, a square of the magnitude of the component of the CI, or a function of the phase of the component of the CI.

Clause A21. The method/device/system/software for wireless human-nonhuman motion detection of clause A20, wherein the component comprises one of: a tap of a CIR, a subcarrier of a CFR, or a component of a CSI.

Clause A22. The method/device/system/software for wireless human-nonhuman motion detection of any previous claim: wherein the motion statistics comprises at least one of the following pairwise quantities between two channel information (CI): a difference, a distance, a weighted distance, a Euclidean distance, an absolute distance, an angular distance, a graph distance, a statistical distance, a distance metric, L_1 norm, L_2 norm, L_k norm, a distance score, a similarity, a similarity score, an inner product, a dot product, a correlation, a correlation coefficient, a correlation indicator, auto-correlation, auto-covariance, cross-correlation, cross-covariance, or an aggregate of the above.

Clause A23. The method/device/system/software for wireless human-nonhuman motion detection of any previous claim: wherein the ACF statistics comprises at least one of: ACF peak mean, ACF valley mean, ACF zero-crossing mean, ACF mean-crossing mean, ACF inflection point mean, ACF(t) mean, ACF peak variance, ACF valley variance, ACF zero-crossing variance, ACF mean-crossing variance, ACF inflection point variance, ACF(t) variance, ACF inter-peak interval, ACF inter-valley interval, ACF peak-valley interval, ACF inter-zero-crossing interval, ACF inter-mean-crossing interval, ACF inter-inflection-point interval, ACF peak interval distance, ACF valley interval distance, ACF peak-valley interval distance, ACF inter-zero-crossing interval distance, ACF inter-mean-crossing interval distance, or ACF inter-inflection-point interval distance; wherein ACF(t) is the ACF or the function of the ACF evaluated at a particular argument value oft.

Clause A24. The method/device/system/software for wireless human-nonhuman motion detection of any previous claim: wherein the speed statistics comprises at least one of the following of speed: histogram, mean, percentile, 50-percentile, median, percentile, 0-percentile, minimum, 100-percentile, maximum, 25-percentile, 75-percentile, trimmed mean, conditional mean, weighted mean, weighted median, mode, sum, weighted sum, product, weighted product, arithmetic mean, geometric mean, harmonic mean, variance, standard deviation, variability, variation, deviation, derivative, slope, spread, dispersion, range, skewness, kurtosis, L-moment, entropy, variance-to-mean ratio, max-to-min ratio, regularity, similarity, likelihood, correlation, covariance, auto-correlation, auto-covariance, sliding quantity of any of the above, Clause A25. The method/device/system/software for wireless human-nonhuman motion detection of any previous claim: wherein the gait statistics comprises at least one of:

gait existence, interval, stride cycle time, step cycle time, N-cycle time, interval distance, stride cycle distance, stride length, step cycle distance, step length, N-cycle distance, asymmetric of even cycles and odd cycles, asymmetry of modulo-1 cycles and modulo-2 cycles, asymmetry of modulo-1 cycles and modulo-3 cycles, asymmetry of modulo-1 cycles and modulo-4 cycles, asymmetry of modulo-2 cycles and modulo-3 cycles, asymmetry of modulo-2 cycles and modulo-4 cycles, or asymmetry of modulo-3 cycles and modulo-4 cycles.

Clause A26. The method/device/system/software for wireless human-nonhuman motion detection of any previous clause (clause A2 in particular), comprising the processor further configured to: detect the motion of the object when a magnitude of the motion statistics, or an accumulation of the magnitude of the motion statistics, exceeds a threshold.

Clause A27. The method/device/system/software for wireless human-nonhuman motion detection of clause A26: wherein the accumulation of the motion statistics comprises at least one of: a sum, an integration, a weighted sum, a product, a weighted product, an average, a weighted average, a mean, an arithmetic mean, a geometric mean, a harmonic mean, a conditional mean, a trimmed mean, a statistics, a median, a weighted median, a percentile, a mode, a maximum, a minimum, a variance, a deviation, a variability, a sliding average, a sliding mean, a sliding weighted mean, a sliding median, a sliding variance, a sliding deviation, or a sliding statistics.

Clause A28. The method/device/system/software for wireless human-nonhuman motion detection of any previous claim: wherein the at least one ACF feature comprises any of: a global maximum, a global minimum, a local maximum, a local minimum, a zero-crossing, a mean-crossing, an inflection point, a k^{th} local maximum, a k^{th} minimum, a k^{th} zero-crossing, a k^{th} mean-crossing, a k^{th} inflection point, a time argument of the ACF or the function of the ACF associated with any of the above, a pair of adjacent local maximum, a pair of adjacent local minimum, a pair of adjacent local maximum and local minimum, a pair of adjacent zero-crossing, a pair of adjacent mean-crossing, a pair of adjacent inflection point, a histogram of any of the above, a statistics associated with the histogram, a mean, a conditional mean, a trimmed mean, a median, a mode, a percentile, a variance, a deviation, a variability, a weighted mean, an arithmetic mean, a geometric mean, a harmonic mean, an existence of a rhythm over time, a periodic behavior, a repeated behavior, a frequency, a period, a function of one of the above pairs, a difference between one of the above pairs, a time interval between one of the above pairs, or the ACF or the function of the ACF evaluated at a particular time argument; wherein the function of the ACF comprises one of: a linear function, a piecewise linear function, a nonlinear function, a polynomial function, an exponential function, a logarithmic function, a trigonometric function, a transcendental function, an absolute function, a magnitude function, an indicator function, a thresholding function, a quantization function, a derivative function, a first derivative, a second derivative, a third derivative, an integration function, a single integration, a double integration, a triple integration, a function obtained by filtering of the ACF with at least one of: lowpass filtering, bandpass filtering, highpass filtering, smoothing or weighted averaging.

Clause A29. The method/device/system/software for wireless human-nonhuman motion detection of any previous claim, comprising the processor further configured to: when the motion is detected, classify the object associated with the detected motion based on the ACF statistics, the motion statistics, the speed statistics, and the gait statistics using at least one of: support vector machine (SVM), SVM with linear kernel function, SVM with nonlinear kernel, SVM with polynomial kernel, SVM with Gaussian kernel, SVM with Sigmoid kernel, neural network (NN), deep neural network (DNN), recurrent neural network (RNN), perceptron, multilayer perceptron (MLP), feedforward neural network, recurrent Hopfield network, radial basis functional neural network, neural backpropagation, convolutional neural network (CNN), AlexNet, LeNet, residual neural network (ResNet), recursive neural network, generative adversarial network (GAN), cellular neural network, Dan Ciresan net, Overfeat, VGG, LeNet5, network-in-network, GoogLeNet, FaceNet, Inception, bottleneck layer, SqueezeNet, ENet, fully-connected neural network, deconvolution neural network, LSTM (Long Short-Term Memory), BiLSTM, modular neural network, sequence-to-sequence models, Siamese architecture, gated recurrent unit, Boltzmann machine, deep belief networks, transformer, ViT, gated recurrent unit (GRU), CNN+GRU, hybrid, combination of two or more neural networks, supervised learning, unsupervised learning, semi-supervised learning, deep learning, random search, Bayesian optimization, evolutionary methods, reinforcement learning, gradient-based methods, centralized network management, distributed network management, or hierarchical network management.

Clause A30. The method/device/system/software for wireless human-nonhuman motion detection of clause A13: wherein the task comprises at least one of: (a) a sensing task, which comprises any of: monitoring, sensing, detection, recognition, estimation, verification, identification, authentication, classification, locationing, guidance, navigation, tracking, or counting, of or in, at least one of: object, multiple objects, vehicle, machine, tool, human, baby, elderly, patient, pet, presence, proximity, activity, daily activity, well-being, vital sign, breathing, heartbeat, health condition, sleep, sleep stage, walking, gait, gesture, exercise, fall-down, danger, intrusion, security, safety, life-threat, emotion, movement, motion, motion degree, periodic motion, repeated motion, stationary motion, cyclo-stationary motion, regular motion, transient motion, sudden motion, suspicious motion, irregularity, trend, human biometrics, environment informatics, room, venue, indoor venue, or cars in parking facility, (b) a computation task, which comprises any of: analysis, machine learning, supervised learning, unsupervised learning, semi-supervised learning, deep learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, map-based or model-based processing/correction, geometry estimation, analytics computation, (c) an IoT task, which comprises a smart task for any of: home, office, factory, vehicle, building, facility, structure, system or device, wherein the smart task comprises any of: any of the sensing task, energy management, power transfer, wireless power transfer, activating a device or system, alarm, siren, speaker, television, entertaining system, camera, heater, coffee machine, cooking device, cleaning device, housekeeping device, security system, access system, air-conditioning (HVAC) system, ventilation system, lighting system, or gaming system, or (d) a miscellaneous task, which comprises any of: transmission, processing, storage or analysis of data, parameters, analytics, or derived data, administration, configuration, upgrading, coordination, broadcasting, synchronization, networking, communication, encryption, protection, compression, storage, database, archiving, query, cloud computing, presentation, augmented reality, or virtual reality.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for wireless human-nonhuman motion detection, comprising:

a transmitter configured to transmit a wireless signal through a wireless multipath channel of a venue;

a receiver configured to receive the wireless signal through the wireless multipath channel of the venue, wherein the received wireless signal differs from the transmitted wireless signal due to the wireless multipath channel that is impacted by a motion of an object in the venue; and a processor configured to:

obtain a time series of channel information (TSCI) of the wireless multipath channel based on the received wireless signal, compute an autocorrelation function (ACF) of the channel information (CI) of the TSCI, compute multiple same-ACF features of the ACF or of a function of the ACF, compute an ACF statistics comprising an aggregate of a set of same-ACF features, the set of same-ACF features being at least one of:

a first set of same-ACF features comprising a local maximum (Local-Max) value of the ACF and at least one additional Local-Max value of the ACF, a second set of same-ACF features comprising a local minimum (Local-Min) value of the ACF and at least one additional Local-Min value of the ACF, a third set of same-ACF features comprising an inter-Local-Max distance of the ACF and at least one additional inter-Local-Max distance of the ACF, each inter-Local-Max distance being a temporal interval between a pair of adjacent Local-Max values of the ACF, or a fourth set of same-ACF features comprising an inter-Local-Min distance of the ACF and at least one additional inter-Local-Min distance of the ACF, each inter-Local-Min distance being a temporal interval between a pair of adjacent Local-Min values of the ACF, wherein each aggregate comprises at least one of: weighted mean, weighted sum, weighted product, percentile, median, mode, maximum, minimum, variance, or standard deviation, compute a motion statistics based on the ACF evaluated at a particular time lag or a value of the function of the ACF evaluated at the particular time lag, compute a speed statistics associated with a speed of the motion of the object based on a speed quantity computed based on one of the following same-ACF features: a Local-Max value of the ACF, a Local-Max value of the function of the ACF, a Local-Min value of the ACF, or a Local-Min value of the function of the ACF, compute a gait statistics associated with a gait motion of the object based on a metric of a periodic behavior of the speed quantity, detect the motion of the object based on the motion statistics, and in response to a determination that the motion is detected:

determine multiple candidate object classes for the object, wherein the multiple candidate object classes include: a human, an adult, a child, a baby, a non-human, a pet, a robot, a machine, a fan, more than one human, and more than one non-human, determine a plurality of pairings of candidate object classes from the multiple candidate object classes, perform each of a plurality of pairwise detections for a respective pairing of the candidate object classes, compute a plurality of pairwise detection scores based on the ACF statistics, the motion statistics, the speed statistics, and the gait statistics, each pairwise detection score being computed for a respective pairwise detection between a respective first candidate object class and a respective second candidate object class, and classify the object associated with the detected motion to be one of the multiple candidate object classes based on the plurality of pairwise detection scores.

2. The system of claim 1, wherein the processor is further configured to:

compute a time series of ACF (TSACF), each ACF being computed based on CI in a respective first sliding time window of the TSCI; and compute the multiple same-ACF features of each ACF or of the function of each ACF.

3. The system of claim 2, wherein the processor is further configured to:

compute the ACF statistics as the aggregate of the set of same-ACF features of each ACF or of the function of each ACF in a second sliding time window of the TSACF.

4. The system of claim 3, wherein the processor is further configured to:

compute a time series of speed (TSS) of the motion of the object, each respective speed being the speed quantity computed based on the respective ACF or the function of the respective ACF in a respective third sliding time window of the TSACF; and compute the speed statistics based on each speed in a fourth sliding time window of the TSS.

5. The system of claim 4, wherein the processor is further configured to:

detect a presence of the gait motion of the object based on the TSS.

6. The system of claim 5, wherein the processor is further configured to:

compute the gait statistics based on each speed in a fifth sliding time window of the TSS.

7. The system of claim 1, wherein the processor is further configured to:

compute multiple per-object detection scores, wherein:

each per-object detection score is computed for a respective particular candidate object class, each per-object detection score is computed as a respective weighted aggregate of all of the plurality of pairwise detection scores, each respective pairwise detection score of the plurality of pairwise detection scores is weighted by: (a) a positive weight if the respective particular candidate object class is the respective first candidate object class in the respective pairwise detection associated with the respective pairwise detection score, (b) a negative weight if the respective particular candidate object class is the respective second candidate object class in the respective pairwise detection, or (c) a zero weight if the respective particular candidate object class is neither the respective first candidate object class nor the respective second candidate object class in the respective pairwise detection; and in response to the determination that the motion is detected, classify the object to be one of the multiple candidate object classes based on the multiple per-object detection scores.

8. The system of claim 7, wherein the processor is further configured to:

in response to the determination that the motion is detected, classify the object to be a candidate object class having the largest per-object detection score.

9. The system of claim 8, wherein the processor is further configured to:

perform a task based on the detected motion and the classification of the object associated with detected motion.

10. The system of claim 9, wherein the processor is further configured to:

detect an intruder when the motion is detected and the object is classified to be human.

11. The system of claim 10, wherein the processor is further configured to:

resample the TSCI to obtain a time series of re-sampled CI (TSRCI); and compute the motion statistics based on the TSRCI.

12. The system of claim 11, wherein:

a sampling rate of the TSCI is greater than a sampling rate of the TSRCI.

13. The system of claim 12, wherein:

the sampling rate of the TSCI is greater than the sampling rate of the TSRCI by a factor of at least 5.

14. The system of claim 13, wherein any channel information (CI) of the TSCI comprises at least one of:

channel state information (CSI), channel impulse response (CIR), channel frequency response (CFR), a signal power, a magnitude, a phase, a function of the magnitude, a function of the phase, a magnitude square, an average magnitude, a weighted magnitude, an average phase, a weighted phase, a phase difference, or a feature of any of the above.

15. The system of claim 14, wherein the processor is further configured to:

compute the ACF based on a CI feature of each CI of the TSCI, wherein the CI feature comprises: a magnitude of the CI, a phase of the CI, a magnitude of a component of the CI, a phase of the component of the CI, a function of the magnitude of the CI, a square of the magnitude of the CI, a function of the phase of the CI, a function of the magnitude of the component of the CI, a square of the magnitude of the component of the CI, or a function of the phase of the component of the CI, wherein the component comprises one of: a tap of a CIR, a subcarrier of a CFR, or a component of a CSI.

16. The system of claim 15, wherein the motion statistics comprises at least one of the following pairwise quantities between two channel information (CI):

a difference, a distance, a weighted distance, a Euclidean distance, an absolute distance, an angular distance, a graph distance, a statistical distance, a distance metric, L_1 norm, L_2 norm, L_k norm, a distance score, a similarity, a similarity score, an inner product, a dot product, a correlation, a correlation coefficient, a correlation indicator, auto-correlation, auto-covariance, cross-correlation, cross-covariance, or an aggregate of the above.

17. The system of claim 16, wherein the ACF statistics comprises at least one of:

ACF peak mean, ACF valley mean, ACF zero-crossing mean, ACF mean-crossing mean, ACF inflection point mean, ACF (t) mean, ACF peak variance, ACF valley variance, ACF zero-crossing variance, ACF mean-crossing variance, ACF inflection point variance, ACF (t) variance, ACF inter-peak interval, ACF inter-valley interval, ACF peak-valley interval, ACF inter-zero-crossing interval, ACF inter-mean-crossing interval, ACF inter-inflection-point interval, ACF peak interval distance, ACF valley interval distance, ACF peak-valley interval distance, ACF inter-zero-crossing interval distance, ACF inter-mean-crossing interval distance, or ACF inter-inflection-point interval distance, wherein ACF (t) is the ACF or the function of the ACF evaluated at a particular argument value of t.

18. The system of claim 17, wherein the speed statistics comprises at least one of the following of speed:

histogram, mean, percentile, 50-percentile, median, 0-percentile, minimum, 100-percentile, maximum, 25-percentile, 75-percentile, trimmed mean, conditional mean, weighted mean, weighted median, mode, sum, weighted sum, product, weighted product, arithmetic mean, geometric mean, harmonic mean, variance, standard deviation, variability, variation, deviation, derivative, slope, spread, dispersion, range, skewness, kurtosis, L-moment, entropy, variance-to-mean ratio, max-to-min ratio, regularity, similarity, likelihood, correlation, covariance, auto-correlation, auto-covariance, a function of any of the above, or sliding quantity of any of the above.

19. The system of claim 18, wherein the gait statistics comprises at least one of:

gait existence, interval, stride cycle time, step cycle time, N-cycle time, interval distance, stride cycle distance, stride length, step cycle distance, step length, N-cycle distance, asymmetry of even cycles and odd cycles, asymmetry of modulo-1 cycles and modulo-2 cycles, asymmetry of modulo-1 cycles and modulo-3 cycles, asymmetry of modulo-1 cycles and modulo-4 cycles, asymmetry of modulo-2 cycles and modulo-3 cycles, asymmetry of modulo-2 cycles and modulo-4 cycles, or asymmetry of modulo-3 cycles and modulo-4 cycles.

20. The system of claim 1, wherein the processor is further configured to: detect the motion of the object when a magnitude of the motion statistics exceeds a first threshold, or when an accumulation of the magnitude of the motion statistics exceeds a second threshold.

21. The system of claim 20, wherein the accumulation of the motion statistics comprises at least one of:

a sum, an integration, a weighted sum, a product, a weighted product, an average, a weighted average, a mean, an arithmetic mean, a geometric mean, a harmonic mean, a conditional mean, a trimmed mean, a statistics, a median, a weighted median, a percentile, a mode, a maximum, a minimum, a variance, a deviation, a variability, a sliding average, a sliding mean, a sliding weighted mean, a sliding median, a sliding variance, a sliding deviation, a sliding statistics, or an aggregate of any of the above.

22. A method for wireless human-nonhuman motion detection, comprising:

transmitting a wireless signal through a wireless multipath channel of a venue;

receiving the wireless signal through the wireless multipath channel of the venue, wherein the received wireless signal differs from the transmitted wireless signal due to the wireless multipath channel that is impacted by a motion of an object in the venue;

obtaining a time series of channel information (TSCI) of the wireless multipath channel based on the received wireless signal;

computing an autocorrelation function (ACF) of the channel information (CI) of the TSCI;

computing multiple same-ACF features of the ACF or of a function of the ACF;

computing an ACF statistics comprising an aggregate of a set of same-ACF features, the set of same-ACF features being at least one of:

a first set of same-ACF features comprising a local maximum (Local-Max) value of the ACF and at least one additional Local-Max value of the ACF, a second set of same-ACF features comprising a local minimum (Local-Min) value of the ACF and at least one additional Local-Min value of the ACF, a third set of same-ACF features comprising an inter-Local-Max distance of the ACF and at least one additional inter-Local-Max distance of the ACF, each inter-Local-Max distance being a temporal interval between a pair of adjacent Local-Max values of the ACF, or a fourth set of same-ACF features comprising an inter-Local-Min distance of the ACF and at least one additional inter-Local-Min distance of the ACF, each inter-Local-Min distance being a temporal interval between a pair of adjacent Local-Min values of the ACF, wherein each aggregate comprises at least one of: weighted mean, weighted sum, weighted product, percentile, median, mode, maximum, minimum, variance, or standard deviation;

computing a motion statistics based on the ACF evaluated at a particular time lag or a value of the function of the ACF evaluated at the particular time lag;

computing a speed statistics associated with a speed of the motion of the object based on a speed quantity computed based on one of the following same-ACF features: a Local-Max value of the ACF, a Local-Max value of the function of the ACF, a Local-Min value of the ACF, or a Local-Min value of the function of the ACF;

computing a gait statistics associated with a gait motion of the object based on a metric of a periodic behavior of the speed quantity;

detecting the motion of the object based on the motion statistics; and in response to a determination that the motion is detected:

determining multiple candidate object classes for the object, wherein the multiple candidate object classes include: a human, an adult, a child, a baby, a non-human, a pet, a robot, a machine, a fan, more than one human, and more than one non-human, determining a plurality of pairings of candidate object classes from the multiple candidate object classes, performing each of a plurality of pairwise detections for a respective pairing of the candidate object classes, computing a plurality of pairwise detection scores based on the ACF statistics, the motion statistics, the speed statistics, and the gait statistics, each pairwise detection score being computed for a respective pairwise detection between a respective first candidate object class and a respective second candidate object class, and classifying the object associated with the detected motion to be one of the multiple candidate object classes based on the plurality of pairwise detection scores.

23. The method of claim 22, further comprising:

computing a time series of ACF (TSACF), each ACF being computed based on CI in a respective first sliding time window of the TSCI;

computing the multiple same-ACF features of each ACF or of the function of each ACF; and computing the ACF statistics as the aggregate of the set of same-ACF features of each ACF or of the function of each ACF in a second sliding time window of the TSACF.

24. The method of claim 23, further comprising:

computing a time series of speed (TSS) of the motion of the object, each respective speed being the speed quantity computed based on the respective ACF or the function of the respective ACF in a respective third sliding time window of the TSACF;

computing the speed statistics based on each speed in a fourth sliding time window of the TSS;

detecting a presence of the gait motion of the object based on the TSS; and computing the gait statistics based on each speed in a fifth sliding time window of the TSS.

25. An apparatus for wireless human-nonhuman motion detection, comprising:

a receiver configured to receive a wireless signal transmitted by a transmitter through a wireless multipath channel in a venue, wherein the received wireless signal differs from the transmitted wireless signal due to the wireless multipath channel that is impacted by a motion of an object in the venue;

a memory having a set of instructions stored therein; and a processor communicatively coupled to the memory and the receiver, and configured to:

obtain a time series of channel information (TSCI) of the wireless multipath channel based on the received wireless signal, compute an autocorrelation function (ACF) of the channel information (CI) of the TSCI, compute multiple same-ACF features of the ACF or of a function of the ACF, compute an ACF statistics comprising an aggregate of a set of same-ACF features, the set of same-ACF features being at least one of:

a first set of same-ACF features comprising a local maximum (Local-Max) value of the ACF and at least one additional Local-Max value of the ACF, a second set of same-ACF features comprising a local minimum (Local-Min) value of the ACF and at least one additional Local-Min value of the ACF, a third set of same-ACF features comprising an inter-Local-Max distance of the ACF and at least one additional inter-Local-Max distance of the ACF, each inter-Local-Max distance being a temporal interval between a pair of adjacent Local-Max values of the ACF, or a fourth set of same-ACF features comprising an inter-Local-Min distance of the ACF and at least one additional inter-Local-Min distance of the ACF, each inter-Local-Min distance being a temporal interval between a pair of adjacent Local-Min values of the ACF, wherein each aggregate comprises at least one of: weighted mean, weighted sum, weighted product, percentile, median, mode, maximum, minimum, variance, or standard deviation, compute a motion statistics based on the ACF evaluated at a particular time lag or a value of the function of the ACF evaluated at the particular time lag, compute a speed statistics associated with a speed of the motion of the object based on a speed quantity computed based on one of the following same-ACF features: a Local-Max value of the ACF, a Local-Max value of the function of the ACF, a Local-Min value of the ACF, or a Local-Min value of the function of the ACF, compute a gait statistics associated with a gait motion of the object based on a metric of a periodic behavior of the speed quantity, detect the motion of the object based on the motion statistics, and in response to a determination that the motion is detected:

determine multiple candidate object classes for the object, wherein the multiple candidate object classes include: a human, an adult, a child, a baby, a non-human, a pet, a robot, a machine, a fan, more than one human, and more than one non-human, determine a plurality of pairings of candidate object classes from the multiple candidate object classes, perform each of a plurality of pairwise detections for a respective pairing of the candidate object classes, compute a plurality of pairwise detection scores based on the ACF statistics, the motion statistics, the speed statistics, and the gait statistics, each pairwise detection score being computed for a respective pairwise detection between a respective first candidate object class and a respective second candidate object class, and classify the object associated with the detected motion to be one of the multiple candidate object classes based on the plurality of pairwise detection scores.

* * * * *